(12) United States Patent
Dowski, Jr. et al.

(10) Patent No.: US 7,710,658 B2
(45) Date of Patent: May 4, 2010

(54) ZOOM LENS SYSTEMS WITH WAVEFRONT CODING

(75) Inventors: Edward Raymond Dowski, Jr., Lafayette, CO (US); Satoru Tachihara, Boulder, CO (US); Robert H. Cormack, Boulder, CO (US)

(73) Assignee: OmniVision CDM Optics, Inc., Boulder, CO (US)

( * ) Notice: Subject to any disclaimer, the term of this patent is extended or adjusted under 35 U.S.C. 154(b) by 152 days.

(21) Appl. No.: 11/682,816

(22) Filed: Mar. 6, 2007

(65) Prior Publication Data

US 2007/0247725 A1    Oct. 25, 2007

Related U.S. Application Data

(60) Provisional application No. 60/779,712, filed on Mar. 6, 2006.

(51) Int. Cl.
*G02B 15/14* (2006.01)
*G01J 1/20* (2006.01)

(52) U.S. Cl. .................... 359/679; 359/676; 250/201.9

(58) Field of Classification Search ................ 359/676, 359/666, 672–675
See application file for complete search history.

(56) References Cited

U.S. PATENT DOCUMENTS

| | | | |
|---|---|---|---|
| 3,305,294 A | 2/1967 | Alvarez | |
| 4,190,330 A | 2/1980 | Berreman | |
| 4,650,292 A | 3/1987 | Baker et al. | |
| 4,904,063 A | 2/1990 | Okada et al. | |
| 4,936,661 A | 6/1990 | Betensky et al. | |
| 4,988,173 A | 1/1991 | Margolis | |
| 5,150,234 A | 9/1992 | Takahashi et al. | |
| 5,270,861 A | 12/1993 | Estelle | |
| 5,270,867 A | 12/1993 | Estelle | |
| 5,473,473 A | 12/1995 | Estelle et al. | |

(Continued)

FOREIGN PATENT DOCUMENTS

EP         0506108 A1      9/1992

(Continued)

OTHER PUBLICATIONS

U.S. Appl. No. 60/684,895, filed May 25, 2005, HoSeong.

(Continued)

*Primary Examiner*—Jordan M. Schwartz
(74) *Attorney, Agent, or Firm*—Lathrop & Gage LLP

(57) ABSTRACT

Zoom lens systems and methods for imaging incoming rays over a range of ray angles are disclosed. The incoming rays are characterized by at least phase. The zoom lens system includes an optical axis and is characterized by a plurality of modulation transfer functions (MTFs) corresponding at least to the range of ray angles. The zoom lens system includes an optical group disposed along the optical axis, including at least one variable optical element that has a variable focal length selectable between at least two distinct focal length values. The optical group also includes a wavefront coding element. The wavefront coding element alters at least the phase of the incoming rays, such that the plurality of MTFs corresponding to the range of ray angles, for each one of the two distinct focal length values, are less sensitive to misfocus-like aberrations than a corresponding system without the wavefront coding element.

10 Claims, 31 Drawing Sheets

U.S. PATENT DOCUMENTS

| | | | |
|---|---|---|---|
| 5,515,206 A * | 5/1996 | Peng | ............................ 359/721 |
| 5,691,795 A | 11/1997 | Doane et al. | |
| 5,748,371 A | 5/1998 | Cathey et al. | |
| 6,101,044 A | 8/2000 | Ori et al. | |
| 6,144,493 A | 11/2000 | Okuyama et al. | |
| 6,219,113 B1 | 4/2001 | Takahara | |
| 6,248,988 B1 | 6/2001 | Krantz | |
| 6,512,892 B1 | 1/2003 | Montgomery et al. | |
| 6,603,608 B2 | 8/2003 | Togino | |
| 6,842,297 B2 | 1/2005 | Dowski | |
| 6,850,372 B1 * | 2/2005 | Stenton | ........................ 359/676 |
| 6,873,733 B2 | 3/2005 | Dowski | |
| 6,895,334 B2 | 5/2005 | Yabe | |
| 6,911,638 B2 | 6/2005 | Dowski | |
| 6,940,649 B2 | 9/2005 | Dowski | |
| 6,977,777 B1 | 12/2005 | Wick | |
| 7,206,136 B2 | 4/2007 | Labaziewicz et al. | |
| 7,221,863 B2 | 5/2007 | Kondo et al. | |
| 7,224,540 B2 | 5/2007 | Olmstead et al. | |
| 7,256,944 B2 | 8/2007 | Labaziewicz et al. | |
| 7,260,251 B2 | 8/2007 | Dowski, Jr. et al. | |
| 7,305,180 B2 | 12/2007 | Labaziewicz et al. | |
| 2003/0057353 A1 | 3/2003 | Dowski, Jr. et al. | |
| 2003/0127584 A1 | 7/2003 | Dowski et al. | |
| 2003/0169944 A1 | 9/2003 | Dowski, Jr. et al. | |
| 2004/0080660 A1 | 4/2004 | Battles et al. | |
| 2004/0190762 A1 | 9/2004 | Dowski et al. | |
| 2004/0228002 A1 | 11/2004 | Schrader | |
| 2004/0257677 A1 | 12/2004 | Matsusaka | |
| 2005/0018127 A1 | 1/2005 | Galstian | |
| 2006/0056084 A1 | 3/2006 | Araki | |
| 2006/0098097 A1 | 5/2006 | Wach et al. | |
| 2006/0164736 A1 | 7/2006 | Olmstead et al. | |
| 2006/0171041 A1 | 8/2006 | Olmstead et al. | |
| 2006/0209292 A1 | 9/2006 | Dowski, Jr. et al. | |
| 2006/0269150 A1 | 11/2006 | Lee | |
| 2007/0040828 A1 | 2/2007 | Zalevsky et al. | |
| 2007/0070519 A1 | 3/2007 | Chang | |
| 2007/0104473 A1 | 5/2007 | Lee et al. | |
| 2007/0121214 A1 | 5/2007 | Kuo | |
| 2007/0159701 A1 | 7/2007 | Campbell et al. | |
| 2007/0268376 A1 | 11/2007 | Yoshikawa et al. | |
| 2007/0295893 A1 | 12/2007 | Olsen et al. | |
| 2008/0231966 A1 * | 9/2008 | Hendriks et al. | ............ 359/666 |

FOREIGN PATENT DOCUMENTS

| | | |
|---|---|---|
| EP | 0549146 A1 | 6/1993 |
| EP | 1531353 A1 | 5/2005 |
| WO | WO2004/063989 A2 | 7/2004 |
| WO | WO2004/102958 A1 | 11/2004 |
| WO | WO2005/073762 | 8/2005 |
| WO | WO2005/125184 A1 | 12/2005 |
| WO | WO2007/008766 A1 | 1/2007 |
| WO | WO2007103944 | 9/2007 |
| WO | WO2007/118097 A1 | 10/2007 |
| WO | WO2008008084 | 1/2008 |

OTHER PUBLICATIONS

Andersen, G., "Large optical photon seve", Optics Letters, vol. 30, No. 22, Nov. 15, 2005, pp. 2976-2978.

Drzaic, "Recent progress in dichroic polymer-dispersed liquid crystal materials," Pure & Appl. Chem., vol. 68, No. 7, pp. 1435-1440, 1996.

Ye et al. "Liquid-crystal lens with a focal length that is variable in a wide range," Applied Optics, vol. 43, No. 35 (2004), pp. 6407-6412.

Application No. PCT/US07/63423, International Search Report & Written Opinion, Oct. 10, 2007, 12 pages.

Application No. PCT/US07/63423, International Preliminary Report on Patentability, Sep. 9, 2008, 8 pages.

Application No. PCT/US07/63423, Invitation to Pay Additional Fees & Partial Search Report, Jul. 27, 2007 5 pages.

Bradburn, Sara, Cathey, Wade Thomas, Dowski, Edward R., Jr., "Realizations of focus invariance in optical-digital systems with wave-front coding," Applied Optics, Dec. 10, 1997, pp. 9157-9766, vol. 36, No. 35, Optical Society of America.

Application No. PCT/US06/36556, International Search Report & Written Opinion, Feb. 29, 2008, 12 pages.

Application No. PCT/US06/36556, International Preliminary Report on Patentability, Mar. 25, 2008, 9 pages.

European Application No. 06 851 443.9, Examination Report, Jun. 3, 2008, 3 pages.

Gaughan, R. Single-Lens System Offers Simultaneous Fields of View, Technology World, Feb. 2006, 1 page, retrieved from the Internet at http://www.photonics.com/content/spectra/2006/February/tech/80009.aspx on Nov. 3, 2008.

Henning, T., Reinventing the Lens: Software-enhanced Optics, The Future Image Report, 2006, 49 pages.

Hong, D., et al., Flexible Depth of Field Extension and Its Application to Multiple Micro Objects Recognition, Proc of SPIE vol. 6718, 671803-1-10 (2007).

Plummer, W.T., et al., Photographic optical systems with nonrotational aspheric surfaces, Applied Optics, vol. 38, No. 16, Jun. 1999, pp. 3572-3592.

Plummer, W.T., Unusual optics of the Polaroid SX-70 Land camera, Applied Optics, vol. 21, No. 2, Jan. 15, 1982, pp. 196-202.

Presnyakov, V.V., et al., Polymer-stabilized liquid crystal for tunable microlens applications, Optics Express, Aug. 2002, vol. 10, No. 17, pp. 865-870.

Prischepa, I. A. & Dowski, E.R., Wavefront Coding Optical System Design, CDM Optics, Inc., Integrated Computational Imaging Systems (ICIS) 2001 paper, 6 pages.

Prischepa, I.A., Dowski, E.R., Wavefront Coded Zoom Lens System, CDM Optics, Inc., 2001, Proceedings of SPIE vol. 4487, 11 pages.

Ren, H. et al., Tunable-focus flat liquid crystal spherical lens, Applied Physics Letters, vol. 84 No. 23, Jun. 2004, pp. 4789-4791.

Sato, S., Liquid-Crystal Lens-Cells with Variable Focal Length, Japanese Journal of Applied Physics, vol. 18, No. 9, Sep. 1979, pp. 1679-1684.

Zalevsky, Z. et al., Single snap-shot double field optical zoom, Optics Express, vol. 13, No. 24, Nov. 2005, pp. 9858-9868.

Zalevsky, Z. et al., All-optical axial super resolving imaging using a low-frequency binary-phase mask, Optics Express, Apr. 2006, vol. 14 No. 7, pp. 2631-2643.

* cited by examiner

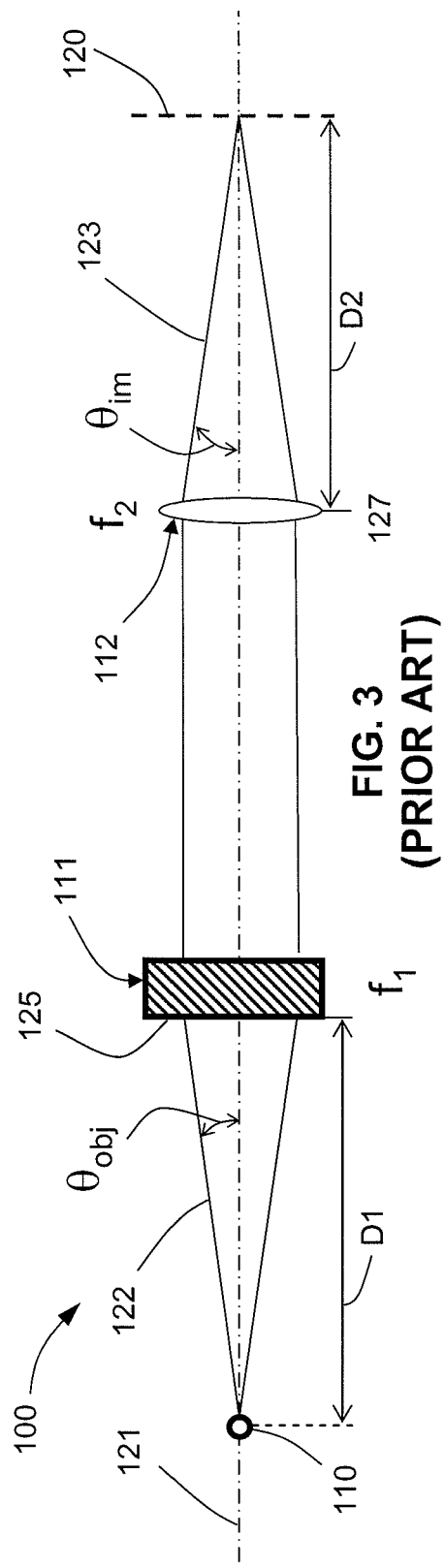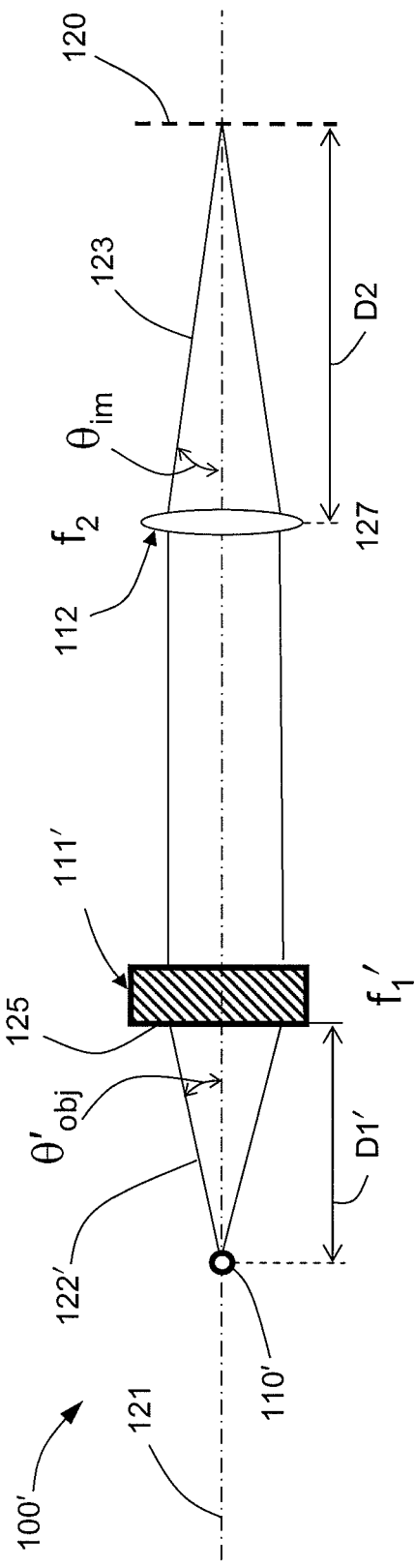

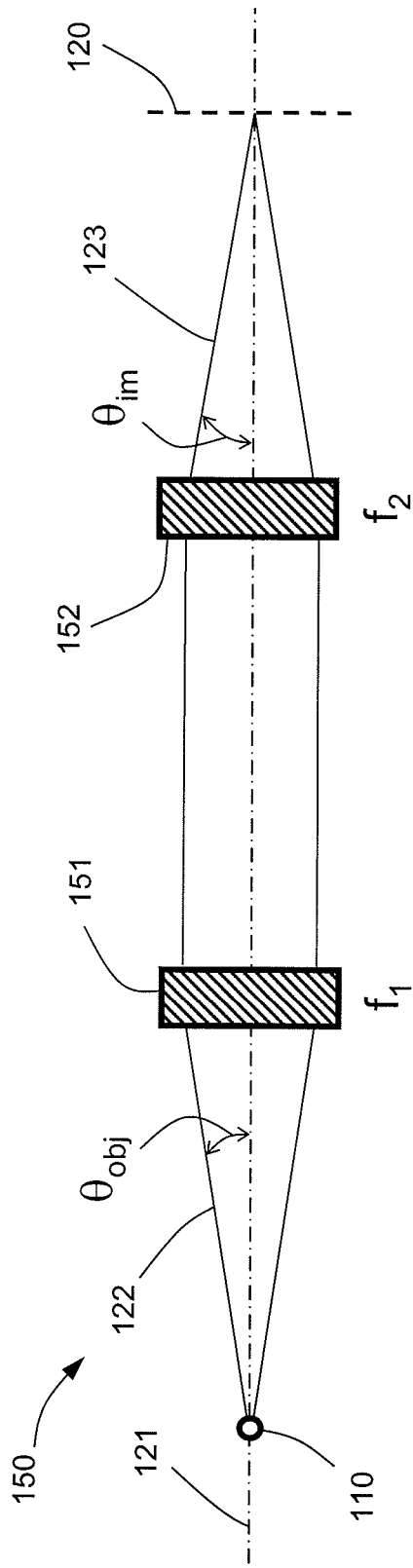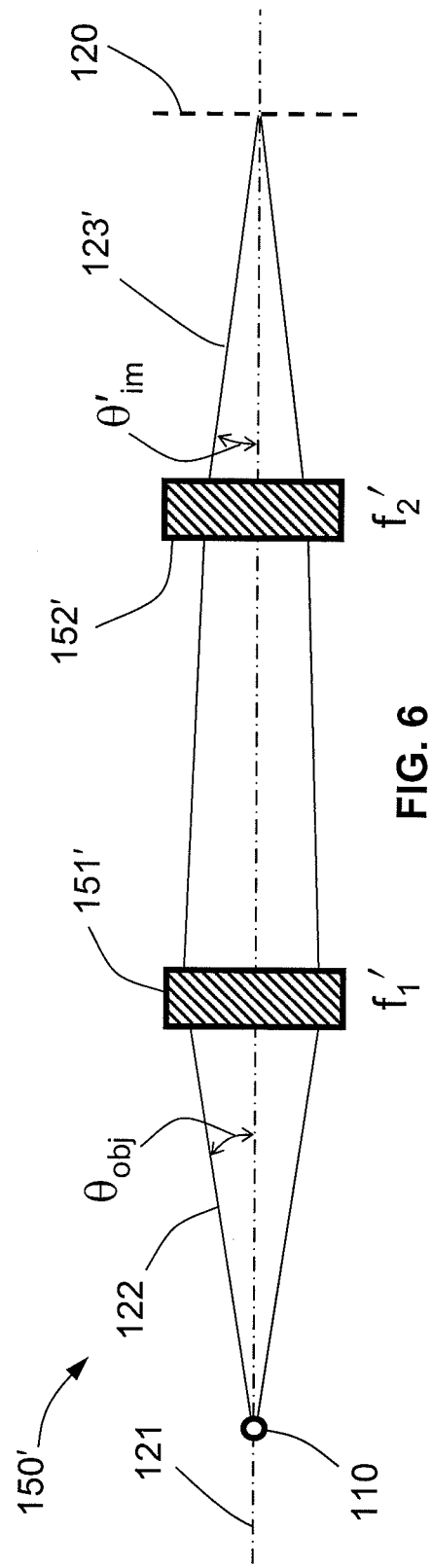

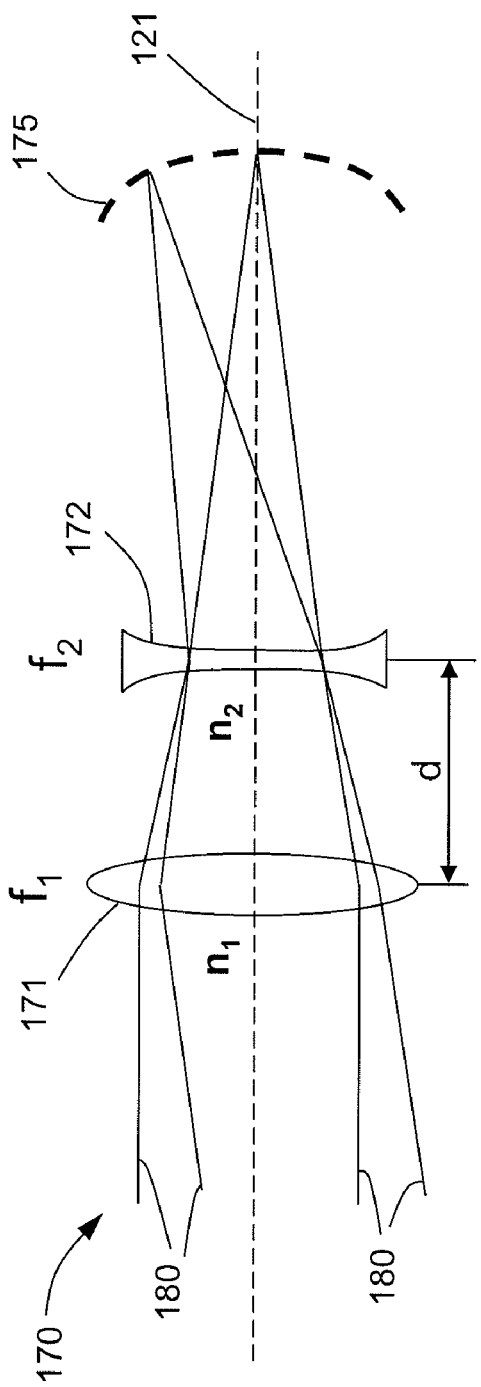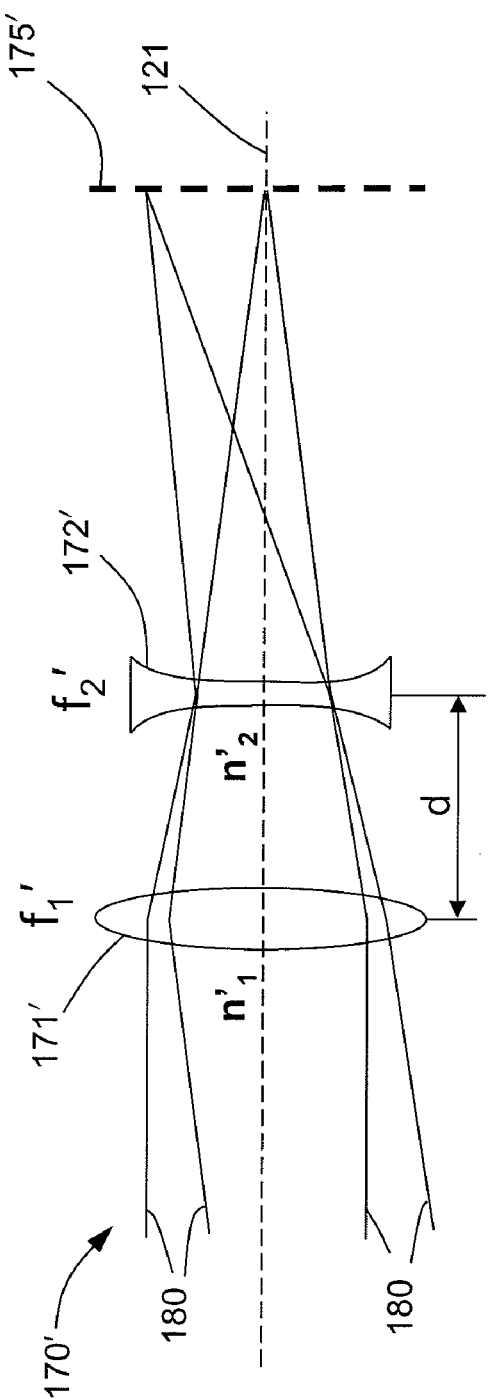
FIG. 7 (PRIOR ART)
FIG. 8 (PRIOR ART)

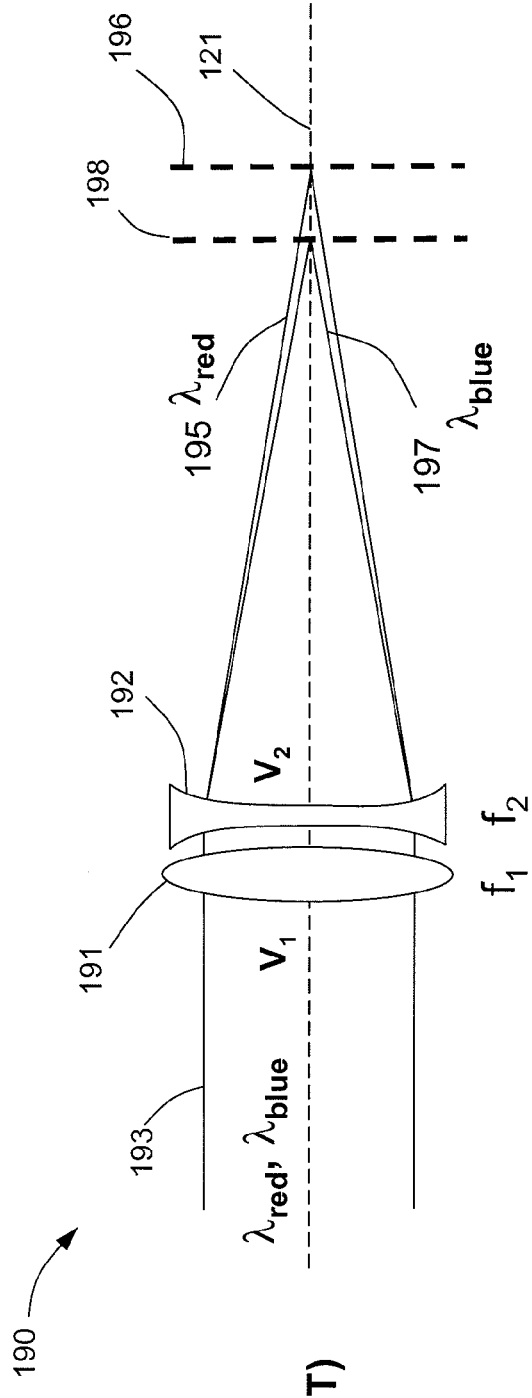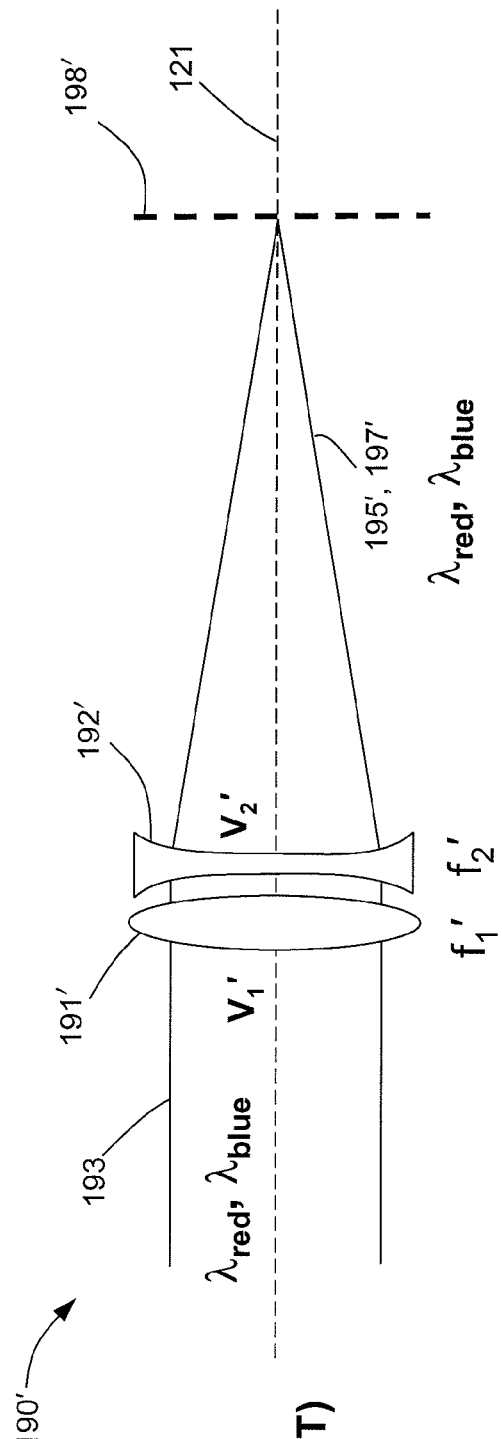
FIG. 9 (PRIOR ART)
FIG. 10 (PRIOR ART)

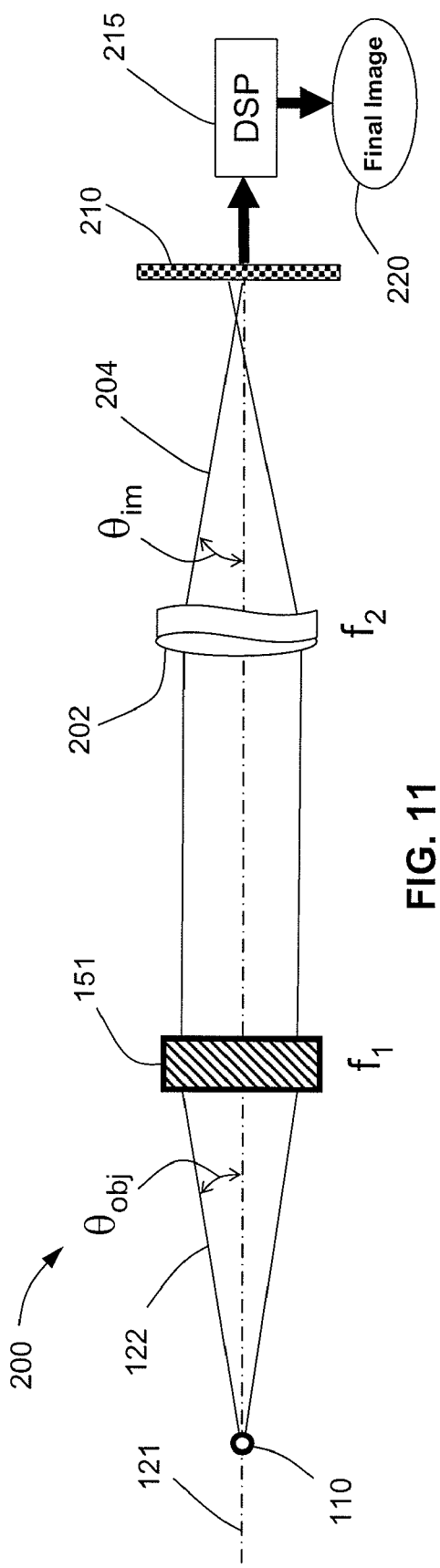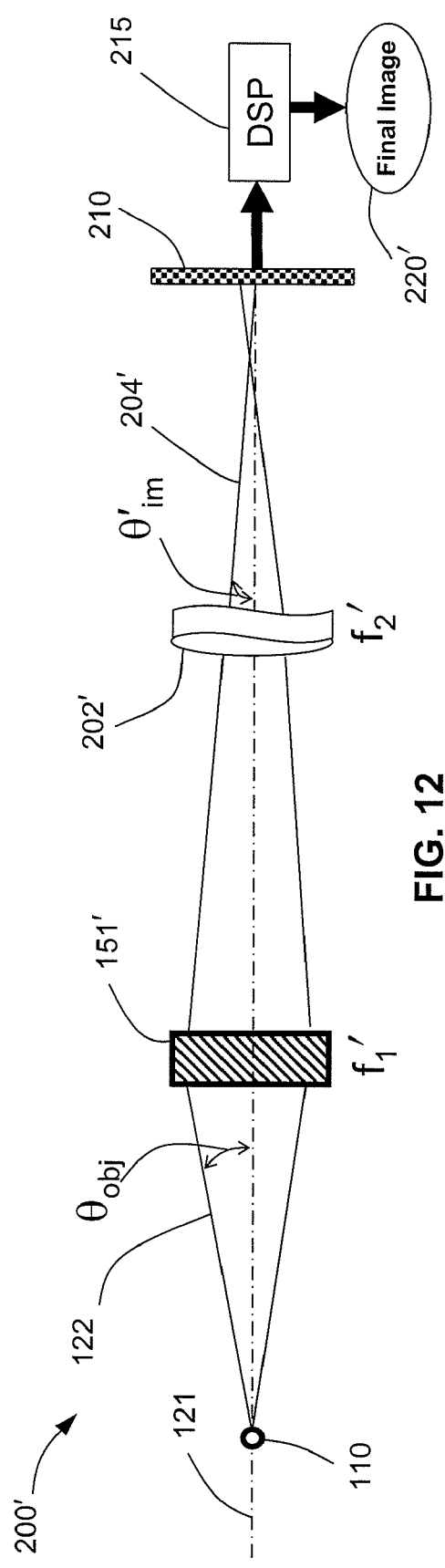

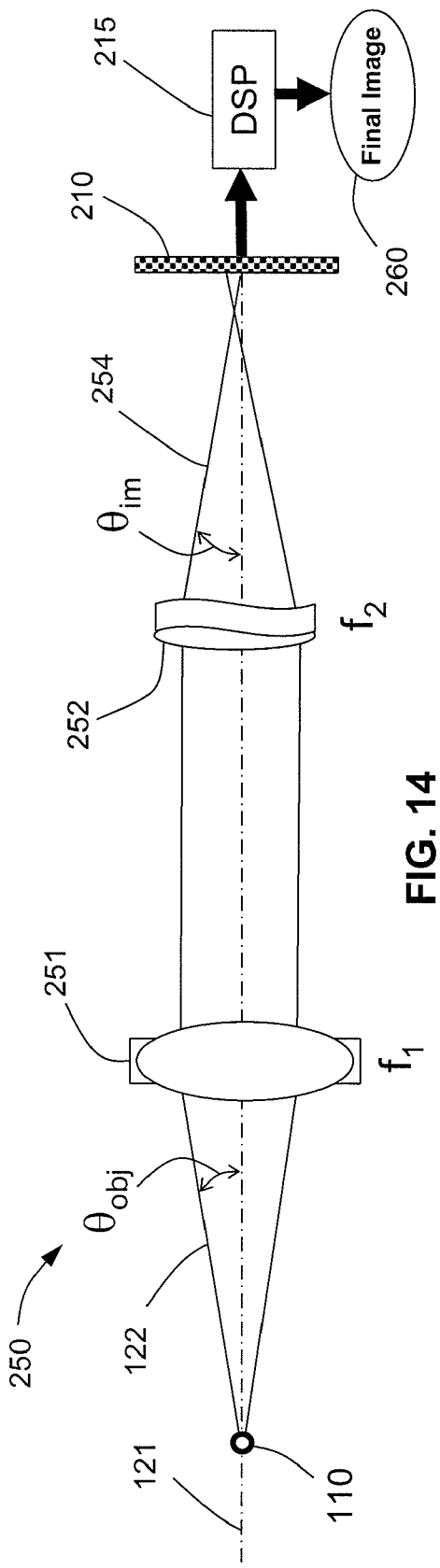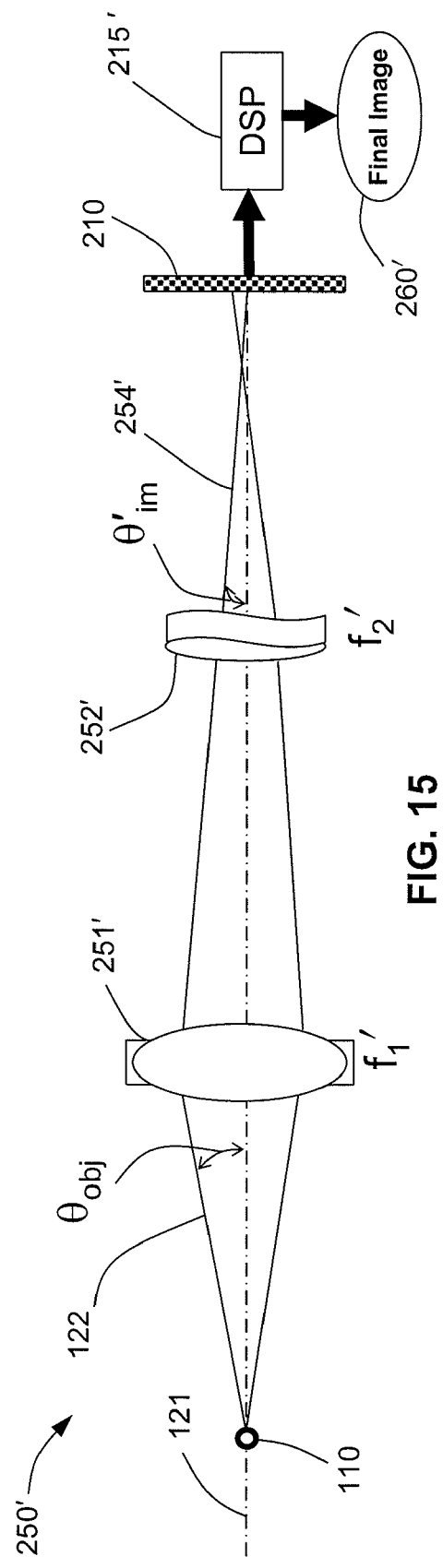

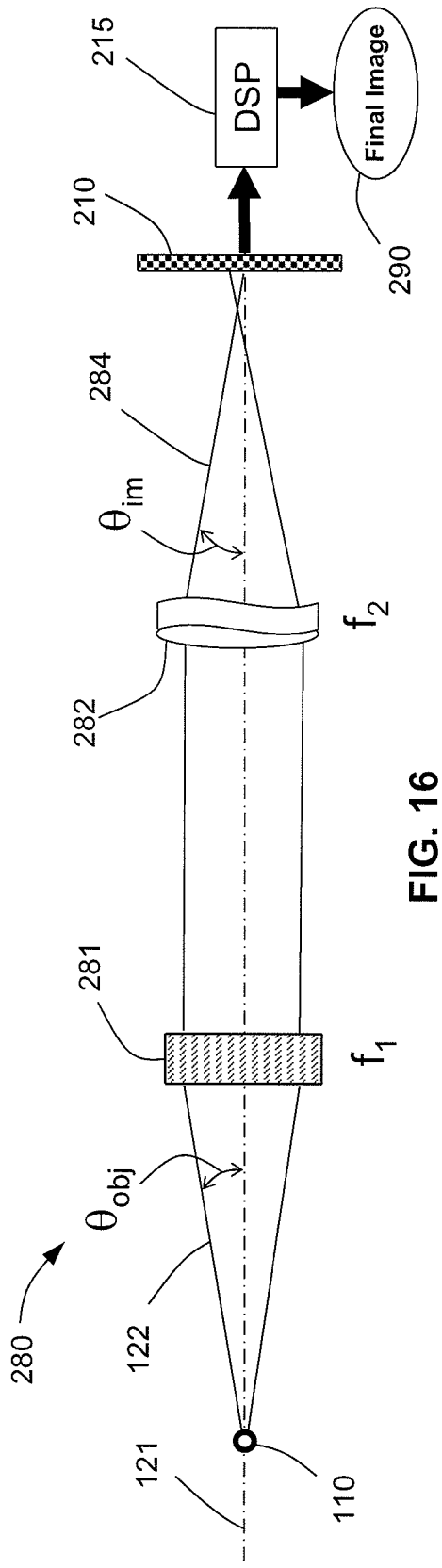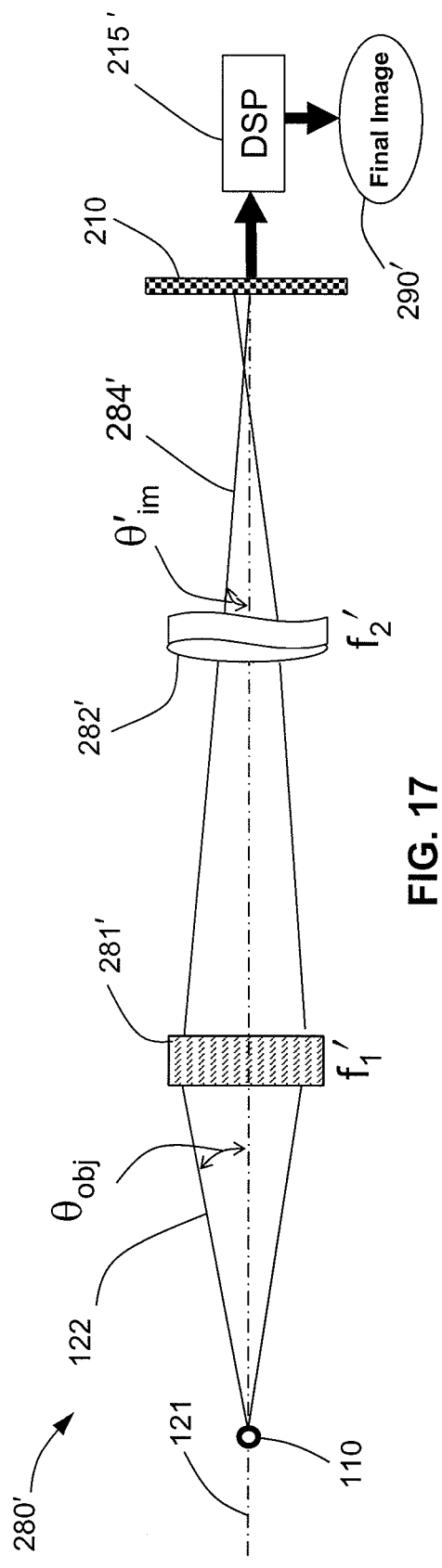

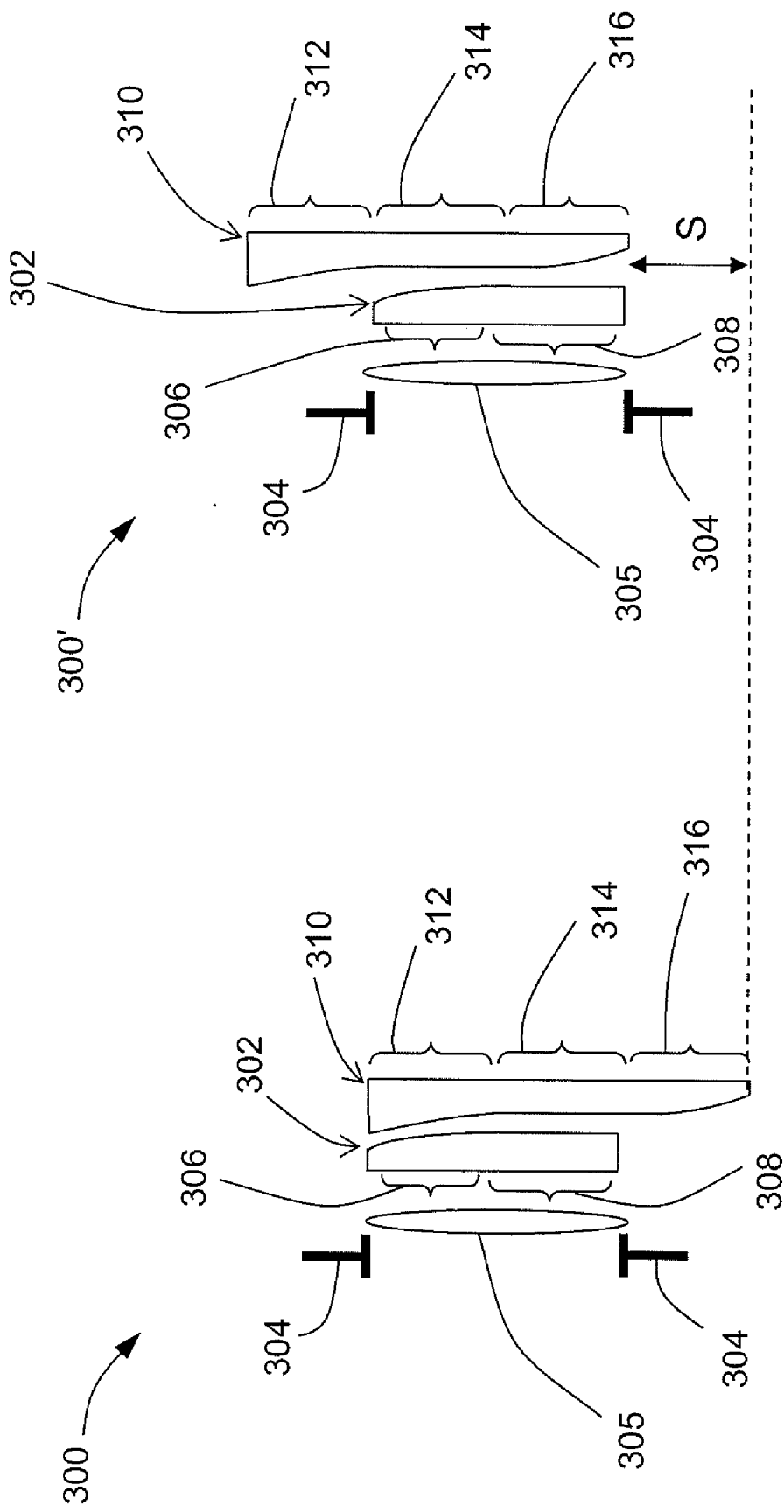

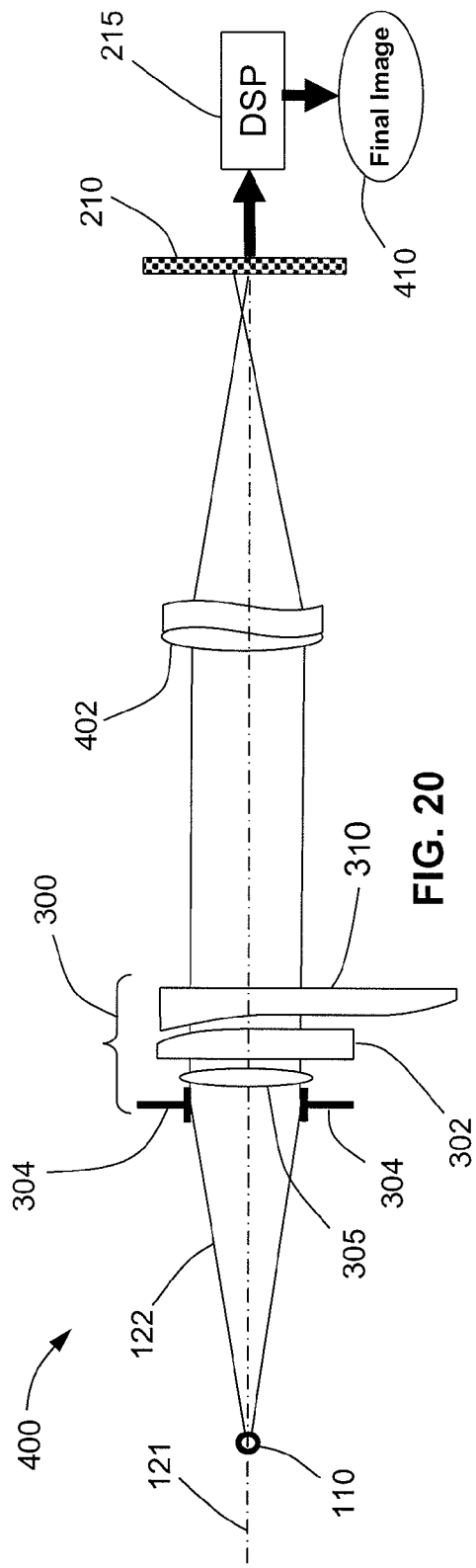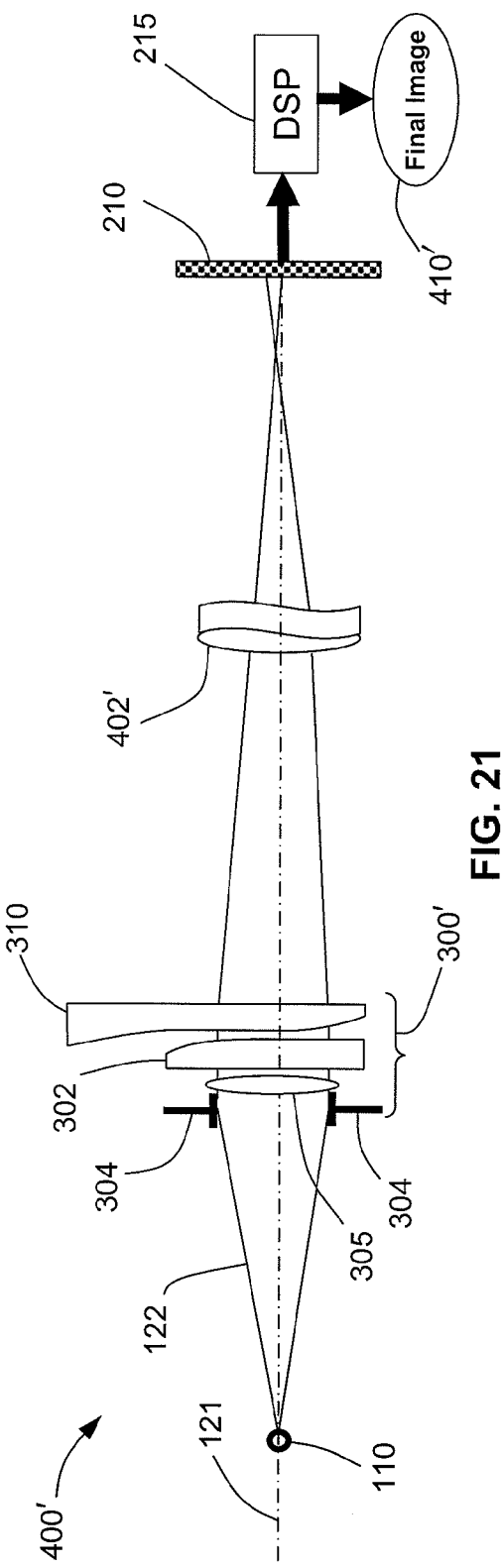

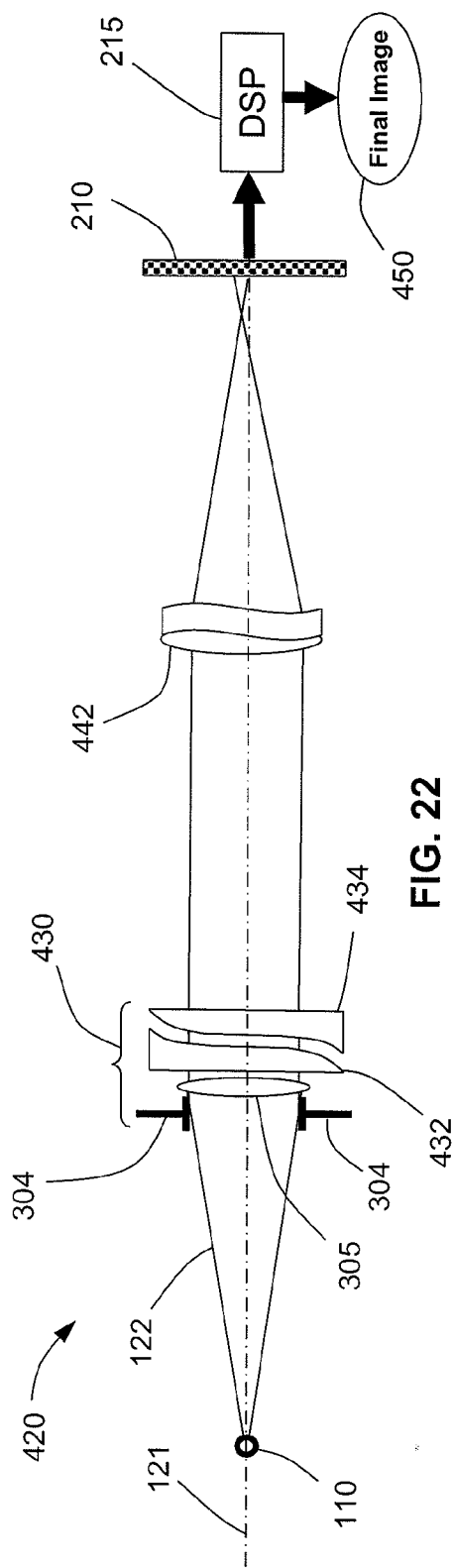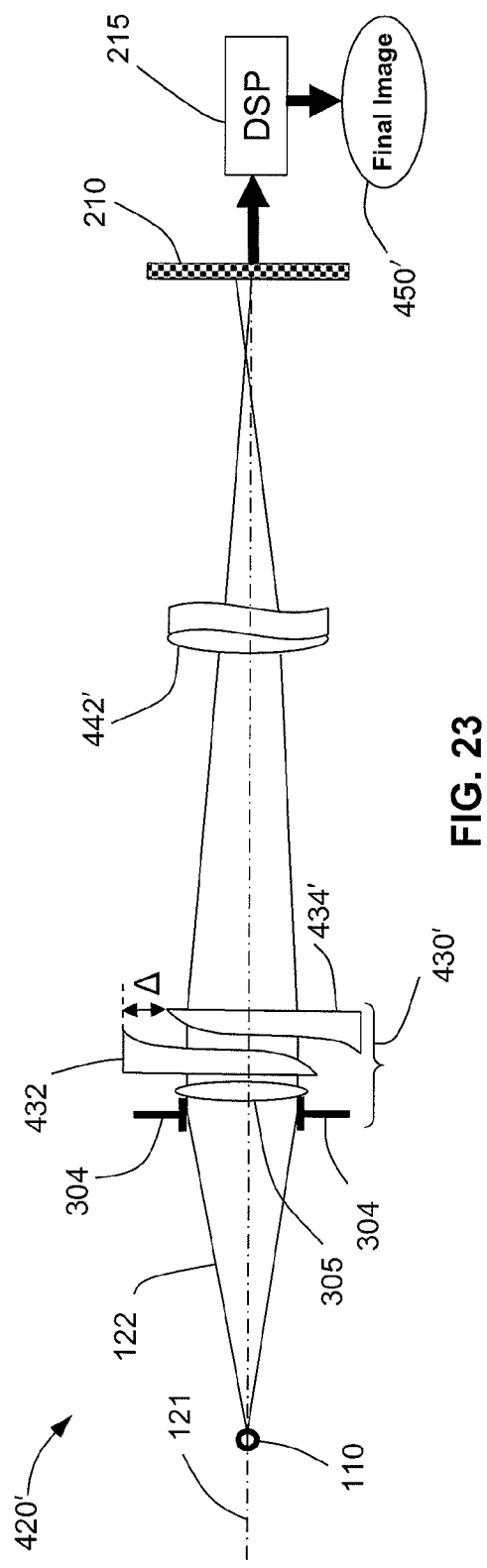

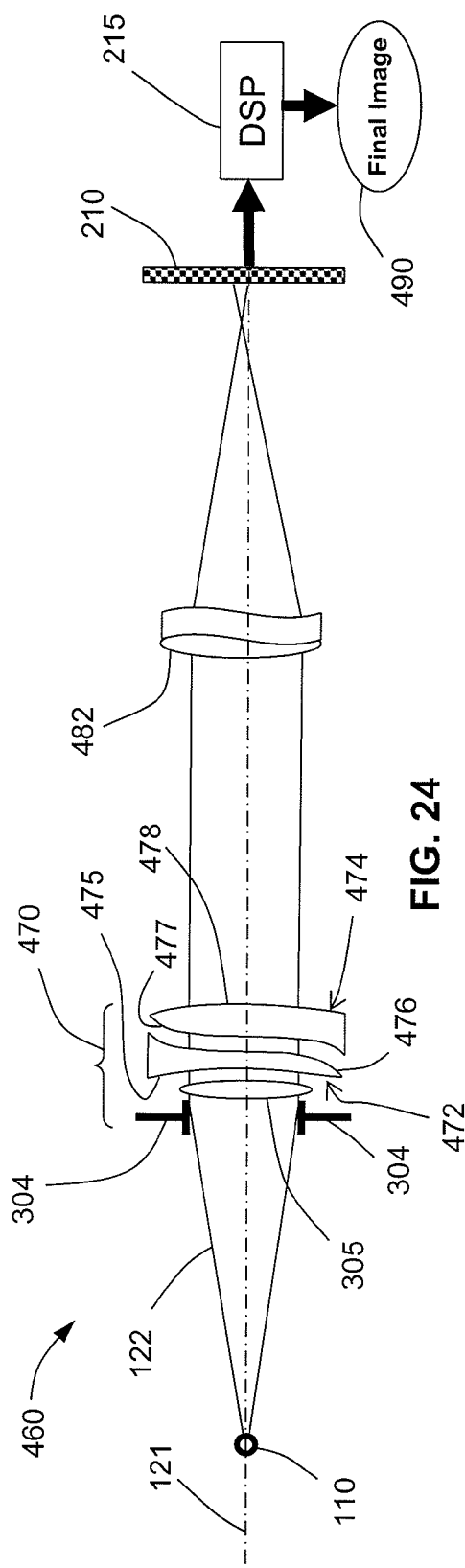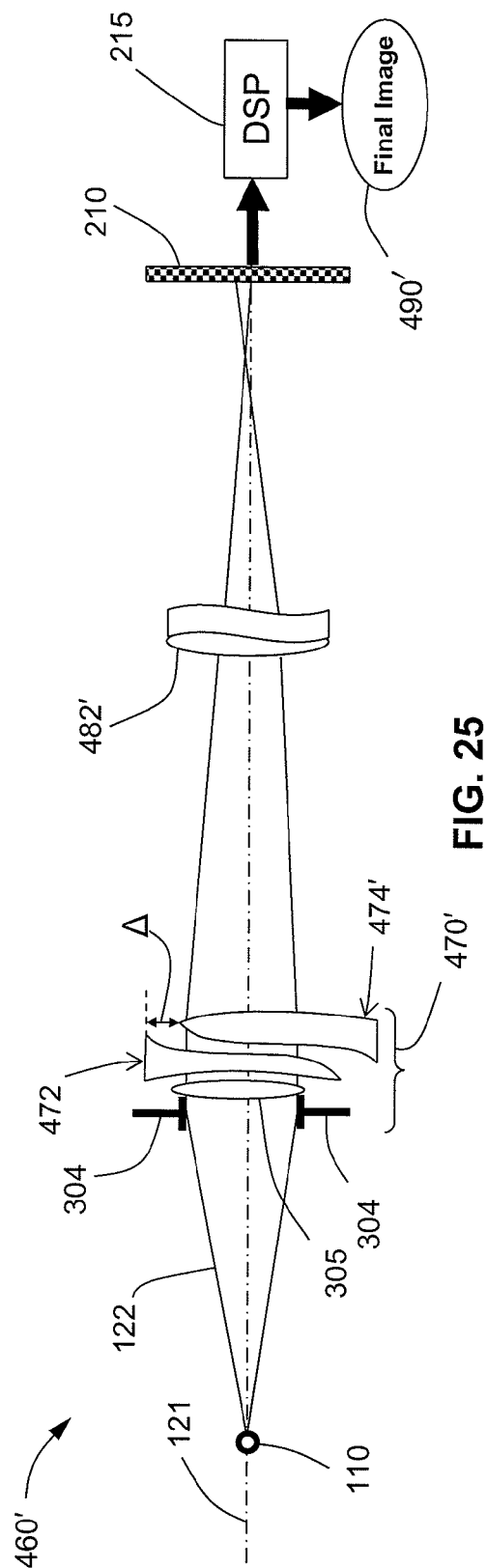

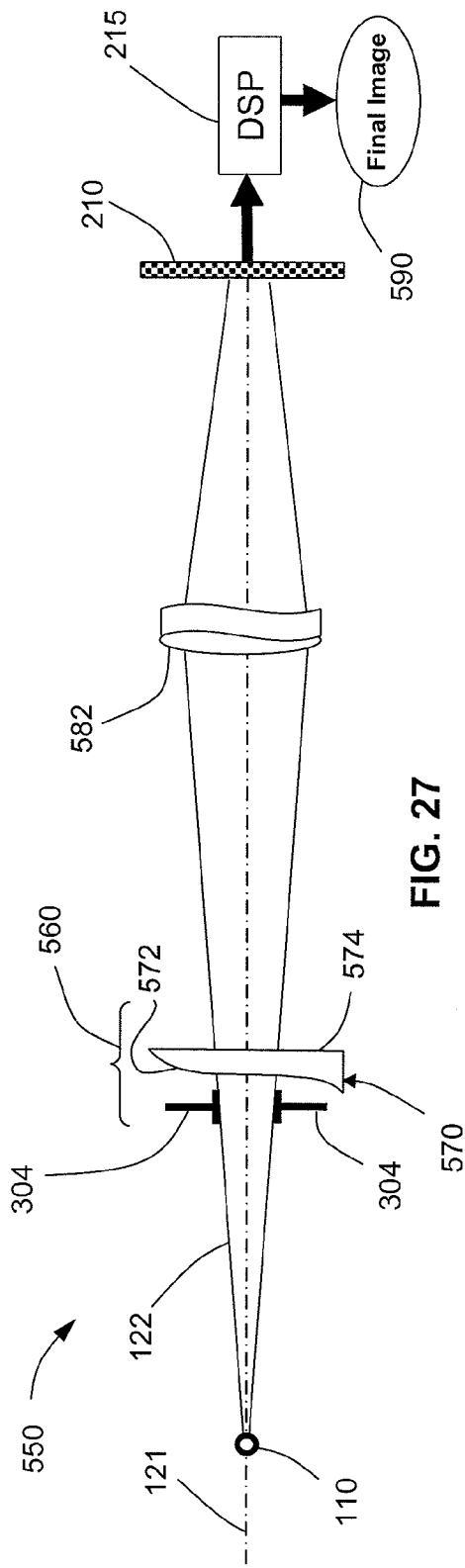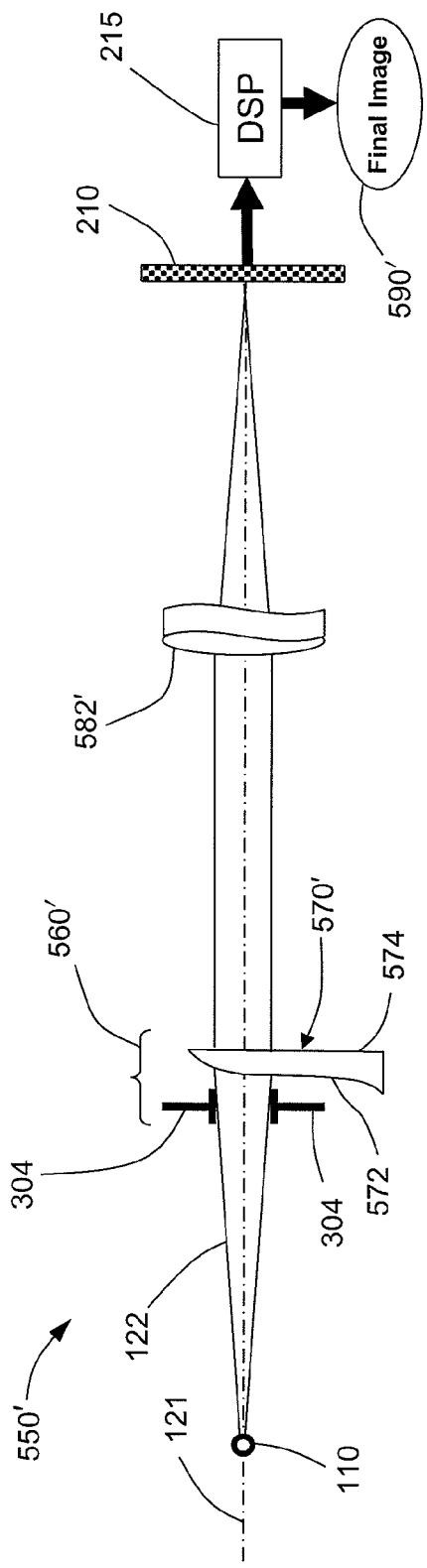

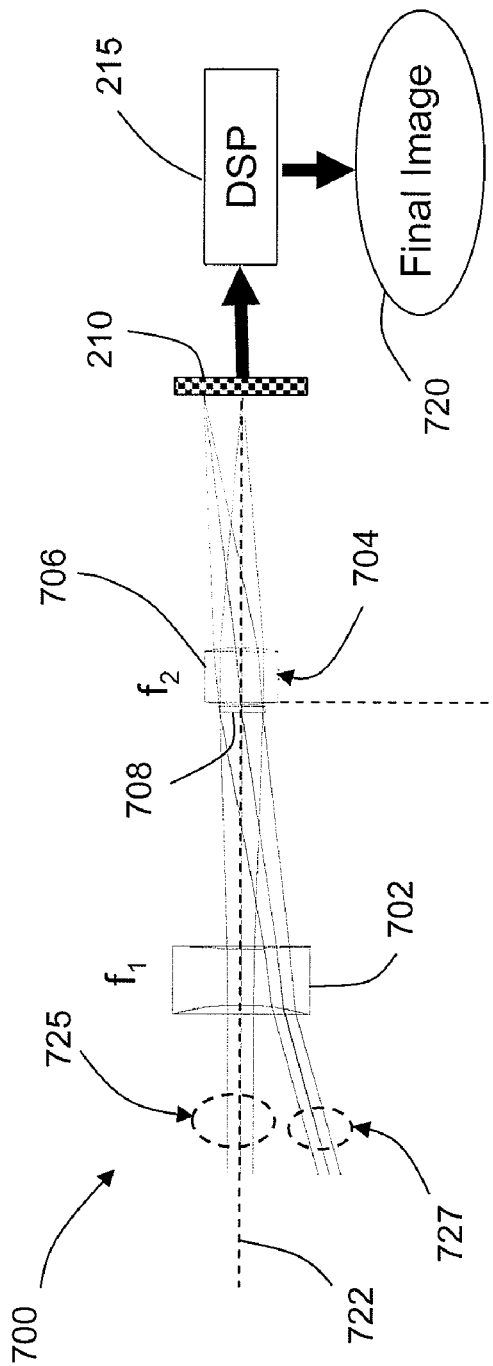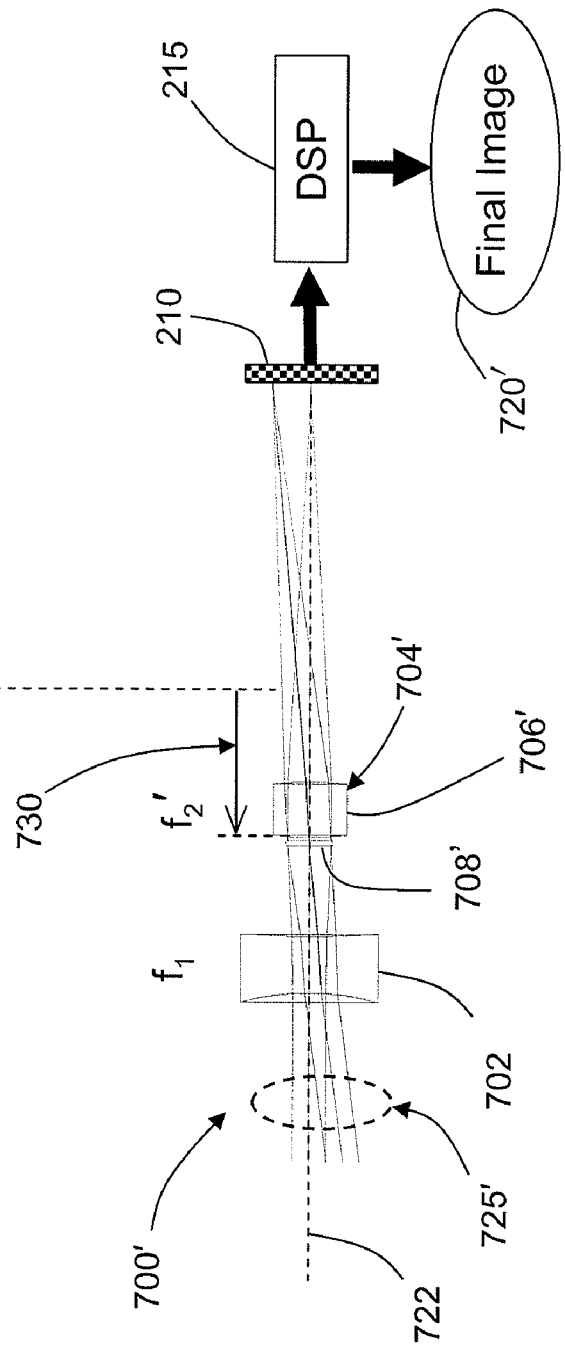

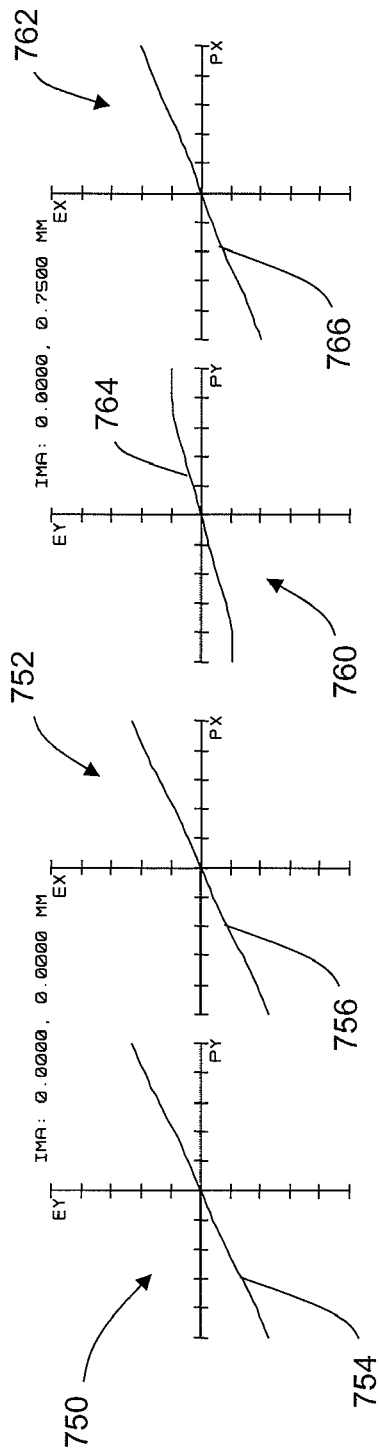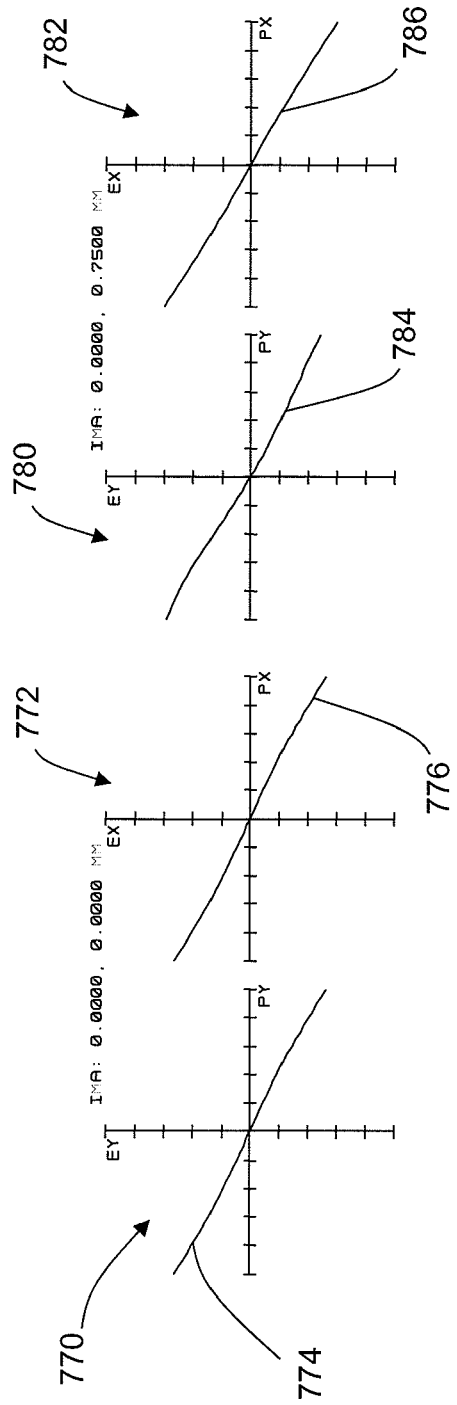
FIG. 33
FIG. 34
FIG. 35
FIG. 36

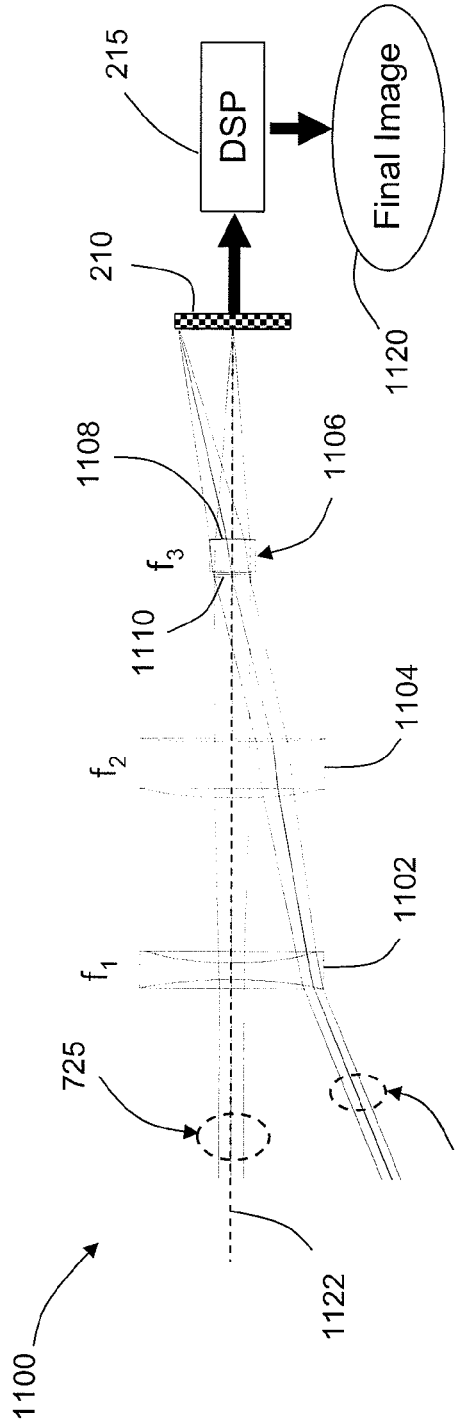
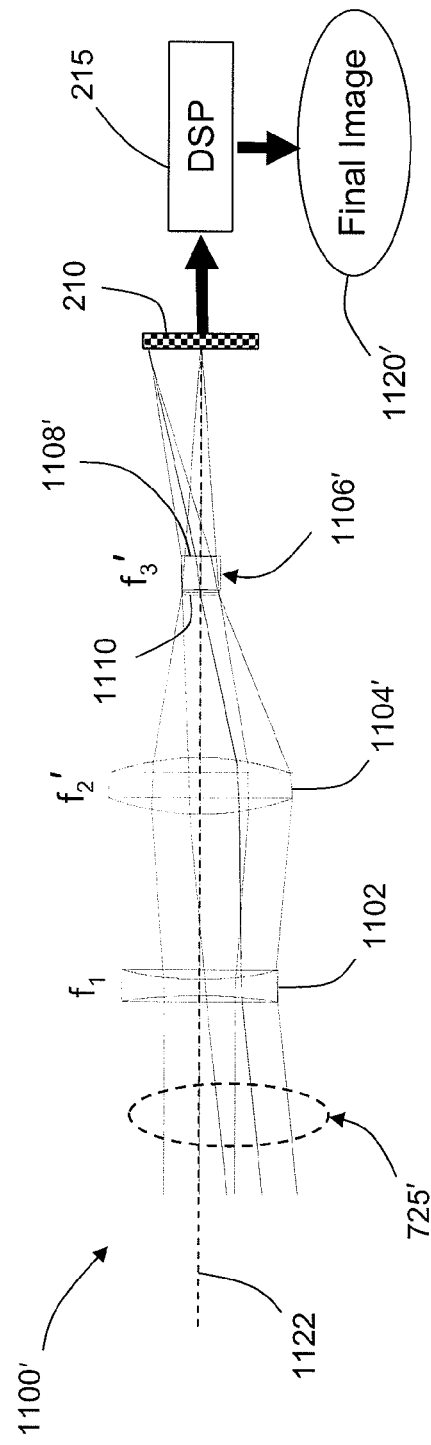
FIG. 44
FIG. 45

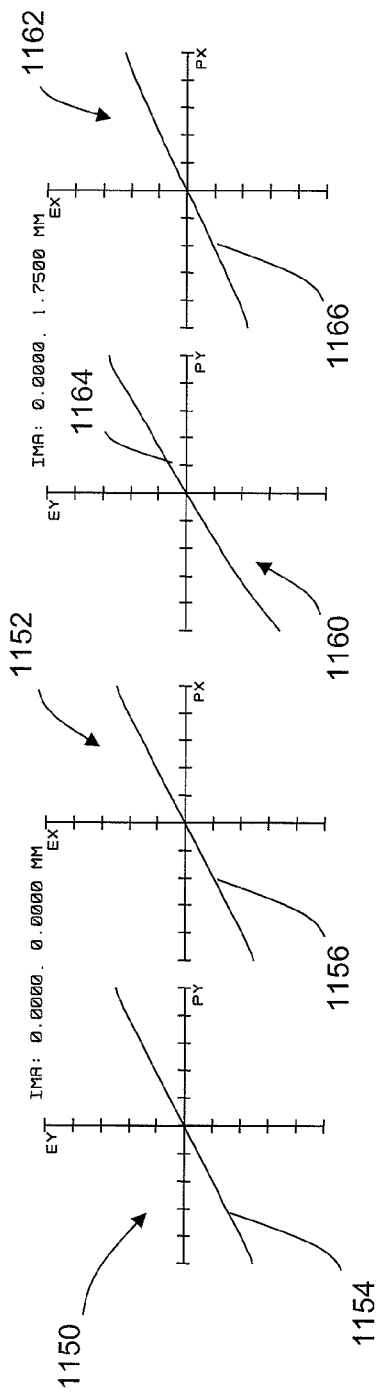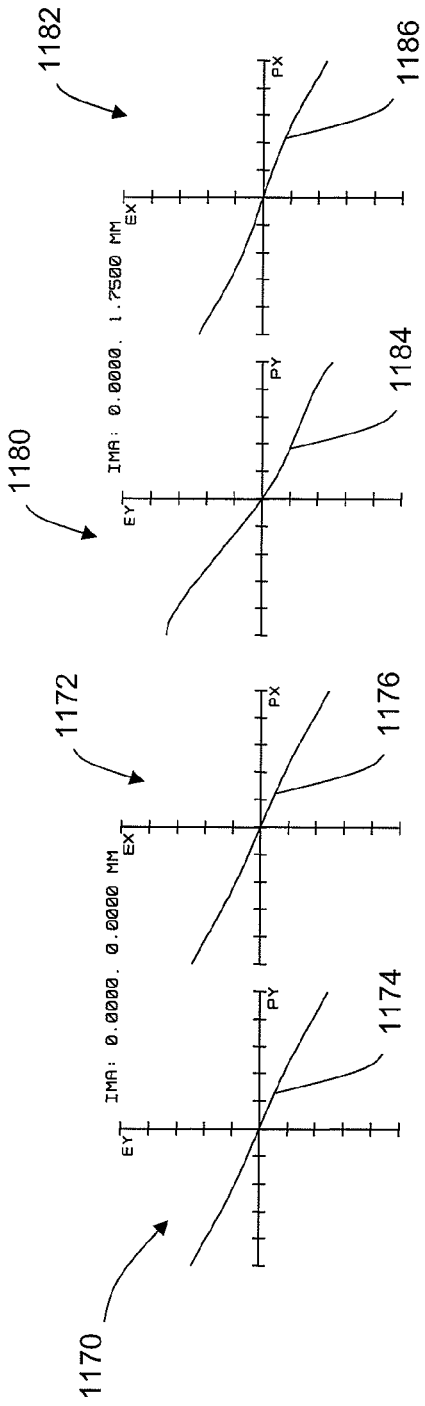
FIG. 46　FIG. 47　FIG. 48　FIG. 49

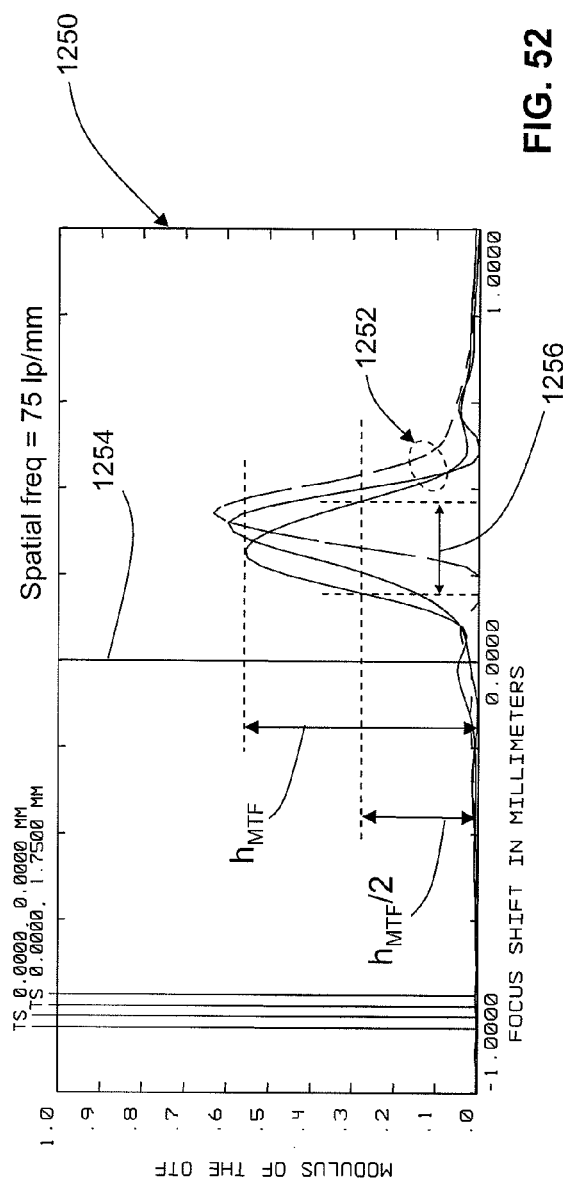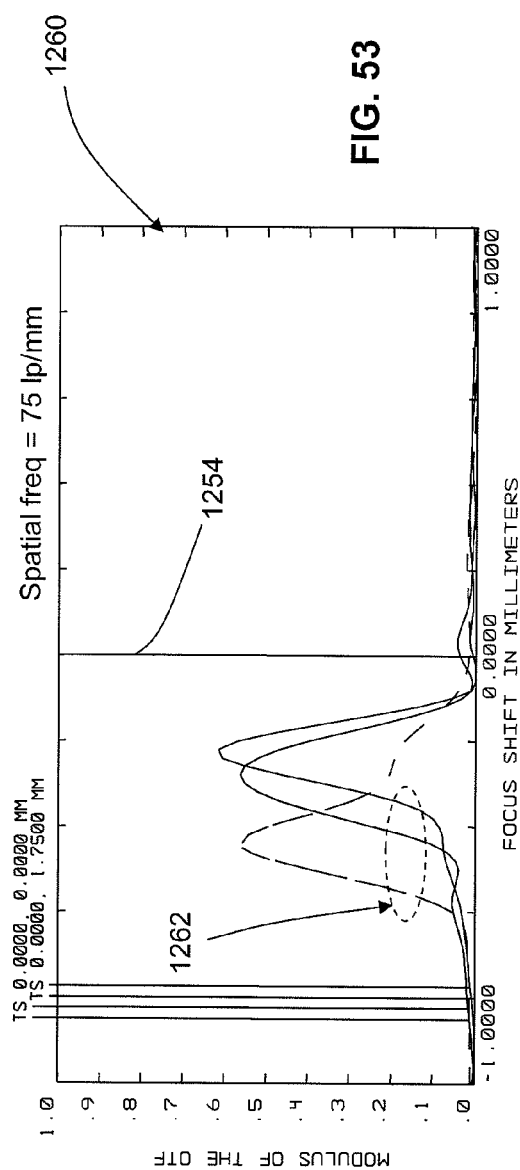
FIG. 52
FIG. 53

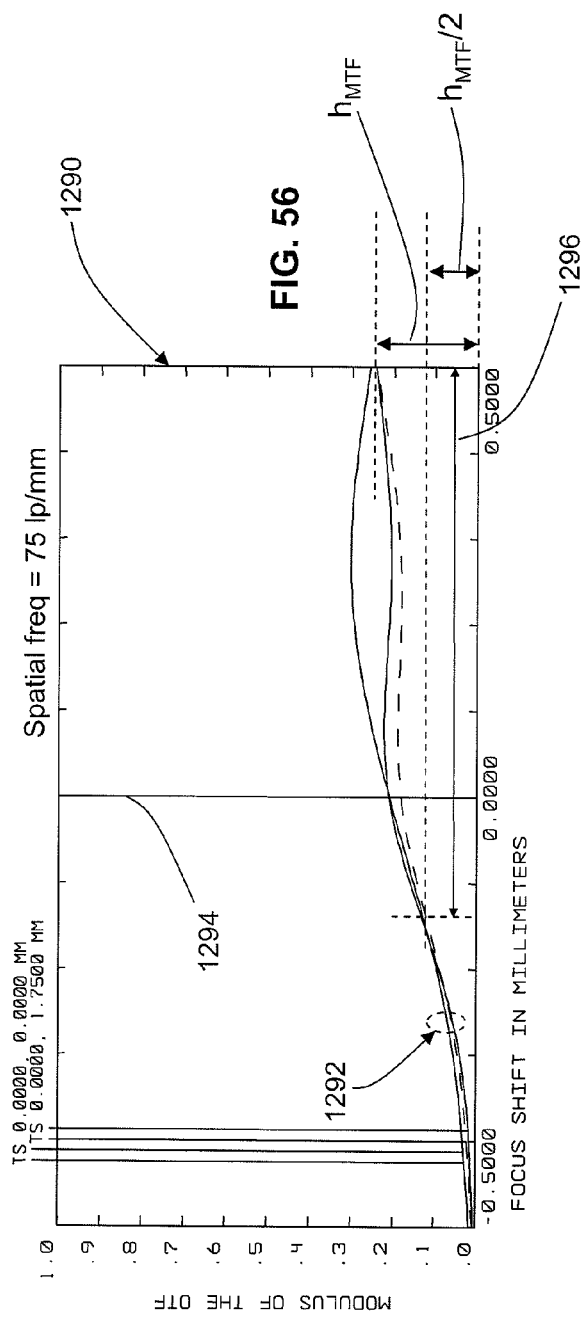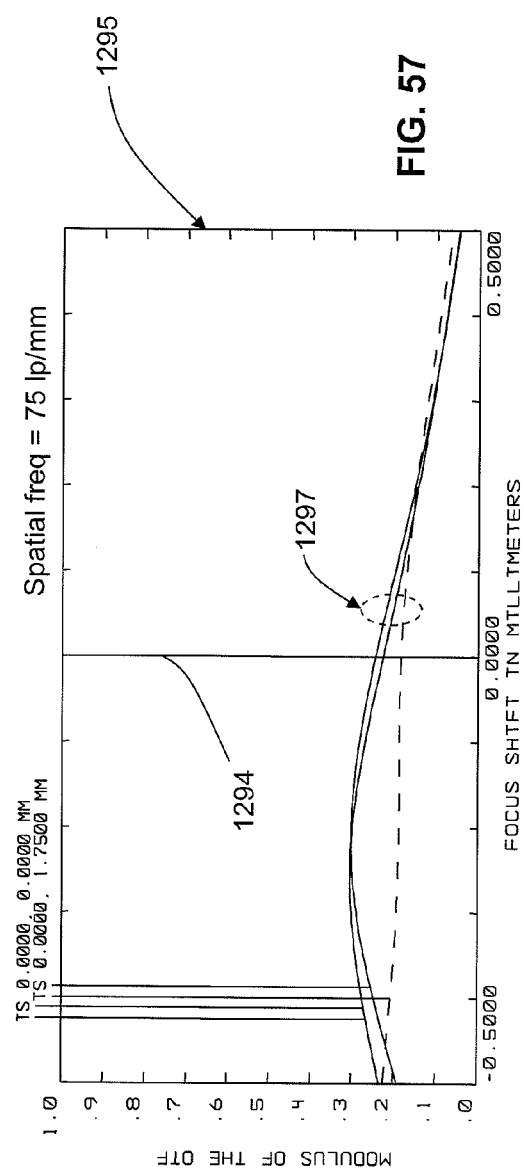

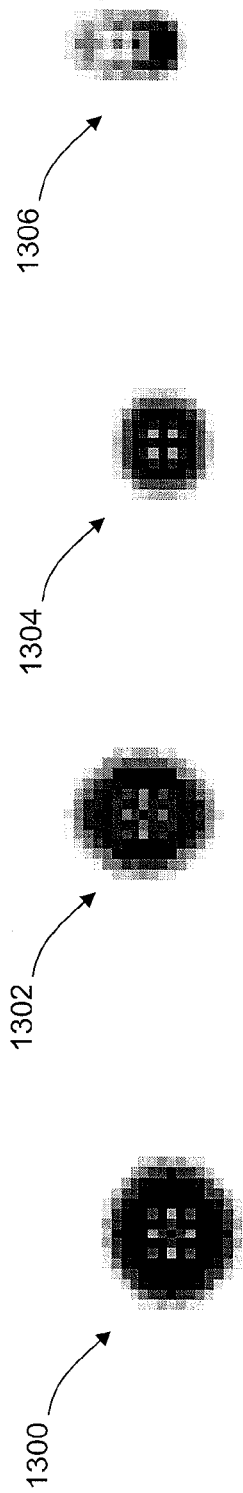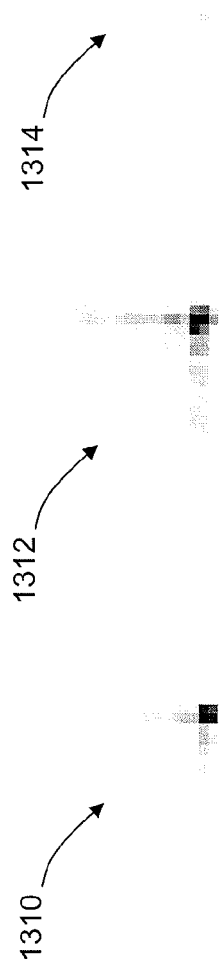

ZOOM LENS SYSTEMS WITH WAVEFRONT CODING

CROSS-REFERENCE TO RELATED APPLICATIONS

This application claims the benefit of priority to U.S. Provisional Patent Application No. 60/779,712 filed 6 Mar. 2006 and entitled "Zoom Lens Systems With Wavefront Coding", which is expressly incorporated herein by reference in its entirety.

BACKGROUND OF THE INVENTION

Modern zoom lens systems differ from traditional zoom lens systems in that changes in the imaging system are not achieved through motion of optical elements along an optical axis. Rather, the optical properties of particular optical elements in modern zoom systems change through application of voltage, pressure, translation or rotations in planes that are not parallel to the optical axis. One example of the use of variable optical elements in a modern zoom lens system is replacing one lens in the traditional zoom lens system with a variable optical lens at the same physical location.

However, modern zoom lens systems that vary through changes in optical properties of one or more optical elements may introduce aberrations that act to limit imaging performance. These aberrations may worsen as the number of optical elements in the imaging system decreases. Aberrations that may limit the performance of these modern zoom systems include, for example, image curvature, chromatic aberration, spherical aberration, astigmatism, coma, and fabrication, assembly and temperature related aberrations.

Turning now to the drawings, wherein like components are indicated by like reference numbers throughout the various figures, FIGS. 1 and 2 illustrate an example of a prior art, four group traditional zoom lens system. In this traditional zoom lens system, movement of optical elements is generally parallel to an optical axis of the system. In a configuration 10 of the traditional zoom lens system as shown in FIG. 1, a combination of first through fourth optical elements 12, 14, 16 and 18 having focal lengths $f_1$, $f_2$, $f_3$ and $f_4$, respectively, is configured to form a sharp image at an image plane 20. A dashed line indicates an optical axis 21 of configuration 10. A marginal ray 22 entering configuration 10 of the traditional zoom lens system is focused at the intersection of image plane 20 and optical axis 21.

Continuing to refer to FIG. 1, first and second optical elements 12 and 14 may generally be considered as controlling the magnification of the traditional zoom lens system in configuration 10, while third and fourth optical elements 16 and 18 may generally be considered as controlling the location of image plane 20. Optical element 14 may be referred to as a "variator lens" or a "variator," defined as an optical subsystem that controls magnification. Optical element 16 may be called a "compensator," defined as an optical subsystem that controls focus. In some cases, particularly in zoom lens systems formed of a small number of optical elements, a given subsystem may simultaneously act as a variator and a compensator.

In FIG. 2, in an alternative configuration 10' of the traditional zoom lens system, second optical element 14' (e.g., the variator) is moved away from first optical element 12 along optical axis 21 and towards image plane 20, as indicated by an arrow 24, so as to effect a magnification change. In order to keep image plane 20 at a fixed location relative to fourth optical element 18, third optical element 16' (e.g., the compensator) is also moved towards image plane 20 along optical axis 21, as indicated by an arrow 26. Through a combination of both of these motions, magnification of alternative configuration 10' of the traditional zoom lens system is altered from that of configuration 10 shown in FIG. 1, while the image plane location remains fixed. In other words, a marginal ray 28, which enters closer to the edge of first optical element 12 than marginal ray 22 of FIG. 1, may now focus at the intersection of image plane 20 with optical axis 21.

As illustrated in FIGS. 1 and 2, the movement of the variator and the compensator in prior art, traditional zoom lens systems requires space along the optical axis. That is, no other optical element may be located within a space through which second optical element 14 must move to form configuration 10', for example. A similar requirement for space is common to traditional zoom lens systems that require movement of optical elements along the optical axis; consequently, it may be difficult to reduce length of traditional zoom lens systems along the optical axis.

Modern zoom lens systems may reduce or eliminate the need for physical movement of optical elements along the optical axis, thus reducing overall length of the system as compared to traditional zoom lens systems. However, limitations of these modern zoom lens systems inhibit further improvements in imaging quality, size and cost. For example, currently available modern zoom lens systems require at least two actuated or variable elements to vary magnification and focus simultaneously. Also, certain modern zoom lens systems require an actuated system to control focus, which requires a certain number of elements to vary in order to keep the image in focus.

SUMMARY

The present disclosure provides a zoom lens system for imaging incoming rays over a range of ray angles. The incoming rays are characterized by at least phase. The zoom lens system includes an optical axis and is characterized by a plurality of modulation transfer functions (MTFs) corresponding at least to the range of ray angles. The zoom lens system includes an optical group disposed along the optical axis, including at least one variable optical element that has a variable focal length selectable between at least two distinct focal length values. The optical group also includes a wavefront coding element. The wavefront coding element alters at least the phase of the incoming rays, such that the plurality of MTFs corresponding to the range of ray angles, for each one of the two distinct focal length values, are less sensitive to misfocus-like aberrations than the same zoom lens system without the wavefront coding element.

In one embodiment, a method for use in a zoom lens system images incoming rays over a range of ray angles. The incoming rays include at least phase. The zoom lens system includes an optical axis and at least one variable optical element that has a variable focal length selectable between at least two distinct focal length values. The zoom lens system is characterized by a plurality of modulation transfer functions (MTFs) corresponding at least to the range of ray angles and the two distinct focal length values. The method includes modifying the phase of the incoming rays, such that the plurality of MTFs corresponding to the range of ray angles, for each one of the at least two distinct focal length values, are substantially similar in shape and in magnitude.

In one embodiment, a zoom lens system includes an optical axis. The zoom lens system also includes an optical group disposed along the optical axis. The optical axis, in turn, includes at least one variable optical element exhibiting a variable focal length selectable between at least two distinct focal length values and a wavefront coding (WFC) element. The at least one variable optical element is not translatable along the optical axis. The optical group is also characterized by a plurality of modulation transfer function (MTFs) corresponding to the range of ray angles and the at least two distinct focal length values, and the variable optical element and the WFC element are configured to cooperate with each other such that the plurality of MTFs are substantially similar in shape and in magnitude.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

FIG. 3 is a diagrammatic illustration of one configuration of a prior art, modern zoom lens system including modern, variable optics.

FIG. 4 is a diagrammatic illustration of an alternative configuration of the prior art, modern zoom lens system of FIG. 3.

FIG. 5 is a diagrammatic illustration of one configuration of another example of a prior art, modern zoom lens system including modern, variable optics.

FIG. 6 is a diagrammatic illustration of an alternative configuration of the prior art, modern zoom lens system of FIG. 5.

FIG. 7 is a diagrammatic illustration of a prior art, traditional two lens imaging system, shown here to illustrate the curvature of the image plane in a case where the two lenses exhibit unequal focal lengths and indices of refraction.

FIG. 8 is a diagrammatic illustration of an alternative, prior art, traditional two lens imaging system, shown here to illustrate the flattening of the image plane in cases where the two lenses are selected to exhibit equal indices of refraction and focal lengths that are the negative of each other.

FIGS. 9 and 10 are diagrammatic illustrations of still another prior art, traditional two lens imaging system, shown here to illustrate the variation in chromatic aberration exhibited by such a system depending on lens parameter selections.

FIGS. 11-13 are diagrammatic illustrations of one embodiment of a zoom lens system that utilizes a combination of variable optics with a wavefront coding compensator.

FIGS. 14 and 15 are diagrammatic illustrations of another embodiment of a zoom system that utilizes a liquid lens variator in combination with a wavefront coding compensator.

FIGS. 16 and 17 are diagrammatic illustrations of still another embodiment of a zoom lens system that utilizes a liquid crystal variator in combination with a wavefront coding compensator.

FIGS. 18 and 19 are diagrammatic illustrations of an optical arrangement for providing variable optical power by the use of a slidable optical element configuration, in accord with an embodiment.

FIGS. 20 and 21 are diagrammatic illustrations of another embodiment of a zoom lens system that utilizes the optical arrangement of FIGS. 18 and 19 in combination with a wavefront coding compensator.

FIGS. 22 and 23 are diagrammatic illustrations of yet another embodiment of a zoom lens system that utilizes a plano/aspheric sliding variator in combination with a wavefront coding compensator.

FIGS. 24 and 25 are diagrammatic illustrations of another embodiment of a zoom lens system that utilizes an aspheric/aspheric sliding variator in combination with a wavefront coding compensator.

FIGS. 27 and 28 are diagrammatic illustrations of another embodiment of a zoom lens system that utilizes a sliding single group variator in combination with a wavefront coding compensator.

FIGS. 31 and 32 are diagrammatic illustrations of two configurations of a two-group zoom lens system with wavefront coding, in accordance with an embodiment.

FIGS. 33-36 are graphical plots of ray intercept curves corresponding to the configurations shown in FIGS. 31 and 32 but calculated without including the effects of wavefront coding and signal processing.

FIGS. 44 and 45 are diagrammatic illustrations of two configurations of a three-group zoom lens system with wavefront coding, in accordance with an embodiment.

FIGS. 46-49 are graphical plots of ray intercept curves corresponding to the configurations of FIGS. 44 and 45 but calculated without including effects of wavefront coding and signal processing.

FIGS. 52 and 53 are graphical plots of calculated modulation transfer functions as a function of focus shift corresponding to on-axis and off-axis rays imaged through the configurations of FIGS. 44 and 45, but not including wavefront coding and signal processing, for a specific spatial frequency value.

FIGS. 56 and 57 are graphical plots of calculated modulation transfer functions as a function of focus shift corresponding to on-axis and off-axis rays imaged through the configurations of FIGS. 44 and 45 for a specific spatial frequency value, this time including the effects of wavefront coding.

FIGS. 58-69 are calculated point spread functions corresponding to on- and off-axis rays imaged through the configurations of FIGS. 44 and 45 without and with the effects of wavefront coding and signal processing.

DETAILED DESCRIPTION OF THE INVENTION

Figures 1, 2:
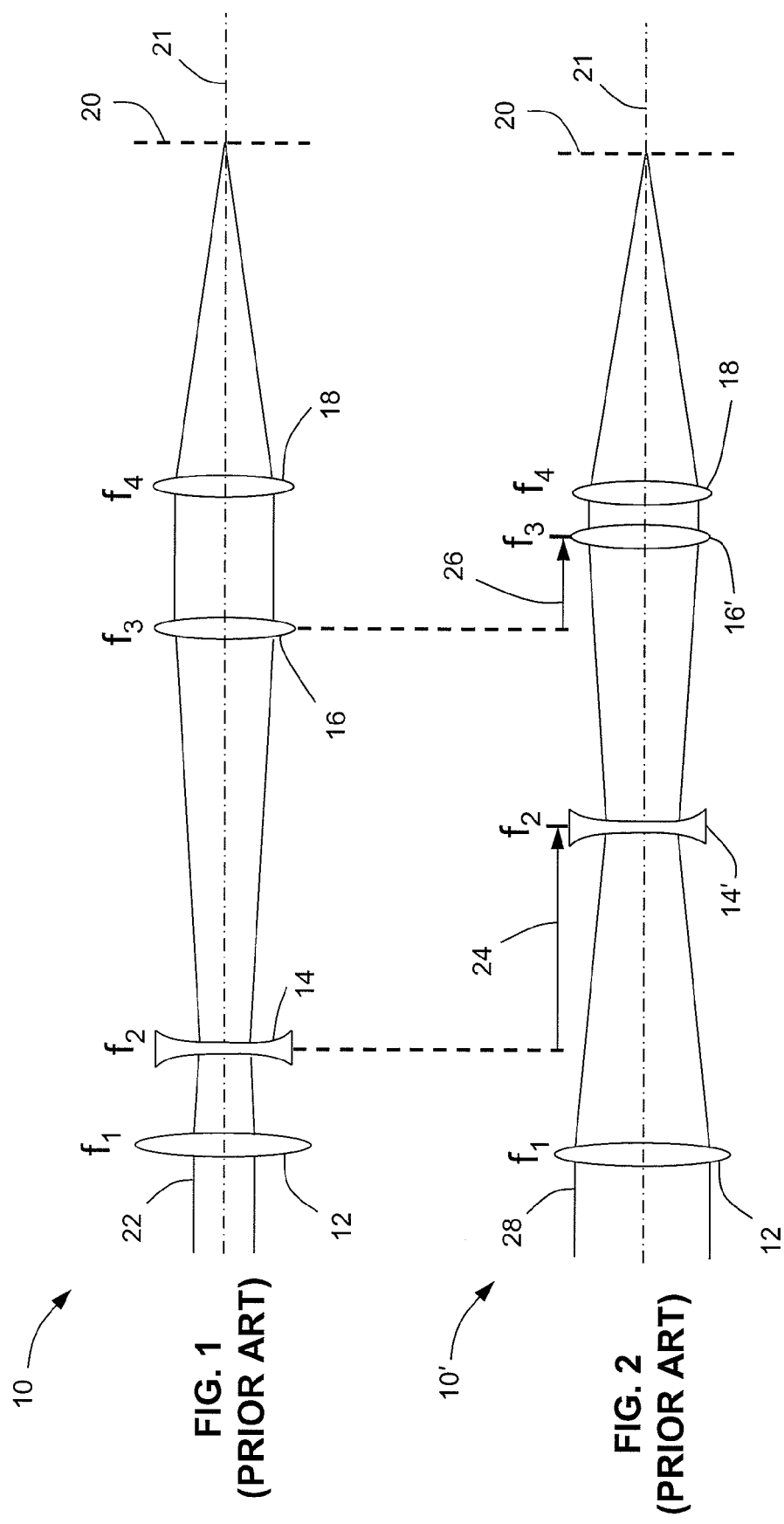
FIG. 1 is a diagrammatic illustration of one configuration of a prior art, traditional zoom lens system including traditional optics.
FIG. 2 is a diagrammatic illustration of an alternative configuration of the prior art, traditional zoom lens system of FIG. 1.

In the present disclosure, "zoom lens system" and "zoom imaging system" are used interchangeably, and "variable optical element" is intended to encompass optical elements with optical properties (such as, but not limited to, focal length, transmittance, and refractive index) that are modifiable by using techniques such as (but not limited to) application of voltage and/or pressure to one or more of the optical elements, and translation and/or rotation of one or more of the optical elements.

The use of certain aspheric optics and signal processing may provide improvements to modern zoom lens systems by mitigating certain limitations. The present disclosure concerns the use of certain aspheric optics to improve the performance, cost, and size of modern zoom lens imaging systems. Such optics and signal processing of the detected blurred images, may reduce or eliminate the effects of certain aberrations. Systems utilizing such aspheric optics and signal processing for wavefront coding are, for example, described in U.S. Pat. No. 5,748,371 (hereinafter, the '371 patent), U.S. Pat. No. 6,873,733 (hereinafter, the '733 patent), U.S. Pat. No. 6,842,297 (hereinafter, the '297 patent), U.S. Pat. No. 6,911,638 (hereinafter, the '638 patent), and U.S. Pat. No. 6,940,649 (hereinafter, the '649 patent), each of which is incorporated herein by reference. The addition of wavefront coding to zoom lens systems may eliminate need for an actuated system to control focus, thereby further reducing the number of elements that need to be varied and, consequently, also reducing the cost and size of such zoom lens systems. It is desirable to achieve a robust zoom lens system with high reliability, low cost, reduced mechanical tolerances, reduced power consumption and reduced sensitivity to environmental factors, such as thermally induced variations and chromatic dependence.

As a simple example of a modern zoom imaging system, consider a two group imaging system illustrated in FIG. 3 and FIG. 4. This imaging system has two configurations shown by the two figures. In a configuration 100 shown in FIG. 3, an object 110 is imaged by optical groups 111 and 112 onto an image plane 120. Each one of optical groups 111 and 112 includes, for example, one or more of refractive elements, diffractive elements, holographic elements, and variable optics. A detector (not shown) is located at image plane 120 to detect the imaged object. When object 110 is located on an optical axis 121 of the imaging system (indicated by a dashed line), light rays from object 110 that pass between optical groups 111 and 112 are substantially parallel, as shown. In this case, a focal length $f_1$ of optical group 111 is equal to a distance D1 (indicated by a double-headed arrow) between object 110 and a first principal plane 125 of optical group 111. Similarly, a focal length $f_2$ of optical group 112 is equal to a distance D2 between image plane 120 and a second principal plane 127 of optical group 112.

FIG. 4 shows an alternative configuration 100' of the two group imaging system. In configuration 100' of FIG. 4, object 110' is at a different position relative to an optical group 111' than the position of object 110 relative to optical group 111 in FIG. 3. The position of object 110' requires a change in focal length of optical group 111' in order to clearly image object 110' onto image plane 120 if optical group 112 is the same in FIG. 4 as in FIG. 3. In this case, a focal length $f_1'$ of optical group 111' should be equal to a distance D1' between object 110' and first principal plane 125 of optical group 111'.

Still referring to FIG. 3 and FIG. 4, marginal rays from objects 110 and 110', respectively, are denoted as 122 and 122'. Marginal rays at the image plane in the configurations of FIGS. 3 and 4 are denoted as 123. An overall magnification of the two group imaging system is given by the ratio of a marginal ray angle at the object ($\theta_{obj}$) to a marginal ray angle at the image plane ($\theta_{im}$) as measured from optical axis 121. In comparing configurations 100 and 100', the marginal ray angle at the object in configuration 100' increases to $\theta'_{obj}$ from $\theta_{obj}$ while the marginal ray angle at the image $\theta_{im}$ remains fixed. As a result, magnification in configuration 100' is greater than that of configuration 100. That is, by changing one of two optical groups and changing object distance, magnification of the two group imaging system changes without changing location of an image plane.

In another situation shown in FIGS. 5 and 6, object location does not change. In a configuration 150 of a zoom imaging system of FIG. 5, optical groups 151 and 152 image object 110. Optical group 151 acts as a variator, controlling optical power (e.g., magnification). Optical group 152 acts as a compensator, controlling image plane location (e.g., focus). FIG. 6 shows an alternative configuration 150' of the same zoom imaging system shown in FIG. 5, wherein the properties of optical groups 151' and 152' are different from those of optical groups 151 and 152 of FIG. 5, such that marginal ray angle $\theta_{obj}$ at the object remains unchanged while marginal ray angle $\theta'_{im}$ at the image reduces from $\theta_{im}$ of configuration 150. In other words, in configuration 150' of FIG. 6, object 110 is at the same location relative to optical group 151' as object 110 relative to optical group 151 in FIG. 5, but optical group 151' yields a reduced focal length, as indicated by the fact that marginal rays to the right of optical group 151' converge (as compared to being parallel, as shown in configuration 150 of FIG. 5). Thus, optical group 152' of FIG. 6 exhibits an increased focal length (or, alternatively, decreased optical power) in order to keep the location of image plane 120 fixed relative to the location of optical group 152' (as compared to a location of image plane 120 relative to optical group 152 in FIG. 5). As a result, the combination of variator and compensator in configuration 150' results in a focused image at image plane 120 with an increased overall magnification given by the ratio of $\theta_{obj}$ over $\theta'_{im}$ as compared to a like ratio for the configuration shown in FIG. 5. That is, the overall magnification of configuration 150' of FIG. 6 increases over that of configuration 150 shown in FIG. 5 because angle $\theta'_{im}$ of marginal ray 123' at image plane 120 decreases over the angle $\theta_{im}$ of marginal ray 123, while the angle $\theta_{obj}$ of marginal ray 122 from the object remains constant. Thus, with a change of focal length of both the variator (i.e., $f_1$ to $f_1'$) and the compensator (i.e., $f_2$ to $f_2'$), the magnification of a focused image of an object at a fixed distance changed. Notice that optical groups 151' and 152' did not change in physical location along optical axis 121 relative to object 110 and image plane 120 in FIG. 6, as compared to optical groups 151 and 152 in FIG. 5, in order to effect the change in magnification.

FIGS. 3-6 thus illustrate that changes to focal lengths of certain components in a zoom imaging system may be used to change magnification of the zoom imaging system while simultaneously keeping a resulting image in focus. The use of changes in focal length of optical elements to yield changes in magnification exemplifies the advantage of variation in modern optical elements by modifying, for instance, voltage, pressure, translation or rotation. However, the resulting focal length changes of the zoom imaging system may also affect the quality of the images produced. Optical aberrations that may degrade image quality are also affected by changes in the focal lengths. In practical examples of these zoom imaging systems, certain fundamental optical aberrations vary when focal length of the components within the zoom imaging system change. In particular, two types of fundamental optical aberrations, i.e., field or image curvature and chromatic aberration, may act as the main limitation of the performance of these zoom imaging systems.

FIGS. 7 and 8 illustrate one way in which changes in the focal length of optical elements in an exemplary zoom imaging system influences these fundamental optical aberrations. FIGS. 7 and 8 show two configurations of a traditional, two lens imaging system. The principles used to describe this system also apply to general, multi-element cases. A configuration 170 of the two lens imaging system as shown in FIG. 7 includes two optical elements 171 and 172 with respective indices of refraction $n_1$ and $n_2$. As indicated by a plurality of rays 180, an image formed by these two elements lies on a curved image surface 175. An approximation of the curvature of image surface 175 may be determined by adding an inverse focal length multiplied by index of refraction of optical elements 171 and 172, or generally:

$$\text{Curvature} = -\sum_i \frac{1}{n_i f_i},$$

where i is an integer corresponding to the optical elements, $n_i$ is the index of refraction of the i-th optical element, and $f_i$ is the focal length of the i-th optical element. Curvature of image surface 175 is undesirable in certain imaging applications.

An alternative configuration 170' of FIG. 8 describes a particular configuration of a two lens imaging system in which indices of refraction of optical elements 171' and 172' are equal (i.e., $n_1=n_2$) and focal lengths $f_1'$ and $f_2'$ of optical elements 171' and 172' are the negative of each other (i.e., $f_1'=-f_2'$). In this configuration, a curvature of an image plane 175' may be considered to be essentially zero. Configuration 170' of FIG. 8 exhibits a particular, effective focal length determined by actual focal lengths of component elements and an element separation d (indicated by a double-headed arrow). If element separation d is fixed, any change in focal length of either one of optical elements 171' and 172' from the relationship $f_1=-f_2$ will result in curvature of image plane 175'. Consequently, image quality of the two lens imaging system will decrease and will be a function of magnification or zoom position of the imaging system.

It is notable that traditional zoom lens systems such as shown in FIG. 1 require movement of optical elements along optical axis 21 without changing focal length of the individual optical elements and, therefore, do not incur a change in image curvature. An approximate curvature of image field in such traditional zoom lens systems is generally unchanged as the magnification or zoom position is varied. However, change in image curvature may occur in currently available modern zoom lens systems that do not utilize translation of optical elements along the optical axis, such as the systems illustrated in FIGS. 3-6.

Another phenomenon encountered in modern zoom lens systems that do not utilize translation of optical elements along an optical axis is variation in chromatic aberration. Change in focal length of optical elements, without translating the optical elements along the optical axis, generally changes chromatic aberration exhibited by a system, limiting system performance.

FIGS. 9 and 10 illustrate a simple example of a change in chromatic aberration with change in focal length of the optical elements. Although FIGS. 9 and 10 show two configurations of a two element lens, the principle involved is applicable to imaging systems with a plurality of elements that change in focal length. Referring first to FIG. 9, a configuration 190 is a two element lens system with optical elements 191 and 192 in close proximity (e.g., distance between optical elements 191 and 192 is essentially zero). Optical elements 191 and 192 exhibit different focal lengths and, in general, different Abbe or V numbers. As is well known, the V number of a particular optical material describes a change in index of refraction as a function of wavelength for that optical material. The parameters of optical elements 191 and 192 are generally chosen such that a monochromatic image forms at a best focus image plane; however, due to chromatic dependence of the refractive index value of a given material (i.e., variation in refractive index with wavelength), a location of best focus will be a function of wavelength used to form the image. This effect is commonly called chromatic aberration. In FIG. 9, light 193 includes red illumination 195 and blue illumination 197. A best focused image formed with red illumination 195 may be at a red image plane 196, while a best focused image formed with blue illumination 197 may be at a different, blue image plane 198. Since index of refraction of a given material is generally a function of wavelength, focal length of individual optical elements may also be functions of wavelength. A change $\Delta f$ in effective focal length for a given set of optical elements with wavelength may be approximated by a sum of focal length of each optical element divided by its respective V number:

$$\Delta f = \left(\frac{f_1}{V_1} + \frac{f_2}{V_2}\right).$$

An alternative configuration 190' shown FIG. 10 illustrates a case where focal lengths and V numbers of optical elements 191' and 192' are selected such that a ratio of focal lengths to V numbers of optical elements 191' and 192' are negatives of each other (i.e., $f_1'/V_1'=-f_2'/V_2'$). For this choice of parameters, the change $\Delta f$ in effective focal length of the set of optical elements, with wavelength (over a wavelength region where the respective V numbers are valid), is approximately zero. Thus, an effective focal length of the set of optical elements may be made approximately independent of wavelength through selection of focal lengths and V numbers, so that both red illumination 195' and blue illumination 197' focus at image plane 198'. However, changing focal lengths of the optical elements in configuration 190' (e.g., to change overall magnification of arrangement 190') in unequal proportion may make Δf nonzero, and therefore may reintroduce chromatic aberration such that both red illumination 195' and blue illumination 197' no longer focus at image plane 198'. In other words, modern zoom lens systems based on variation of focal lengths of one or more optical elements therein may exhibit variation in chromatic aberration when magnification changes, and provide accordingly reduced image quality.

The image degradation issues illustrated in FIGS. 7 through 10, as well as other aberrations, may be ameliorated by utilizing wavefront coding, as now described.

The zoom systems described in the present disclosure image incoming rays over a range of ray angles. These incoming rays are characterized by at least phase that form the wavefront imaged by the zoom system. Each zoom lens system operates with an optical axis and is characterized by a plurality of modulation transfer functions (MTFs) corresponding at least to the range of ray angles. In each zoom lens system, an optical group is disposed along the optical axis, and includes at least one variable optical element that has a variable focal length selectable between at least two distinct focal length values. The optical group also includes a wavefront coding element. The wavefront coding element alters at least the phase of the incoming rays, such that the plurality of MTFs corresponding to the range of ray angles, for each one of the two distinct focal length values, are less sensitive to misfocus-like aberrations than the same zoom lens system without the wavefront coding element. The MTF corresponding to each of the ray angles, for each one of the at least two distinct focal length values, is substantially similar in shape and in magnitude.

One embodiment of a zoom lens system with wavefront coding is illustrated in FIGS. 11 and 12. Referring first to FIG. 11 in conjunction with FIG. 5, in a configuration 200, object 110 is imaged by optical group 151, acting as a variator, and a wavefront coding (WFC) compensator 202. In configuration 200 (as in configuration 150 of FIG. 5), light from object 110, with marginal rays 122, travels through optical group 151 toward WFC compensator 202. Light traveling through optical group 151 includes a wavefront as well as marginal rays that are parallel to optical axis 121. WFC compensator 202 then codes the wavefront of light incident thereon such that a blurred image is formed on a detector 210. An electronic representation of the blurred image at detector 210 is directed to a digital signal processor (DSP) 215 that forms a final image 220, which is substantially insensitive to focus related aberrations. DSP 215 may be configured, for example, to remove the blur in the blurred image and/or to format the final image in a suitable manner for a particular task. For example, DSP 215 may format final image 200 for machine or for human viewing.

Referring now to FIG. 12 in conjunction with FIG. 6, a configuration 200' is shown, in which focal length of the variator is altered from that shown in configuration 200; that is, optical group 151' exhibits an altered focal length $f_1'$ and magnification of the zoom lens system is changed from that shown in configuration 200. As a result, light emerging to the right of optical group 151' includes a wavefront as well as marginal rays that are not parallel to optical axis 121, as shown. A WFC compensator 202' also acts to code the wavefront of light incident thereon such that a blurred image forms on detector 210. An electronic representation of the blurred image is further processed by DSP 215 to form a final image 220' that is essentially insensitive to focus related aberrations.

A difference between optical group 151 and optical group 151' is that this same optical group includes a variable optical element that permits change of focal length from $f_1$ to $f_1'$. A difference between WFC compensator 202 and WFC compensator 202' is that this same optical element may be configured to be variable so as to enable at least coarse adjustment of focus by, for instance, altering the focal length exhibited by the WFC compensator from $f_2$, as in configuration 200, to $f_2'$ in configuration 200'. Thus, in configurations 200 and 200' shown in FIGS. 11 and 12, respectively, both the variator and compensator are variable in order to enable adjustment of both magnification and best focus position. Wavefront coding is cooperatively used to reduce effects of focus related aberrations, such as chromatic aberration as illustrated in FIGS. 9 and 10.

Figure 13:
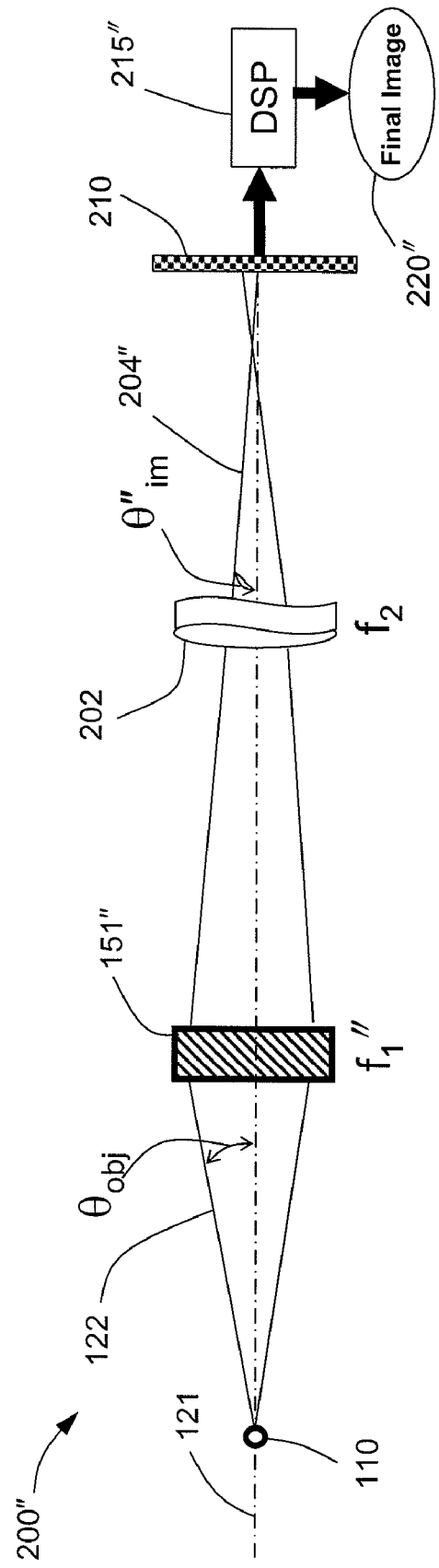

Another embodiment of a zoom lens system with wavefront coding is shown in FIG. 13. Referring to FIG. 13 in conjunction with FIGS. 11 and 12, in a configuration 200", the focal length of the variator is again changed from that shown in configuration 200 of FIG. 11; that is, optical group 151" exhibits an altered focal length $f_1"$ and magnification of the zoom lens system is changed from that shown in configuration 200. However, unlike configuration 200' of FIG. 12, WFC compensator 202 remains unchanged. Consequently, while marginal rays transmitted through WFC compensator 202 in configuration 200" are different from marginal rays 204 of configuration 200 or marginal rays 204' of configuration 200', a focus change that is needed to keep a final image 220" sharp and clear may be accomplished by the combination of fixed WFC compensator 202, detector 210, and a digital signal processor (DSP) 215". DSP 215" is, for example, programmed to perform signal processing according to the particular configuration of the zoom system. In one embodiment, DSP 215" acquires electronic feedback about the component parameters of optical group 151" and WFC compensator 202; in another embodiment, DSP 215" automatically estimates a configuration or parameters of the zoom lens system from detected images.

The examples illustrated in FIGS. 11 through 13 thus describe two classes of zoom lens systems including wavefront coding: in one class, aberrations resulting from optical element configurations are controlled by utilizing aspheric optics and signal processing of the detected images; in the other class, at least one fewer variable optical element is used to form sharp images while changing magnification, without sacrificing image quality. A focus shift that might be accomplished with the inclusion of one or more additional variable optical element is in effect provided by a fixed WFC compensator (FIG. 13) and signal processing of the resulting images. Nonetheless, both classes of such zoom lens systems may be incorporated into a single zoom lens system; that is, the WFC compensator and signal processing may reduce certain effects caused by changing focus and by image-degrading aberrations of specific lens configurations of the zoom lens system. Therefore, rather than eliminating one or more variable optical elements, a zoom system with wavefront coding may utilize one or more variable optical elements that change in a more coarse fashion (e.g., with less precise control) than would be required without a WFC compensator and signal processing of the images.

Specific types of optical elements whose optical characteristics may be changed by variation of parameters such as, but not limited to, voltage, pressure, translation and rotation are described in the context of improved zoom lens systems immediately hereinafter.

FIGS. 14 and 15 show a liquid lens utilized as a variator. There are at least two types of liquid lenses available today.

One type, currently commercialized by Varioptic Company of Lyon, France, changes shape in accordance with changes in voltage. Another type, available from Rhevision Technology, Inc. of San Diego, Calif., changes shape in accordance with changes in pressure. These liquid lenses are similar (as compared to fixed optics) in that an optical element changes in physical shape, resulting in variation of optical power without requiring movement of the optical element along an optical axis, as in traditional zoom lens systems. However, zoom lens systems constructed with such liquid lenses, even if the liquid lenses exhibit ideal behavior, still suffer from image curvature and/or chromatic aberration as discussed in reference to FIGS. 7 through 10. Other aberrations such as spherical aberration, coma, astigmatism, temperature related aberrations, and form errors may also limit image performance of such systems. The inclusion of wavefront coding into liquid lens zoom lens systems may alleviate such errors so as to produce images with improved image quality.

FIG. 14 shows one configuration 250 of a liquid lens zoom lens system including wavefront coding. In configuration 250, a liquid lens 251 acts as a variator, changing the magnification of the zoom lens system. Light transmitted through liquid lens 251 includes a wavefront as well as marginal rays that are substantially parallel to optical axis 121. A WFC compensator 252 codes the wavefront so that a blurred image forms at detector 210. WFC compensator 252 may be a fixed element or, alternatively, may include a variable optical element, such as a liquid lens optical element, for controlling a location of an image plane (e.g., an ideal location of detector 210). DSP 215 then transforms data representative of the blurred image from detector 210 into a final image 260 that is suitable for human and/or machine viewing, and is substantially insensitive to focus related aberrations.

Turning now to FIG. 15, an alternative configuration 250' includes a liquid lens 251', which, as compared to liquid lens 251 of configuration 250, alters magnification of the resulting zoom lens system and alters light transmitted through liquid lens 251' such that marginal rays are not parallel to optical axis 121, as shown. WFC compensator 252', which may include fixed and/or variable elements, again codes a wavefront so that a blurred image forms at detector 210. DSP 215' makes the final image suitable for human and/or machine viewing, and insensitive to focus related aberrations. WFC compensators 252 and 252' of configurations 250 and 250', respectively, may be configured, for example, to change in response to changes in the liquid lenses 251 and 251', respectively. DSP 215 and 215' may then perform processing that does or, alternatively, does not depend on the configuration of liquid lenses 251 and 251' and/or WFC compensators 252 and 252'. By including WFC compensator 252 or 252' and DSP 215 or 215', one of the variable optical elements in the zoom lens system may be eliminated, simplified or require less precise actuation and/or variation while still alleviating the effects of the aberrations present in the zoom lens system configurations without wavefront coding.

FIGS. 16 and 17 show similar configurations as in FIGS. 14 and 15 except that liquid crystal variators 281, 281' are utilized instead of liquid lens variators 251 and 251'. Liquid crystal optical components, such as those described in U.S. Patent Application Publication No. 2005/0018127 A1, entitled "Electrically variable focus polymer-stabilized liquid crystal lens" (hereinafter, the '127 application), use voltage or other means to change optical characteristics of a liquid crystal optical element. For example, an effective focal length of a liquid crystal optical element can be controlled by an applied voltage, thereby making the element potentially suitable for use in a modern zoom lens system. Other liquid crystal lenses are described by Ye et al. in "Liquid-crystal lens with a focal length that is variable in a wide range," Applied Optics, vol. 43, no. 35 (2004), pp. 6407-6412, and by Okada et al. in U.S. Pat. No. 4,904,063 entitled "Liquid crystal lenses having a Fresnel lens." Use of liquid crystal variators in the zoom lens system may still potentially cause the type of aberrations discussed above in reference to FIGS. 7-10, and thus limit performance. For example, any of image curvature, chromatic aberration, spherical aberration, astigmatism, coma, temperature related aberrations and general form errors resulting from the inclusion of a liquid crystal variator may reduce imaging performance. Improvements to these types of systems, through the inclusion of WFC compensators 282, 282' and signal processing 215, as explained below, are in general similar to those shown in FIGS. 14 and 15. Fewer variable optical elements, lower electrical power consumption, shorter system length, and lower cost are all improvements that may be achieved in the system shown in FIGS. 16 and 17 over corresponding systems without WFC compensators 282, 282'.

Considering the configurations of FIGS. 16 and 17 in detail, FIG. 16 shows a configuration 280 with a liquid crystal lens 281 acting as a variator for changing magnification of the resulting zoom lens system. In configuration 280, light transmitted through liquid crystal lens 281 includes a wavefront as well as marginal rays that are substantially parallel to optical axis 121. A WFC compensator 282 codes the wavefront and, subsequently, forms a blurred image at detector 210. WFC compensator 282 may be a fixed or a variable optical element—such as another liquid crystal lens, translating optics and/or other optical element—for controlling a location of the image plane (i.e., an ideal location of detector 210). DSP 215 then transforms an electronic representation of the blurred image from detector 210 into a final image 290 that is suitable for human and/or machine viewing and that is essentially insensitive to focus related aberrations.

In FIG. 17, an alternative configuration 280' includes a liquid crystal lens 281', which is modified compared to liquid crystal lens 281 so as to alter magnification of the resulting zoom lens system as well as to alter light transmitted through liquid crystal lens 281' such that marginal rays transmitted therethrough are no longer parallel to optical axis 121. WFC compensator 282', again either including fixed or variable elements, codes a wavefront of light incident thereon and forms a blurred image at detector 210. DSP 215' makes final image 290' suitable for a human and/or machine viewing and essentially insensitive to focus related aberrations.

In one embodiment, optical components used in a zoom system include fixed elements (e.g., elements with fixed optical properties, but not necessarily fixed positions) that are movable relative to the system in directions that may not be along the optical axis, thereby reducing an amount of length required to form the system. FIGS. 18 and 19 show an example of one movable optical arrangement for varying optical power. An optical arrangement 300 in FIG. 18 includes two optical elements configured such that an effective optical power, or focal length, of the arrangement can change between at least two values through a sliding motion of one of the optical elements. In optical arrangement 300, a fixed and stationary optical element 302 is disposed near an aperture 304 and a positive lens 305. Stationary optical element 302 includes, for example, two portions: a first portion 306 that exhibits optical power due to a positive curvature surface shape; and a second portion 308 that is essentially a plano or flat surface shape with no optical power, as shown. Optical arrangement 300 also includes a transverse sliding optical element 310 that is configured to be slidable between at least two positions. Sliding optical element 310 has three portions: a first portion 312 that includes a negative curvature; a second portion 314 that is a plano surface with substantially no curvature or optical power; and a third portion 316 that exhibits a positive curvature, as shown. In FIG. 18, sliding optical element 310 is shown in a first position, in which first portion 306 and second portion 308 of stationary optical element 302 are aligned with first portion 312 and second portion 314, respectively, of element 310, as shown. The combination of aperture 304, stationary optical element 302 and first and second portions 312 and 314 of sliding optical element 310 provide no optical power on light transmitted therethrough; that is, an optical effect of the negative curvature of portion 312 cancels that of the positive curvature of portion 306, while each of portions 308 and 314 have no effect.

FIG. 19 shows an optical arrangement 300' that includes elements of optical arrangement 300, but with optical element 310 at an alternative position as compared to its position within optical arrangement 300. In optical arrangement 300', optical element 310 has been moved by a distance S, which is approximately ½ the diameter of aperture 304, in a direction transverse to the optical axis of the system (wherein an optical axis is generally defined as being perpendicular to the plane of aperture 304) to a second position, relative to its position within optical arrangement 300. When sliding optical element 310 is in the second position shown in FIG. 19, portion 306 of stationary optical element 302 aligns with portion 314 of sliding optical element 310, and portion 308 of stationary optical element 302 aligns with portion 316 of sliding optical element 310. As a result, light transmitted through the combination of aperture 304, stationary optical element 302 and sliding optical element 310 in the second position encounters positive optical power.

In other words, the combination of stationary optical element 302 and sliding optical element 310, in combination with aperture 304, yield two different values of optical power depending on the sliding motion of sliding optical element 310. Arrangement in the first position as shown in optical arrangement 300 in FIG. 18 results in an effective optical power of zero. When sliding optical element 310 is shifted to the second position as shown in FIG. 19, the effective curvature of the elements provides positive optical power. Thus, by sliding optical element 310 perpendicularly with respect to the optical axis, effective optical power may be varied from zero to a pre-determined, non-zero value. A thin lens equivalent representation for the configurations of shown in FIGS. 18 and 19 is a plano/plano element with zero optical power for optical arrangement 300, and a plano/convex element with positive optical power for optical arrangement 300'. In general, optical arrangement 300 may be configured to exhibit a range of optical powers, where the zero optical power configuration of FIG. 18 is a special case.

The aforedescribed sliding optical arrangement may be used to advantage in a zoom system using wavefront coding, as shown in FIGS. 20 and 21. In the configurations shown in FIGS. 20 and 21, the sliding optical arrangement of FIGS. 18 and 19 is used as a variator. A configuration 400 of FIG. 20 corresponds to a zoom lens system in which a position of sliding optical element 310 results in low optical power for optical arrangement 300. In this case, a WFC compensator 402, either fixed or dynamic, cooperates with detector 210 and DSP 215 such that a resulting final image 410 of object 110 is essentially insensitive to focus related aberrations. Such aberrations may be, for example, a result of a particular optical configuration of the system, where sufficient aberration control is not possible with a small number of optical elements used in the system or, alternatively, are produced by induced change in optical characteristics of optical arrangement 300 acting as a variator. An alternative configuration 400', as shown in FIG. 21, illustrates a situation where a position of sliding optical element 310 provides optical arrangement 300' with a larger optical power than that provided by optical arrangement 300.

FIGS. 22 and 23 illustrate the use of plano/aspheric optical elements in a sliding variator configuration such that the optical power provided by the variator changes continuously with the relative position of the plano/aspheric optical elements. That is, while optical arrangements 300 and 300' provides the selection between two values of optical power by selecting the relative location of sliding optical element 310 between two possible positions, the use of plano/aspheric optical elements provides a continuous range of optical power (e.g., the continuous range is obtained by translating a sliding optical element in a direction perpendicular to optical axis 121).

Referring first to FIG. 22 in conjunction with FIG. 20, optical arrangement 300 in configuration 400 of FIG. 20 is replaced, in a configuration 420 of a zoom lens system shown in FIG. 22, with an optical arrangement 430. Optical arrangement 430 includes aperture 304, as in optical arrangement 300, but also includes plano/aspheric, first and second optical elements 432 and 434, which are slidable with respect to each other in directions perpendicular to optical axis 121. Turning briefly to FIG. 23, an alternative configuration 420' of the zoom lens system includes an optical arrangement 430' in which first and second sliding optical elements 432 and 434 have been moved with respect to each other, as compared to their positions in configuration 430. As a result, optical arrangement 430' provides a different value of optical power as compared to that provided by optical arrangement 430. Configurations 420 and 420' further include a WFC compensator 442, detector 210 and DSP 215 that produce a final image 450. WFC compensator 442 is configured to function in a similar manner to aforedescribed WFC compensators shown, for example, in FIGS. 11-17 and 20-21 and, furthermore, may be customized to cooperate with optical arrangement 430.

The lens configuration shown as optical arrangements 430 and 430' is commonly referred to as an Alvarez lens (see, for example, U.S. Pat. No. 3,305,294). An aspheric surface shape of first and second optical elements of an Alvarez lens may be expressed as a cubic described by the expression:

$$\text{height}(y) = \alpha \cdot y^3, \quad (1)$$

where y is a vertical dimension in the plane of the paper in FIGS. 22 and 23, height(y) is the height of the aspheric surface of each sliding optical element as measured from the opposing, plano surface, and α is a constant parameter.

The combination of optical elements 432 and 434 as shown in FIGS. 22 and 23 is effectively equivalent to a combined optical element with second order phase or optical power that approximately varies with an amount of relative shift in position between elements 432 and 434. That is, the combined phase of elements 432 and 434 may be expressed as:

$$\text{phase}(z) = \text{height}(y+\Delta) - \text{height}(y-\Delta) = \alpha(6\Delta y^2 + 2\Delta^3), \quad (2)$$

where z is the dimension along optical axis 121 and Δ is a relative sliding distance between elements 432 and 434, as shown in FIG. 23. As may be seen in Eq. (2), there are two phase terms related to the combination of the first and second sliding optical elements, namely a second order term of $y^2$ and a constant term. The constant term adds an aberration to the zoom lens system called piston that depends on Δ and, ideally, has substantially no effect on the resulting image. The second order term provides optical power depending on Δ. Variation of constant parameter α acts to increase or decrease the sensitivity of resulting optical power to the relative movement of elements 432 and 434. Therefore, by shifting elements 432 and 434 with respect to each other, the effective optical power of the combination may be varied.

The Alvarez lens (i.e., optical arrangements 430 and 430') in the zoom lens system illustrated in FIGS. 22 and 23 has both first and second sliding optical elements 432 and 434 moving in opposite directions in a plane perpendicular to optical axis 121 in order to change the optical power provided by the Alvarez lens. If only one of the sliding optical elements is moved, e.g., just second sliding optical element 434, a linear phase shift results from the shifted combination of the two elements. This phase shift acts to spatially displace the image as a function of the element displacement Δ. This phase shift may be removed if a more complicated form of slidable optical elements is used. For example, a second order term that provides an approximation of optical power, may also be included, so that a combination of shifted optical power terms results in a linear phase shift, depending on the amount of optical power and the element displacement. The phase shift from the optical power term can cancel the phase shift from the cubic term resulting in a combination of elements where only a single element needs to be shifted to yield an Alvarez lens with continuously variable amount of optical power.

FIGS. 24 and 25 illustrate a variation of continuously variable sliding optical elements acting as a variator in which only one element slides, but both surfaces of each element are aspheric. Referring to FIG. 24 in conjunction with FIG. 20, optical arrangement 300 in configuration 400 of FIG. 20 has been replaced, in configuration 460 of a zoom lens system in FIG. 24, with an optical arrangement 470. Optical arrangement 470 includes aperture 304, as in optical arrangement 300, but also includes a first aspheric/aspheric element 472 and a sliding, second aspheric/aspheric element 474. Element 472 includes a front surface 475 and a back surface 476, both of which have aspheric surface profiles. Element 474 includes a front surface 477 and a back surface 478, both of which also have aspheric surface profiles. In the example illustrated in FIGS. 24 and 25, elements 472 and 474 include optical power on the outer surfaces of the elements (e.g., those surfaces that do not face each other, as shown) and a cubic surface profile on the inner surfaces. That is, surface 475 of element 472 has a negative optical power, and surface 476 of element 472 has a cubic surface profile. Similarly, surface 477 of element 474 has a cubic surface profile, corresponding to the cubic surface profile of second surface 476 of element 472, and surface 478 of element 474 has a positive optical power.

Continuing to refer to FIG. 24, in optical arrangement 470 element 472 is configured to remain stationary with respect to aperture 304. Alternatively, element 472 may also be configured to be slidable with respect to aperture 304, for example, in a direction perpendicular to optical axis 121. Element 474 is slidable with respect to aperture 304 and element 472 such that optical arrangement 470 can provide a continuous variation in optical power. Spatially shifting element 474 with respect to element 472 results in changing the effective optical power of optical arrangement 470. That is, the combination of elements 472 and 474 may be configured to yield a continuous range of optical power with the sliding motion of element 474, keep optical axis 121 centered with respect to detector 210, and provide additional optical degrees of freedom for minimizing aberrations. Configuration 460 further includes a WFC compensator 482, detector 210 and DSP 215 that produce a final image 490. WFC compensator 482 functions in a similar manner to aforedescribed WFC compensators shown, for example, in FIGS. 11-17 and 20-23 and, furthermore, may be customized so as to be compatible with the specific characteristics of optical arrangement 470.

The slidable configuration of element 474 is illustrated by referring to FIG. 25 in conjunction with FIG. 24. Optical arrangement 470 of FIG. 24 is shown with elements 472 and 474 completely overlapping each other; that is, they are approximately centered with respect to each other along optical axis 121. In optical arrangement 470' of FIG. 25, element 474 has moved downward with respect to element 472 by a displacement Δ. In FIG. 24, optical arrangement 470 provides a minimum optical power configuration, and in FIG. 25, optical arrangement 470' provides a larger optical power configuration.

Aspheric optical elements may also be configured so that rotating one aspheric element with respect to another causes a change in optical power. One example of this type of rotational element is described in U.S. Pat. No. 4,650,292 to Baker et al. (hereinafter, the '292 patent).

Figure 26:
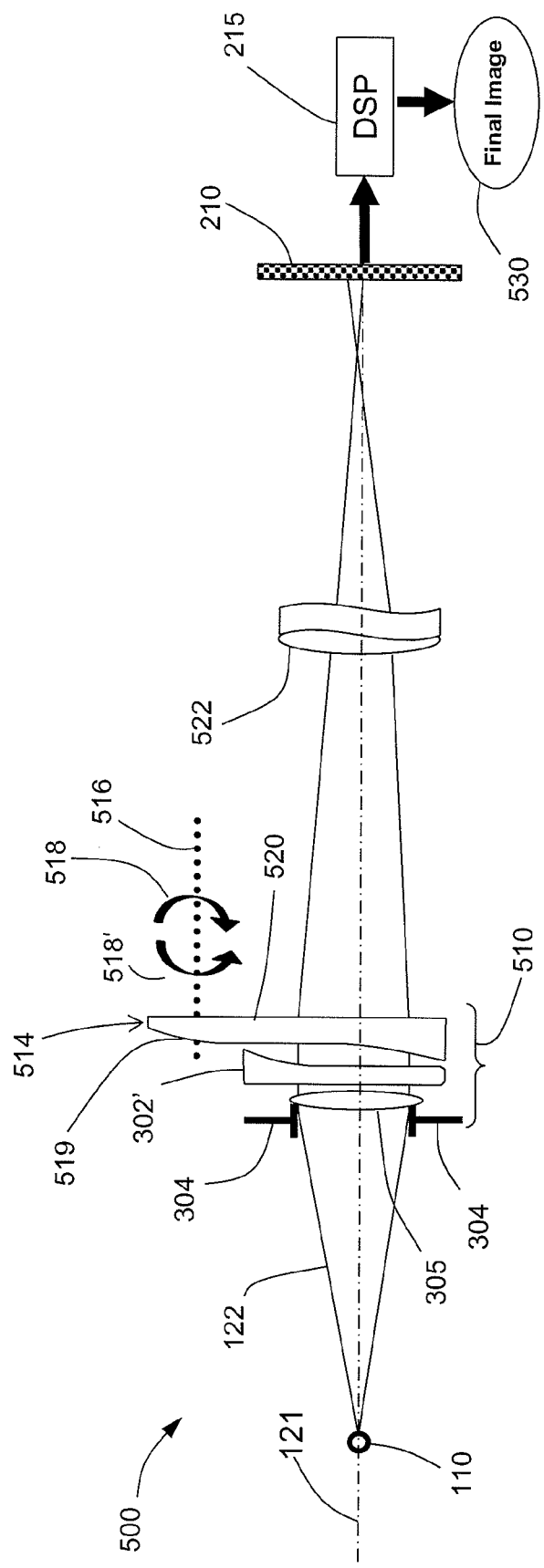
FIG. 26 is a diagrammatic illustration of another embodiment of a zoom lens system that utilizes a rotatable variator in combination with a wavefront coding compensator.

FIG. 26 illustrates rotation of an element to effect a change in optical power of an optical arrangement containing two elements. A configuration 500 of a zoom lens system includes an optical arrangement 510. Referring now to FIG. 26 in conjunction with FIGS. 18 and 19, optical arrangement 510 includes stationary optical element 302' disposed near aperture 304, as shown in optical arrangements 300, 300' of FIGS. 18 and 19. Optical element 302' includes a portion that provides negative optical power and a piano portion which does not provide optical power. Optical arrangement 510 further includes a second, rotatable optical element 514 that is rotatable about a rotation axis 516 in either a counterclockwise direction 518 (as indicated by an arrow) or a clockwise direction 518'. Element 514 includes an aspheric surface 519 and a piano surface 520. Alternatively, element 514 may be an aspheric/aspheric element, like elements 472 and 474 shown in FIG. 24. Surface curvatures of elements 302' and 514, and a location of axis 516, are selected such that when element 514 rotates about axis 516, optical arrangement 510 provides a variable degree of optical power. Thus, like earlier-described optical arrangements including slidable optical elements, optical arrangement 510 includes movement of an optical element in a plane perpendicular to optical axis 121 so as to provide variable optical power without requiring additional length along the optical axis, as in traditional zoom lens systems. Configuration 500 further includes a WFC compensator 522, detector 210 and DSP 215 to produce a final image 530. WFC compensator 522 is configured to function in a similar manner to aforedescribed WFC compensators shown, for example, in FIGS. 11-17 and 20-25 and, furthermore, may be customized to cooperate with optical arrangement 510.

FIGS. 27 and 28 illustrate yet another variation of a sliding element used in a variator of an improved zoom lens. In the case illustrated in FIGS. 27 and 28, a single sliding aspheric element 570 changes optical power, without the use of a second optical element. That is, in contrast to the configurations shown in FIGS. 20-26, in which at least one of two complementary elements moves with respect to another, configurations 550 and 550' of FIGS. 27 and 28, respectively, include only a single, movable optical element 570.

Referring first to FIG. 27, optical arrangement 560 includes aperture 304 and a movable optical element 570, which is translatable with respect to aperture 304. By a continuous or discrete movement of movable optical element 570, different portions of element 570, corresponding to different optical power, are illuminated through aperture 304 such that optical arrangement 560 provides varying optical power depending on a relative position of element 570 with respect to aperture 304. While FIG. 27 shows element 570 as including an aspheric surface 572 and a plano surface 574, element 570 may be configured with other surface contours, such as an aspheric/aspheric combination or a plano/aspheric combination, to achieve a desired optical power variation.

FIG. 28 shows configuration 550' including an optical arrangement 560', in which a movable optical element 570' has been slid downward in the plane of the diagram such that a different portion of the aspheric/plano surface contour is illuminated through aperture 304. While element 570 is shown to be translatable (e.g., as a linear slide) in FIGS. 27 and 28, a movable optical element may also be moved in other ways to provide optical power variation (such as, for example, by rotation about a rotation axis, as shown in FIG. 26). Configurations 550 and 550' further include WFC compensators 582 and 582', respectively, detector 210 and DSP 215 to produce final images 590 and 590', respectively, as shown. WFC compensators 582 and 582' are configured to function in a similar manner to aforedescribed WFC compensators shown, for example, in FIGS. 11-17 and 20-26 and, furthermore, may be customized to cooperate with the particular characteristics of optical arrangements 560 and 560'.

Yet another variation to a sliding optical element for use in zoom systems involves a sliding aperture and aspheric optical element used as a variator. A sliding aperture, such as that described by Togino in U.S. Pat. No. 6,603,608, moves with respect to an aspheric optical element such that only a certain section of the aspheric optical element is illuminated at a time. This movement of the aperture, in turn, results in a discrete or continuously variable optical power for the aperture/aspheric optic combination. The combination of the sliding aperture and aspheric optical element effectively results in an optical arrangement providing varying optical power.

Figure 29:
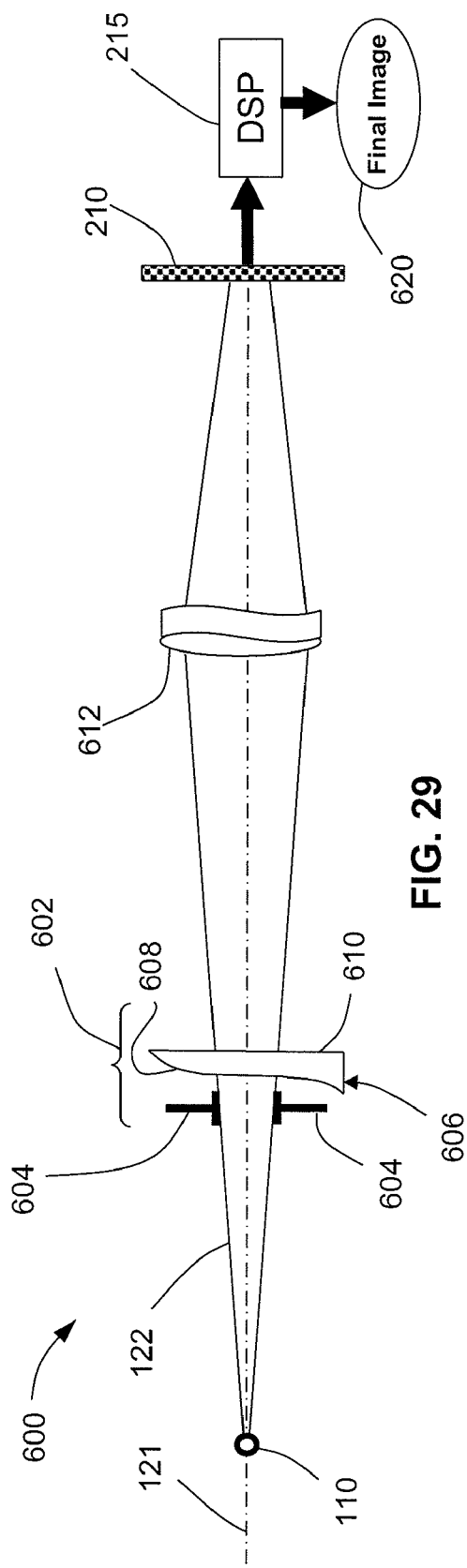
FIGS. 29 and 30 are diagrammatic illustrations of another embodiment of an improved zoom lens system that utilizes a sliding aperture variator in combination with a wavefront coding compensator.
Figure 30:
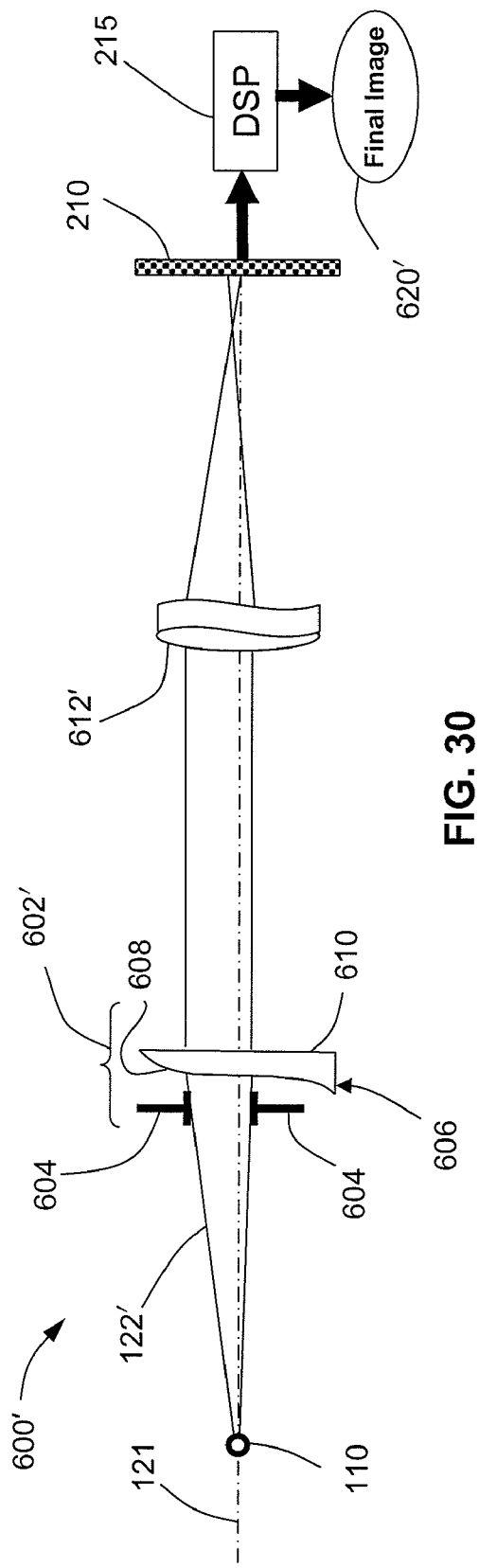

FIGS. 29 and 30 illustrate an example of an improved zoom lens system including such a sliding aperture device. A configuration 600 shown in FIG. 29 includes an optical arrangement 602, which in turn includes a aperture 604 and an aspheric optical element 606. By a continuous or discrete movement of aperture 604, different portions of element 606, corresponding to different optical powers, are illuminated through aperture 604 such that optical arrangement 602 provides variable optical power depending on a relative position of aperture 604 with respect to element 606. In configuration 600, both aperture 604 and element 606 are shown to be centered with respect to optical axis 121 in the plane of the figure, such that optical arrangement 604 provides a first value of optical power to light transmitted therethrough. FIG. 30 shows a configuration 600', in which aperture 604 in an optical arrangement 602' has been moved (relative to its position in optical arrangement 602, FIG. 29) so as to illuminate a different portion of element 606. In particular, aperture 604 is shown to have been moved upward in the plane of the figure with respect to optical axis 121 such that light traveling through optical arrangement 602' experiences a different, second value of optical power.

Continuing to refer to FIGS. 29 and 30, while element 606 is shown as including an aspheric surface 608 and a plano surface 610, an aspheric optical element may alternatively be configured with other surface configurations such as, but not limited to, previously described aspheric/aspheric combinations or plano/aspheric combinations so as to cooperate with aperture 604 to achieve a desired optical power variation. Also, aperture 604 may be slidable in a transverse direction or rotatable about a rotation axis in the plane perpendicular to the optical axis in a manner analogous to the movement of the movable optical elements shown in, for example, FIGS. 18-28. Configurations 600 and 600' further include WFC compensators 612 and 612', respectively, detector 210 and DSP 215 to produce final images 620 and 620', respectively. WFC compensators 600 and 600' are configured to function in a similar manner to aforedescribed WFC compensators shown, for example, in FIGS. 11-17 and 20-28, and furthermore, may be customized to cooperate with the particular characteristics of optical arrangements 602 and 602'.

Referring again to FIGS. 11-17 and 20-30, a range of incoming ray angles (i.e., rays from object 110 that are within $\theta_{obj}$) is imaged by each of the zoom systems; and a wavefront coding element modifies phase of a wavefront represented by the rays such that MTFs over the range of ray angles are similar in magnitude and shape, making the zoom system less sensitive to misfocus like aberrations (as compared to the same zoom system without wavefront coding).

FIGS. 31 and 32 illustrate another example of a zoom lens system in accordance with the present disclosure. FIG. 31 shows a configuration 700 of a two-group zoom lens system including a first optical group 702 (with a focal length $f_1$) and a second optical group 704 (with a focal length $f_2$). Second optical group 704 includes variable optical element 706 and a WFC element 708. First and second optical groups 702 and 704 are aligned with an optical axis 722. Configuration 700 is shown as a wide-angle system, configured to receive both on-axis rays 725 and off-axis rays 727, as shown. First and second optical groups 702 and 704 are configured to image both on-axis and off-axis rays 725 and 727 onto detector 210. Image data generated by detector 210 is processed at DSP 215 to produce a final image 720. First and second optical groups 702 and 704 may include a plurality of optical elements including, but not limited to, refractive, diffractive and holographic elements. WFC element 708 may be separate from variable optical element 706, formed on a surface of element 706 or, alternatively, integrally formed therewith.

FIG. 32 shows a configuration 700' that includes a second optical group 704'. In configuration 700', variable optical element 706 is modified to form variable optical element 706' having a focal length $f_2'$ that is different from focal length $f_2$ of element 706, FIG. 31. The focal length change may be achieved, for instance, by one of the aforedescribed implementations of variable lenses. Optical group 704' also has a WFC element 708' with characteristics that may be the same as, or different from, characteristics of WFC element 708 of optical group 704. Optical group 704' is also closer along optical axis 722 to first optical group 702 (as indicated by an arrow 730) as compared to the positions of optical groups 704 and 702 in configuration 700. Configuration 700' is suitable for use as a telephoto system which accepts on-axis and nearly on-axis rays 725' (indicated by a dashed ellipse), which are imaged onto detector 210 and processed at DSP 215 so as to form a final image 720'. In other words, configurations 700 and 700' illustrate wide-angle and telephoto states, respectively, of a zoom lens system which combines translation of optical group 706, 706' along optical axis 722 and focal length variation of variable optical group 704, 704'.

As described above, specific characteristics of WFC element 708 may be varied as well. For example, WFC element 708 may be implemented using an adaptive optics element or a spatial light modulator such that a phase variation effected by WFC element 708 may be varied depending on a configuration of second optical group 704 and/or 704'. Also, signal processing performed by DSP 215 in configuration 700' may or may not be the same as that performed in configuration 700; signal processing in configuration 700' may be modified to accommodate the changes in second optical group 704'.

By simultaneously effecting the translation and focal length variation of at least one optical group in the zoom lens system, the zoom lens system illustrated in FIG. 31 and FIG. 32 may achieve a range of characteristics, from wide-angle to telephoto, using less movement of optical groups along an optical axis than would be required by a traditional zoom lens system alone, and less focal length variation than would be required by a modern zoom lens system alone. Moreover, WFC element 708 may further provide aberration compensation that is not achievable by traditional or modern zoom lens system configurations. It is noted that any of the previously described improved zoom lens systems, as shown, for example, in FIGS. 11-17 and 20-30, may be modified to simultaneously implement translation and focal length variation, as exemplified in FIGS. 31 and 32, by equipping these abovedescribed systems with a translation mechanism to supplement the focal length variation already shown.

Configurations 700 and 700' as illustrated in FIGS. 31 and 32, and equivalent configurations without WFC element 708, were numerically modeled using the following exemplary characteristics. In configuration 700, the effective focal length exhibited by the combination of groups 702 and 704 is 2.7 mm. Focal length $f_1$ of group 702 is assumed to be −6.62 mm, and focal length $f_2$ of group 704 is 3.41 mm. A spacing between principal planes of groups 702 and 704 is 4.33 mm. In configuration 700', group 702 remains stationary and focal length $f_1$ does not change (still −6.62 mm), while focal length $f_2'$ of group 704' changes to 4.04 mm. Spacing between principal planes of groups 702 and 704' is 1.71 mm, such that an effective focal length exhibited by the combination of groups 702 and 704' is 5.4 mm. A wavelength of light rays is assumed to be 0.55 microns, and detector 210 is assumed to include pixels that are 4 microns square.

A specific prescription of the various optical groups is derived from the well-known sag equation:

$$z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}, \quad (3)$$

where z=sag of a surface, c=surface curvature, k=conic constant, r=radial distance from vertex and $\alpha_n$=aspheric constants. The surfaces are defined as seen by a ray approaching the zoom lens system from the left side of the paper in configurations 700 and 700' of FIGS. 31 and 32. Prescriptions used in the numerical modeling of configurations 700 and 700' are given by:

In order to illustrate the effects of WFC element 708, attention is first directed to FIGS. 33-36, which illustrate pairs of ray intercept curves corresponding to optical arrangements equivalent to configurations 700 and 700' as shown in FIGS. 31 and 32, but without WFC element 708. In all of FIGS. 33-36 and FIGS. 46-49, axis "EY" corresponds to a spatial Y-axis in an image plane (e.g., a location of detector 210), axis "PY" corresponds to a spatial Y-axis in a pupil plane (e.g., a first surface of first optical group 702 that is encountered by incoming rays), axis "EX" corresponds to a spatial X-axis in the image plane, and axis "PX" corresponds to a spatial X-axis in the pupil plane.

As is known in the art, ray intercept curves may indicate a degree of focus-related aberrations present in a given system. A ray intercept curve is calculated by plotting, for a given ray position on a pupil plane, a corresponding position on an image plane to which that ray images. For example, for a perfectly focused system, the x-axis and y-axis ray intercept curves should be straight, horizontal lines along the EY=0 and EX=0 axes. Deviations from the ideal horizontal line indicate the presence of a variety of aberrations in the system. For example, a tilted, linear, ray intercept curve (i.e., a straight line with a non-zero slope) indicates misfocus; that is, a linearly increasing image plane height with pupil position. Also, if a y-plot and an x-plot exhibit different slopes, then the ray intercept curves indicate astigmatism. Furthermore, if the slope of a ray intercept curve changes as a function of field angle, then that ray intercept curve indicates field curvature. Additionally, if a ray intercept curve is a third order curve, that ray intercept curve indicates spherical aberration. Thus, ray intercept curves may indicate a variety of aberrations present in a given optical system.

FIG. 33 shows a y-plot 750 and an x-plot 752 with a y-axis ray intercept curve 754 and an x-axis ray intercept curve 756 corresponding to on-axis rays 725 going through configuration 700 but without WFC element 708. Similarly, FIG. 34 shows a y-plot 760 and an x-plot 762 with a y-axis ray intercept curve 764 and an x-axis ray intercept curve 766 corresponding to off-axis rays 727 being imaged through configuration 700 but without WFC element 708. FIG. 35 shows a y-plot 770 and an x-plot 772 with a y-axis ray intercept curve 774 and an x-axis ray intercept curve 776 corresponding to an on-axis portion of rays 725' going through configuration 700' but without WFC element 708. FIG. 36 shows a y-plot 780 and an x-plot 782 with a y-axis ray intercept curve 784 and an x-axis ray intercept curve 786 corresponding to an off-axis portion of rays 725' going through configuration 700' but without WFC element 708.

TABLE 1

| | First optical group 702 Thickness = 1.0 mm | | Second optical group 704 Thickness = 1.0 mm Back focal distance = 4.522 mm | | Second optical group 704' Thickness = 1.0 mm Back focal distance = 7.116 mm | |
|---|---|---|---|---|---|---|
| | Surface 1 | Surface 2 | Surface 1 | Surface 2 | Surface 1 | Surface 2 |
| c | −5.681E−3 | −5.681E−3 | 1.377E−1 | −2.439E−1 | 1.608E−1 | −1.601E−1 |
| k | 7.492 | −1.070E+2 | −1.045E+2 | 9.029 | 1.598E−1 | −2.461 |
| $a_2$ | 0 | 0 | 0 | 0 | 0 | 0 |
| $a_4$ | −8.973E−3 | −1.715E−3 | 4.458E−3 | 0 | −3.635E−4 | 1.925E−3 |
| $a_6$ | −1.965E−3 | 1.304E−3 | −6.332E−3 | 0 | 1.050E−3 | 2.438E−4 |
| $a_8$ | 5.367E−3 | 1.579E−3 | −2.339E−2 | 0 | −7.584E−4 | 9.016E−5 |
| $a_{10}$ | −1.512E−3 | −1.298E−3 | −4.608E−2 | 0 | 1.121E−3 | 4.987E−4 |

Addressing each of FIGS. 33-36 separately, y-axis and x-axis ray intercept curves 754 and 756 shown in FIG. 33 are linear curves with substantially constant slopes, thus indicating misfocus. In FIG. 34, since y-axis ray intercept curve 764 and x-axis ray intercept curve 766 exhibit different slopes, they indicate the presence of astigmatism in addition to misfocus. In FIGS. 35 and 36, ray intercept curves 774 and 776 are substantially linear but have opposite slopes from curves 760 and 766, indicating that configuration 700' exhibits an opposite misfocus from configuration 700. That is, while the misfocus indicated in FIGS. 33 and 34 may be partially corrected by, for example, tilting an image plane (i.e., the location of detector 210) in configuration 700, such movement of the image plane will worsen the misfocus exhibited by configuration 700'. In other words, correction of the misfocus indicated in FIGS. 33-36 would require, for instance, moving the image plane as a function of configuration, which is undesirable.

Figure 37:
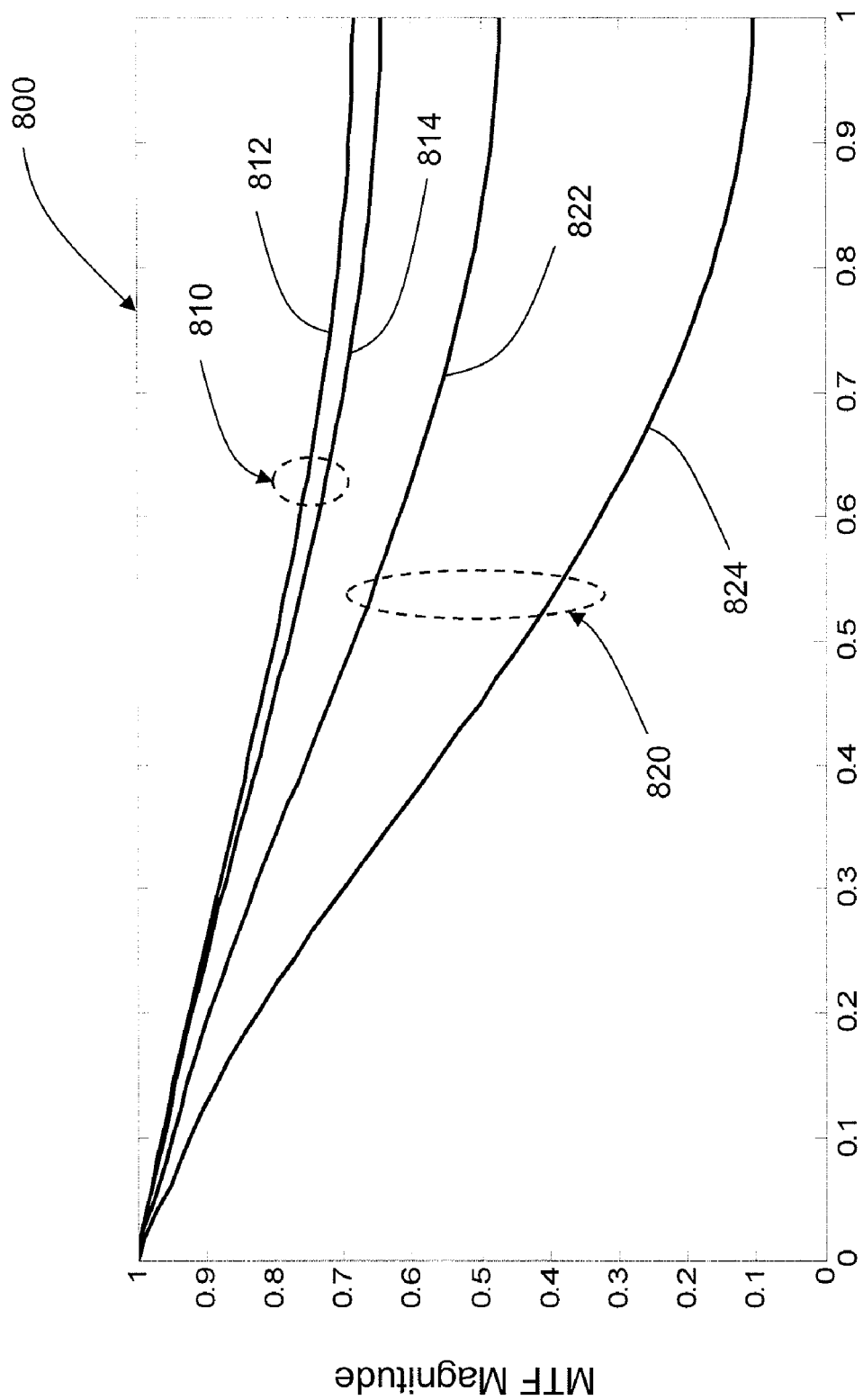
FIG. 37 is a graphical plot of calculated modulation transfer functions corresponding to on- and off-axis rays imaged through the configurations shown in FIGS. 31 and 32 but without including the effects of wavefront coding and signal processing.

To further illustrate the non-ideal performance of configurations equivalent to configurations 700 and 700' but without WFC element 708, calculated modulation transfer functions (MTFs) of these configurations are shown in FIG. 37. A plot 800 includes a plurality of MTF curves corresponding to on-axis and off-axis rays in configurations 700 and 700' without WFC element 708. The vertical axis of plot 800 corresponds to MTF magnitude, and the horizontal axis of plot 800 indicates normalized spatial frequency parameter. The maximum spatial frequency of one corresponds to 1 over (2 times the pixel size). The ideal MTF is a horizontal line at 0.5 magnitude. While having a cutoff value for a normalized spatial frequency parameter (i.e., a normalized spatial frequency parameter or spatial frequency at which MTF falls below 0.5) is acceptable for many applications, drastic variation in the MTF curves between different configurations is considered to be non-ideal because that characteristic would indicate that the system would exhibit a large variation in performance between different configurations; that is, in this case, certain configurations may perform better than others. Uniform performance (i.e., similar MTF curves) for different configurations is generally preferable.

Continuing to refer to FIG. 37, a first MTF group 810 includes MTF curves for on-axis and off-axis rays 725 and 727 in FIG. 31, and a second MTF group 820 includes MTF curves for on-axis and off-axis portions of rays 725' in FIG. 32. In particular, a first on-axis MTF curve 812 is an MTF curve for on-axis rays 725, a first off-axis MTF curve 814 is an MTF curve for off-axis rays 727, a second on-axis MTF curve 822 is an MTF curve for an on-axis portion of rays 725', and a second off-axis MTF 824 is an MTF curve for an off-axis portion of rays 725'. As may be seen in plot 800, first and second MTF groups 810 and 820, corresponding to configurations equivalent to configurations 700 and 700' respectively, but without WFC element 708, are significantly different from each other as well as within the groups themselves for on-axis and off-axis rays. Furthermore, MTF curve 824 is significantly lower than MTF curve 822 and first MTF group 810, thus indicating degraded performance for the off-axis portion of rays 725' shown in configuration 700'.

Figure 38:
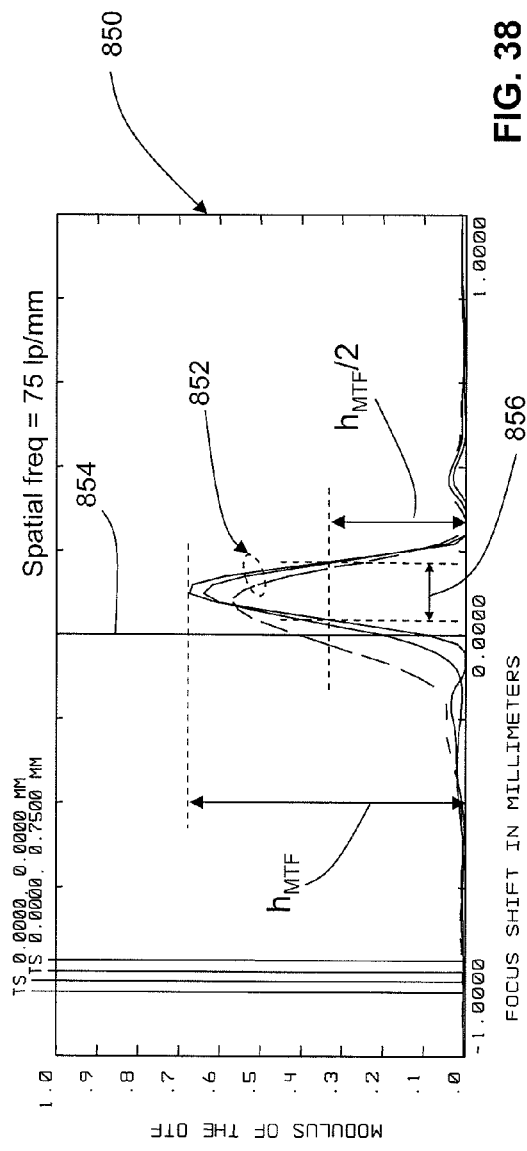
FIGS. 38 and 39 are graphical plots of calculated modulation transfer functions as a function of focus shift corresponding to on-axis and off-axis rays imaged through the configurations of FIGS. 31 and 32, but not including wavefront coding and signal processing, for a specific spatial frequency value.
Figure 39:
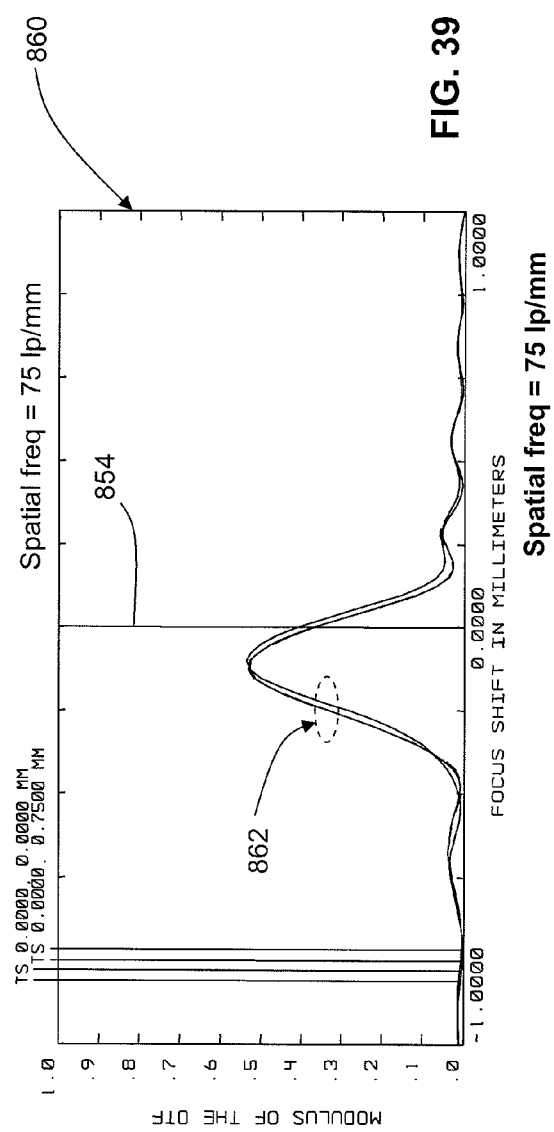

Still another indication of the non-ideal performance of configurations 700 and 700' without WFC element 708 is shown in FIGS. 38 and 39. FIGS. 38 and 39, in conjunction with FIGS. 31 and 32, show MTF curves for on-axis and off-axis rays in configurations 700 and 700' without WFC element 708 for a specific spatial frequency value (75 line-pairs/mm in the examples shown in these figures). In FIGS. 38 and 39, the vertical axis corresponds to a magnitude of a modulus of the optical transfer function (OTF); that is, the MTF, and the horizontal axis corresponds to a focus shift in millimeters, where a focus shift of zero corresponds to perfect focus at an image plane (e.g., a location of detector 210). A plot 850 in FIG. 38 includes a first group of MTF curves 852 corresponding to on-axis rays 725 and off-axis rays 727 in configuration 700 of FIG. 31, but without WFC element 708. A peak height of one MTF curve is labeled as $h_{MTF}$, and a width of the corresponding peak at a value of $h_{MTF}/2$ (e.g., a full width at half maximum, or FWHM, of the curve) is labeled as 856. FWHM 856, which is less than 0.2 mm in the example shown in FIG. 38, may increase when a WFC element is utilized in configuration 700, as discussed in connection with FIG. 41 below.

As may be seen in plot 850, peaks of group of MTF curves 852 are located to the right of a line of ideal focus 854 at zero focus shift. Similarly, a plot 860 in FIG. 39 includes a second group of MTF curves 862 corresponding to on-axis and off-axis portions of rays 725' in configuration 700' of FIG. 32, but without WFC element 708. In plot 860, the peaks of group of MTF curves 862 are located to the left of line of ideal focus 854. While adjustments may be made to a system represented by configurations 700, 700' without WFC element 708, (e.g., a location of detector 210, and thereby an image plane, may be moved closer or farther from first and second optical groups 702 and 704 or 704') such that the image plane location is at the peaks of either first group of MTF curves 852 or second group of MTF curves 862, adjusting the system to improve the performance of one configuration worsens the performance of the other configuration, and vice versa. In other words, it is not possible to select one location for detector 210 that achieves good performance in both of configurations 700 and 700'.

The inclusion of WFC element 708, in combination with DSP 215, in configurations 700 and 700' of FIGS. 31 and 32 may improve performance in the zoom lens system, as now described.

For purposes of the numerical modeling, WFC element 708 is accounted for by adding an extra element before the first surface of second optical groups 704 and 704'. One particular WFC element 708 is simulated as having a front surface expressed as:

$$z_{WFC} = a_3 \frac{(x^3 + y^3)}{r_0^3} + a_5 \frac{(x^5 + y^5)}{r_0^5} + a_7 \frac{(x^7 + y^7)}{r_0^7} + a_9 \frac{(x^9 + y^9)}{r_0^9} \quad (4)$$

where x and y are spatial variables in a plane perpendicular to the optical axis, $a_3=1.418\cdot10^{-3}$, $a_5=-0.5766\cdot10^{-3}$, $a_7=1.388\cdot10^{-3}$, $a_9=7.88\cdot10^{-3}$, and $r_0=0.42$ mm. Other configurations of WFC element 708 are possible.

Figure 40:
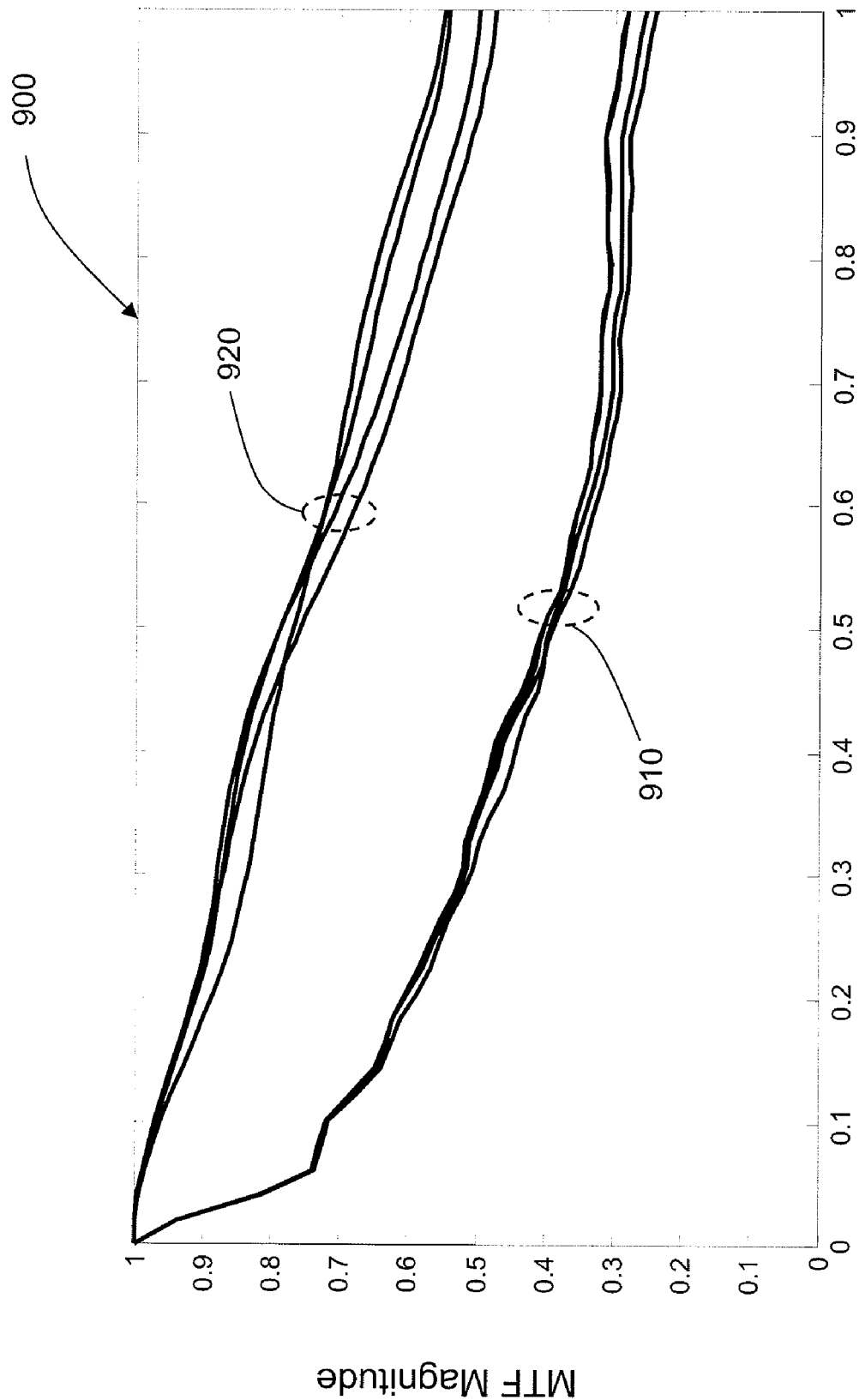
FIG. 40 is a graphical plot of calculated modulation transfer functions corresponding to on- and off-axis rays imaged through the configurations of FIGS. 31 and 32, this time including effects of wavefront coding and signal processing.

FIG. 40 shows a plot 900 of MTFs for on-axis and off-axis rays imaged through configurations 700 and 700', this time with the effects of WFC element 708 taken into account in the numerical modeling. A first MTF group 910 includes MTF curves for on-axis and off-axis rays 725 and 727 in FIG. 31 as well as on-axis and off-axis portions of rays 725' in FIG. 32, thus corresponding to both wide-angle configuration 700 and telephoto configuration 700', without processing by DSP 215. As may be seen in plot 900, individual MTF curves within first MTF group 910 are quite similar to each other. That is, comparing the substantially similar MTF curves of MTF group 910 to the earlier described MTF groups 810 and 820 of FIG. 37 indicates that the performance uniformity for different ray angles within each configuration as well as in different configurations is improved when WFC element 708 is utilized.

Still referring to FIG. 40, plot 900 also includes a second MTF group 920 corresponding to MTF curves for on-axis and off-axis rays 725 and 727 imaged through configuration 700 as well as on-axis and off-axis portions of rays 725' imaged through configuration 700', with processing by DSP 215. Details of DSP 215 will be discussed at an appropriate juncture in the discussion below. As may be seen by examination of second MTF group 920, an overall magnitude of MTF curves within second MTF group 920 is increased over that of curves within first MTF group 910, while preserving the uniformity of the MTF performance (indicated by the substantially similar magnitude and shape of the curves in MTF group 920). Furthermore, the MTF curves within second MTF group 920 are, on the whole, greater than 0.5 in magnitude across the normalized spatial frequency parameter range. In other words, when WFC element 708 and processing by DSP 215 are included, both configurations 700 and 700' achieve improved performance in the zoom lens system of the present disclosure.

Figure 41:
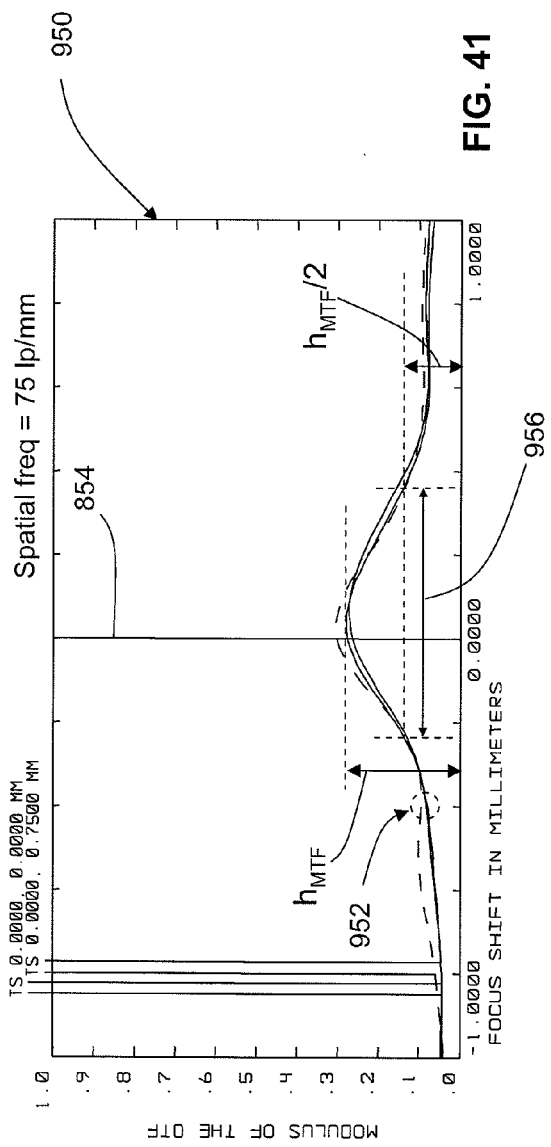
FIGS. 41 and 42 are graphical plots of calculated modulation transfer functions as a function of focus shift corresponding to on-axis and off-axis rays imaged through the configurations of FIGS. 31 and 32 for a specific spatial frequency value, this time including the effects of wavefront coding.
Figure 42:
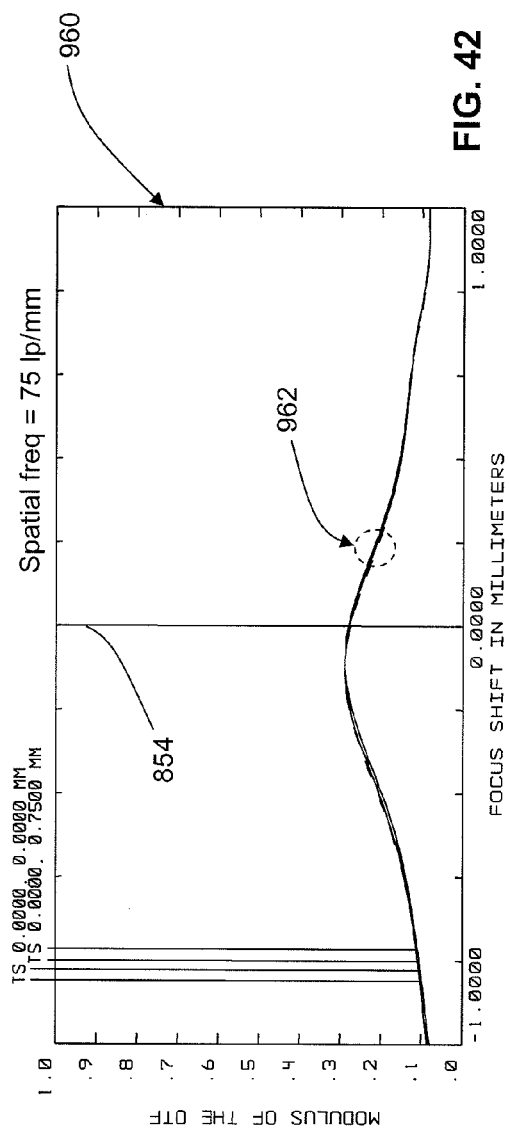

In another illustration of performance of configurations 700 and 700' including WFC element 708, but without signal processing, FIGS. 41 and 42 show MTF curves for on-axis and off-axis rays in configurations 700 and 700' for a specific spatial frequency value (75 lp/mm, as in FIGS. 38 and 39). Again, perfect focus at the image plane corresponds to a focus shift of zero. A plot 950 in FIG. 41 includes a first group of MTF curves 952 corresponding to on-axis and off-axis rays in configuration 700 of FIG. 31, including WFC element 708, but without processing by DSP 215. A peak height of one MTF curve is labeled as $h_{MTF}$, and a FWHM of the corresponding peak (e.g., at a value of $h_{MTF}/2$) is labeled as 956. A plot 960 in FIG. 42 includes a second group of MTF curves 962 corresponding to on-axis and off-axis rays in configuration 700' of FIG. 32, with WFC element 708 but without processing by DSP 215. It may be seen that individual MTF curves within each of first and second groups of MTF curves 952 and 962, respectively, are quite similar to each other within the respective groups. This characteristic indicates uniform performance across configurations as well as across ray angles.

By comparing FIGS. 41 and 42 with aforedescribed FIGS. 38 and 39, it may be seen that the peaks of both first and second groups of MTF curves 952 and 962 have been flattened and broadened, such that line of ideal focus 854 intersects both groups of MTF curves 952 and 962 at points not far from the peak MTF magnitudes (in fact, the MTF curves included within second group of MTF curves 962 are so similar that they virtually overlap each other). That is, plots 950 and 960 indicate that there is a broad range of settings in which high MTF values may be obtained without having to actually move the image plane. FWHM 956 is seen as being about 0.6 mm in FIG. 41, as compared to corresponding FWHM 856 in FIG. 38, which is less than 0.2 mm. It may be seen in FIG. 41 that other MTF curves of group 952 have similar widths that are all greater than corresponding peak widths of MTF curves of group 852, FIG. 38. It may similarly be seen, by comparing FIG. 39 to FIG. 42, that corresponding peak widths (i.e., FWHM) of MTF curves of group 962 are wider than corresponding peak widths of MTF curves of group 862. Thus, the increase in width of their MTF curves with respect to misfocus, over a range of ray angles, makes both configurations 700 and 700' with WFC element 708 less sensitive to misfocus and/or to misfocus-like aberrations over the range of ray angles imaged by detector 210, than corresponding configurations 700 and 700' without WFC element 708. That is, the zoom lens system that utilizes WFC element 708 has a broader MTF curve, as indicated by FWHM, at least one spatial frequency and over a range of focus shift, that is wider than an MTF curve formed by the corresponding system at the one spatial frequency over a range of ray angles imaged by the system and at any focal length of the system, than a corresponding zoom lens system without WFC element 708.

Figure 43:
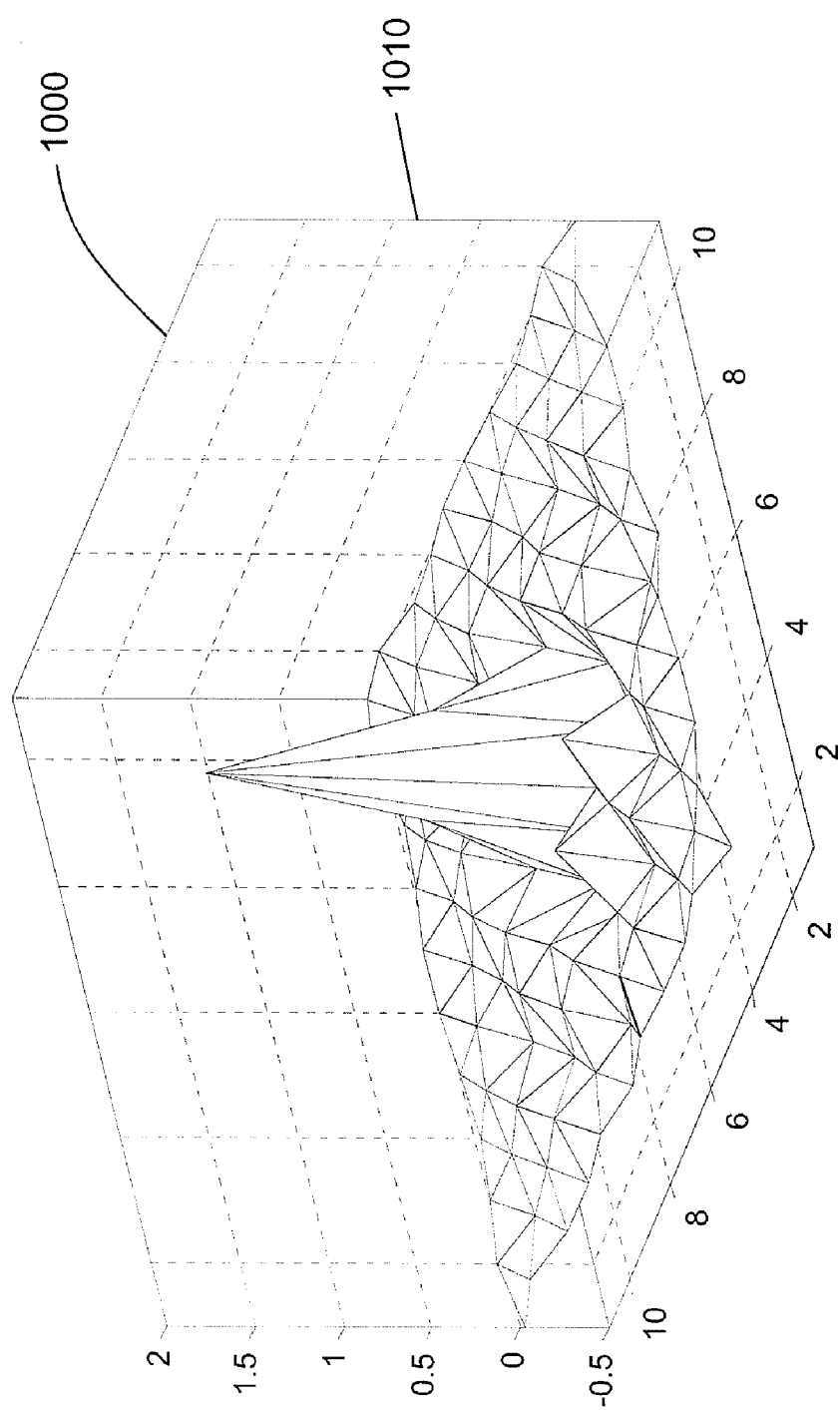
FIG. 43 is a 3-D mesh representation of calculated linear filter applied in the signal processing used to calculate the graphical plot in FIG. 40.

The specifics of the algorithm applied by DSP 215 are shown in FIG. 43. FIG. 43 shows a mesh rendering of a linear filter used to generate the results shown in FIG. 40. FIG. 43 shows a 3-D plot 1000 including a linear filter 1010. The specific values of each point in the mesh of linear filter 1010 are shown in TABLE 2, below. It is noted that a sum of all of the values in TABLE 2 is one. Linear filter 1010 is applied by DSP 215 as a 2-dimensional, linear convolution to image data received from detector 210 in order to generate MTF curves 920 shown in FIG. 40.

TABLE 2

| | | | | | | | | | |
|---|---|---|---|---|---|---|---|---|---|
| −0.0371 | 0.0652 | −0.0112 | −0.0086 | 0.0218 | −0.0648 | 0.0093 | −0.0324 | −0.0352 | 0.0605 | −0.0233 |
| 0.0627 | −0.0291 | −0.0473 | 0.0856 | 0.0378 | −0.1345 | −0.0507 | 0.0795 | −0.0026 | −0.0544 | 0.0484 |
| −0.0099 | −0.0503 | 0.1322 | −0.1261 | −0.0368 | 0.1261 | 0.0542 | −0.1366 | 0.0811 | −0.0131 | −0.0051 |
| −0.0098 | 0.0849 | −0.1235 | 0.0524 | 0.2273 | −0.4149 | 0.0481 | 0.0927 | −0.0949 | 0.0496 | −0.0345 |
| 0.0174 | 0.0413 | −0.0280 | 0.2361 | −0.0822 | −0.4170 | −0.3459 | 0.0926 | −0.0127 | 0.0146 | −0.0036 |
| −0.0571 | −0.1331 | 0.1077 | −0.4259 | −0.3827 | 1.9235 | 0.5541 | −0.1689 | 0.0711 | −0.0478 | 0.0243 |
| 0.0117 | −0.0508 | 0.0537 | 0.0410 | −0.3391 | 0.5601 | −0.1348 | −0.0103 | 0.0548 | −0.0323 | 0.0301 |
| −0.0327 | 0.0773 | −0.1347 | 0.0956 | 0.0885 | −0.1692 | −0.0090 | 0.1306 | −0.1013 | 0.0457 | −0.0233 |
| −0.0351 | −0.0003 | 0.0785 | −0.0956 | −0.0108 | 0.0720 | 0.0536 | −0.1012 | 0.0349 | 0.0288 | −0.0363 |
| 0.0595 | −0.0556 | −0.0113 | 0.0504 | 0.0129 | −0.0484 | −0.0313 | 0.0459 | 0.0284 | −0.0654 | 0.0428 |
| −0.0220 | 0.0487 | −0.0064 | −0.0350 | −0.0026 | 0.0252 | 0.0297 | −0.0240 | −0.0361 | 0.0431 | 0.0008 |

FIGS. 44-70 illustrate a numerical modeling example of a three-group zoom lens system. FIGS. 44 and 45 illustrate two different configurations of a three-group zoom lens system in accordance with the present disclosure. FIG. 44 shows a configuration 1100 including a first optical group 1102 (with a focal length $f_1$), a second optical group 1104 (with a focal length $f_2$) and a third optical group 1106 (with a focal length $f_3$). Optical groups 1102 and 1104 may include one or more optical elements. Optical group 1106 includes optics 1108 and a WFC element 1110 that may be formed adjacent to or juxtaposed with optics 1108, or integrally formed therewith. In analogy to FIG. 31, configuration 1100 is a wide-angle system configured to accept both on-axis rays 725 and off-axis rays 727 (which encompass a range of incoming rays imaged by system zoom system 1100) and image these rays through first, second and third optical groups onto detector 210. Image data generated by detector 210 is directed to DSP 215 where the data is processed to form a final image 1120. Optical groups 1102, 1104 and 1106 all align along an optical axis 1122.

FIG. 45 shows a configuration 1100', in which the three optical groups remain at the relative positions shown in configuration 1100 (e.g., without translation of optical groups along optical axis 1122). In configuration 1100', second optical group 1104' now exhibits a focal length $f_2'$ and a third optical group 1106' now includes modified optics 1108' so as to result in a focal length $f_3'$, such that configuration 1100' functions as a telephoto system. After detection at detector 210 and signal processing at DSP 215, a final image 1120' results. WFC element 1110 and/or DSP 215 may be identical between configurations 1100 and 1100', or may be modified to accommodate changes in the system due to the focal length variations described.

In general, the use of three groups of optical elements helps to control certain fixed aberrations of a zoom lens system. While first optical group 1102 is shown in FIGS. 44 and 45 to be a stationary, non-variable optical group, the positions of the three optical groups may be changed such that, for example, the stationary optical group is the second or the third group encountered by incident light rays.

Configurations 1100 and 1100' as illustrated in FIGS. 44 and 45, and equivalent configurations without WFC element 1110, were numerically modeled using the following exemplary characteristics. A 0.75 mm image height is assumed. An effective focal length of a combination of optical groups 1102, 1104 and 1106, respectively, is 4.8 mm for (wide angle) configuration 1100 14.2 mm for (telephoto) configuration 100'. A wavelength of light rays is assumed to be 0.55 microns, and detector 210 is assumed to include pixels that are 4 microns square. In configuration 1100, focal length $f_1$ of optical group 1102 is assumed as −14.86 mm, focal length $f_2$ of optical group 1104 is assumed as 23.91 mm, and focal length $f_3$ of optical group 1106 is assumed as 6.55 mm. In configuration 1100', focal length $f_1$ of first optical group 1102 remains −14.86 mm, focal length $f_2'$ of second optical group 1104 is assumed as 6.03 mm, and focal length $f_3'$ of third optical group 1106 is assumed as −4.94 mm. A specific prescription of the various optical groups is again derived from Equation (3) with parameters as shown in TABLES 3A and 3B:

TABLE 3B

| | Third optical group 1104 Thickness = 1.0 mm Back focal distance = 6.27 mm | | Third optical group 1104' Thickness = 1.7 mm Back focal distance = 6.27 mm | |
|---|---|---|---|---|
| | Surface 1 | Surface 2 | Surface 1 | Surface 2 |
| c | 9.788E−2 | −9.632E−2 | −1.225E−1 | 1.227E−1 |
| k | 7.303 | 4.602E−2 | −2.659E+1 | 3.609E+1 |
| $a_2$ | 0 | 0 | 0 | 0 |
| $a_4$ | −5.420E−4 | −7.039E−4 | 1.744E−2 | 1.710E−2 |
| $a_6$ | −2.814E−3 | −2.151E−4 | −6.794E−4 | −2.511E−3 |
| $a_8$ | −2.829E−3 | 5.410E−4 | −6.362E−3 | −2.393E−4 |
| $a_{10}$ | 1.261E−2 | 9.668E−5 | 3.676E−3 | −6.028E−3 |

FIGS. 46-53 illustrate non-ideal performance of the configurations shown in FIGS. 44 and 45 if WFC element 1110 is not present. FIGS. 46-49 show a series of ray intercept curves corresponding to configurations 1100 and 1100' shown in FIGS. 44 and 45. FIG. 46 shows a y-plot 1150 and an x-plot 1152 with a y-axis ray intercept curve 1154 and an x-axis ray intercept curve 1156 corresponding to on-axis rays 725 going through configuration 1100 but without WFC element 1110.

Similarly, FIG. 47 shows a y-plot 1160 and an x-plot 1162 with a y-axis ray intercept curve 1164 and an x-axis ray intercept curve 1166 corresponding to off-axis rays 727 being imaged through configuration 1100 but without WFC element 1110. FIG. 48 shows a y-plot 1170 and an x-plot 1172 with a y-axis ray intercept curve 1174 and an x-axis ray intercept curve 1176 corresponding to the on-axis portion of rays 725' going through configuration 1100' but without WFC element 1110. FIG. 49 shows a y-plot 1180 and an x-plot 1182 with a y-axis ray intercept curve 1184 and an x-axis ray intercept curve 1186 corresponding to the off-axis portion of rays 725' going through configuration 1100' but without WFC element 1110.

Examining each of FIGS. 46-49 in turn, y-axis and x-axis ray intercept curves 1154 and 1156 shown in FIG. 46 are linear curves with substantially constant slopes, thus indicating misfocus. In FIG. 47, y-axis ray intercept curve 1164 and x-axis ray intercept curve 1166 are similarly linear. In FIGS. 48 and 49, the ray intercept curves are substantially linear but have opposite slopes from those shown in FIGS. 46 and 47, thereby indicating that configuration 1100' exhibits an opposite misfocus from configuration 1100. That is, while the misfocus indicated in FIGS. 46 and 47 may be partially corrected by, for example, moving the image plane (i.e., the

TABLE 3A

| | First optical group 1102 Thickness = 0.5 mm Distance to second optical group = 4.98 mm | | Second optical group 1104 Thickness = 1.7 mm Distance to third optical group = 4.9 mm | | Second optical group 1104' Thickness = 1.7 mm Distance to third optical group = 4.9 mm | |
|---|---|---|---|---|---|---|
| | Surface 1 | Surface 2 | Surface 1 | Surface 2 | Surface 1 | Surface 2 |
| c | −5.681E−3 | −5.681E− | −2.179E−2 | −2.179E−2 | 1.077E−1 | −1.007E−1 |
| k | 4.620 | 4.620 | −8.234E+2 | −8.234E+2 | −4.885E−1 | −2.606E−1 |
| $a_2$ | 0 | 0 | 0 | 0 | 0 | 0 |
| $a_4$ | 7.702E−4 | 7.702E−4 | 1.586E−3 | 1.345E−3 | −5.454E−5 | 6.371E−4 |
| $a_6$ | −2.625E−5 | −2.625E− | 5.677E−5 | 2.290E−4 | −3.866E−6 | 3.696E−7 |
| $a_8$ | −6.316E−6 | −6.316E− | 5.890E−6 | −1.037E−5 | 4.178E−7 | −1.085E−6 |
| $a_{10}$ | 3.273E−7 | 3.273E−7 | −2.898E−6 | 1.298E−6 | −1.027E−7 | −2.028E−8 | location of detector 210) in configuration 1100, such movement of the image plane will worsen the misfocus exhibited by configuration 1100'. In other words, correction of the misfocus as shown in FIGS. 46-49 would require, for instance, moving the image plane as a function of configuration, which is undesirable.

Figure 50:
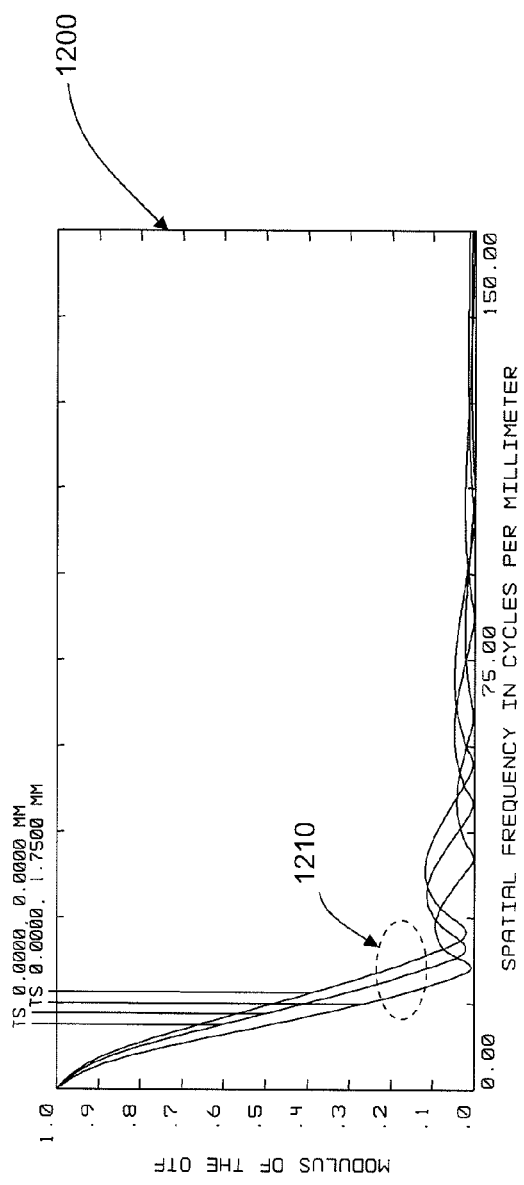
FIGS. 50 and 51 are graphical plots of calculated modulation transfer functions corresponding to on- and off-axis rays imaged through the configurations of FIGS. 44 and 45 but without including effects of wavefront coding and signal processing.
Figure 51:
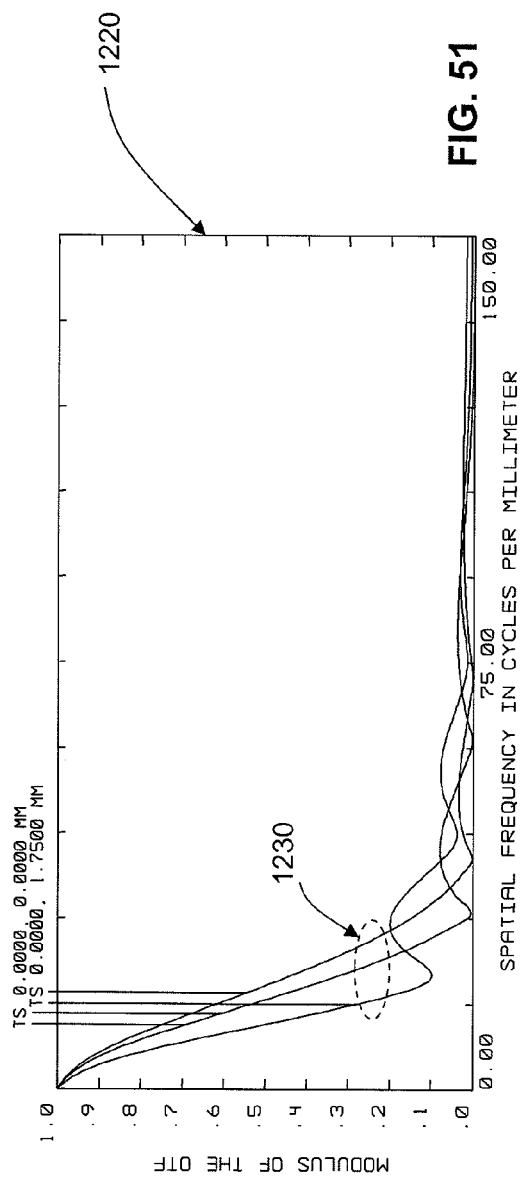

FIGS. 50 and 51 show calculated MTFs as a function of spatial frequency (in units of cycles (or line pairs) per millimeter) for the on-axis and off-axis rays in configurations 1100 and 1100' without WFC elements 1110. In FIG. 50, a plot 1200 includes a group of MTF curves 1210 corresponding to on- and off-axis rays imaged through configuration 1100 of FIG. 44 but without WFC element 1110. Similarly, a plot 1220 in FIG. 51 includes another group of MTF curves 1230 corresponding to on- and off-axis rays imaged through configuration 1100' of FIG. 45, again without WFC element 1110. As shown in plots 1200 and 1220, both groups of MTF curves 1210 and 1230 exhibit large drops and variations with increasing spatial frequency, indicating non-uniform performance as well as large misfocus within each configuration and between the two configurations. Furthermore, both groups of MTF curves 1210 and 1230 include spatial frequency values at which the MTF drops to essentially zero. These zeros in the MTF values are particularly undesirable because they indicate loss of image data.

FIGS. 52 and 53, like FIGS. 38 and 39, show the MTF curves for on-axis and off-axis rays in configurations 1100 and 1100' without wavefront coding for a specific spatial frequency value (75 lp/mm). In FIGS. 52 and 53, the vertical axis corresponds to the magnitude of the modulus of the OTF; that is, the MTF, and the horizontal axis corresponds to a focus shift in millimeters, where a focus shift of zero corresponds to perfect focus at the image plane (e.g., a location of detector 210). A plot 1250 in FIG. 52 includes a first group of MTF curves 1252 corresponding to on-axis and off-axis rays in configuration 1100 of FIG. 44, but without WFC element 1110. As may be seen in plot 1250, peaks of first group of MTF curves 1252 are located to the right of a line of ideal focus 1254 at zero focus shift. Individual MTF curves within group of MTF curves 1252 vary widely in shape, indicating astigmatism and field curvature in addition to misfocus. A FWHM 1256 is shown for one of the curves, and can be seen to have a value less than 0.3 mm. A plot 1260 in FIG. 53 includes a second group of MTF curves 1262 corresponding to on-axis and off-axis rays in configuration 1100' of FIG. 45, but without WFC element 1110. In plot 1260, the peaks of second group of MTF curves 1262 are located to the left of line of ideal focus 1254. Therefore, like configurations 700 and 700' illustrated earlier in the context of FIGS. 38 and 39, plots 1250 and 1260 in FIGS. 52 and 53, respectively, indicate that it is not possible to select one location for detector 210 that achieves good performance in both configurations 1100 and 1100'.

In contrast with FIG. 50 and FIG. 51, FIGS. 54 and 55 show MTF curves simulated for configurations 1100 and 1100' including WFC element 1110. For purposes of the numerical modeling, WFC element 1110 is accounted for by adding an extra element before the first surface of third optical groups 1106 and 1106' according to the sag equation of Equation (4) with the following parameters: $a_3 = -2.858 \cdot 10^{-3}$, $a_5 = -0.08 \cdot 10^{-3}$, $a_7 = -1.707 \cdot 10^{-3}$, $a_9 = 3.426 \cdot 10^{-3}$, and $r_0 = 0.60$ mm.

Figure 54:
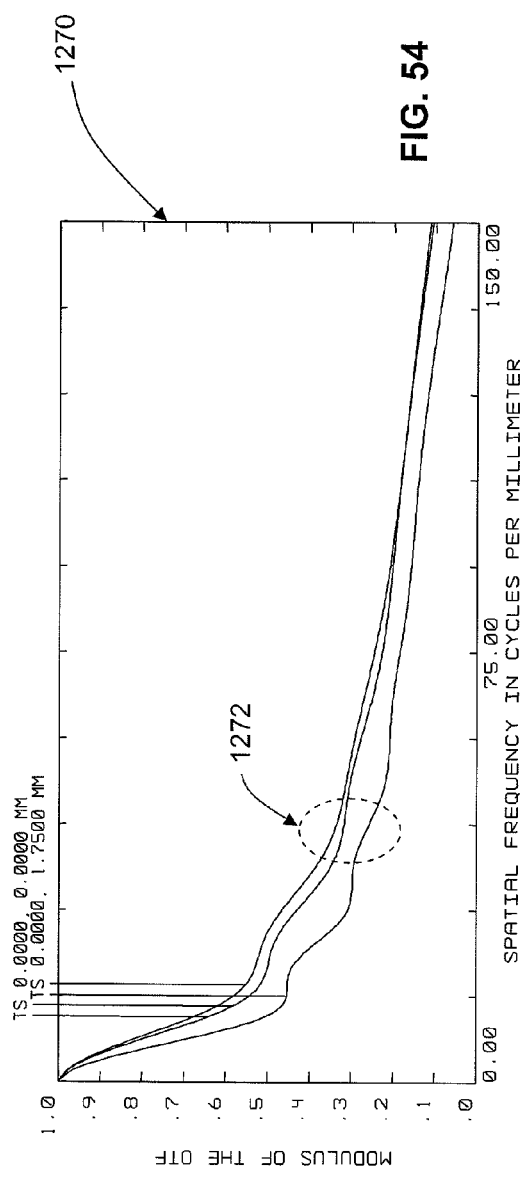
FIGS. 54 and 55 are graphical plots of calculated modulation transfer functions corresponding to on- and off-axis rays imaged through the configurations of FIGS. 44 and 45, this time including effects of wavefront coding but before signal processing.
Figure 55:
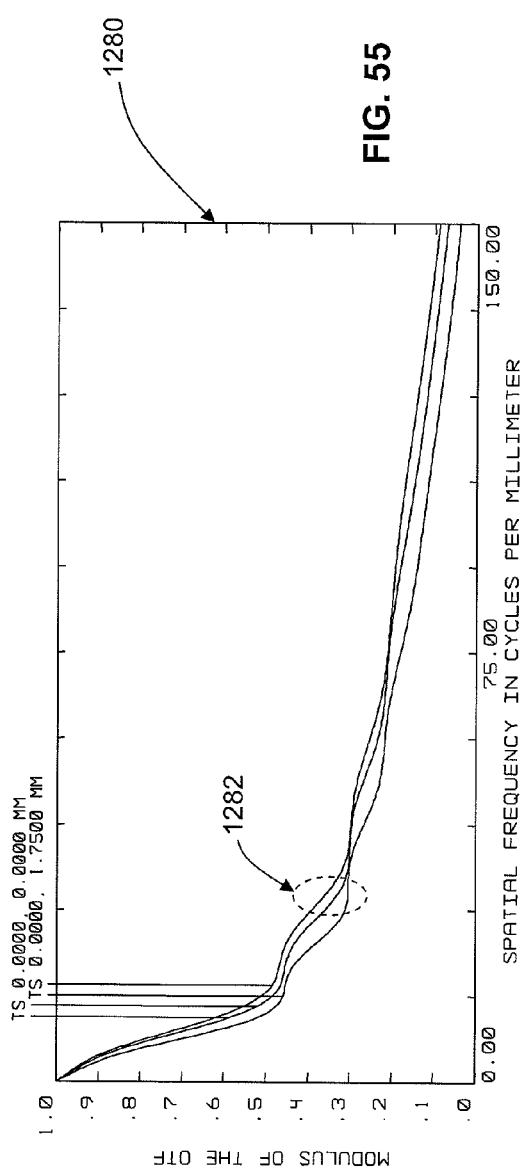

Referring to FIGS. 54 and 55 in conjunction with FIGS. 50 and 51, FIG. 54 shows a plot 1270 including a group of MTF curves 1272 for on-axis and off-axis rays imaged through configuration 1100 including WFC element 1110, without processing by DSP 215. As may be seen by comparing MTF curves 1272 with MTF curves 1210 shown in FIG. 50, MTF values are greater in MTF curves 1272 than for MTF curves 1210, thus the MTF values are increased by the addition of WFC element 1110 in configuration 1100. Similarly, FIG. 55 shows a plot 1280 including a group of MTF curves 1282 for on- and off-axis rays imaged through configuration 1100', again including WFC element 1110, without processing by DSP 215. It may be seen that MTF curves 1282 show improvement over MTFs 1230 of FIG. 51 in terms of magnitude, uniformity in performance and lack of zeros.

FIGS. 56 and 57 show MTF curves for on-axis and off-axis rays in configurations 1100 and 1100' for a specific spatial frequency value (75 lp/mm, as in FIGS. 52 and 53). Again, perfect focus at the image plane corresponds to a focus shift of zero. A plot 1290 in FIG. 56 includes a first group of MTF curves 1292 corresponding to on-axis and off-axis rays in configuration 1100 of FIG. 44, including WFC element 1110, but without processing by DSP 215. A FWHM 1296 is shown for one of the curves, and can be seen to have a value that cannot be measured utilizing plot 1290, because the peak extends beyond the focus shift values shown in plot 1290, but is at least 0.6 mm. A plot 1295 in FIG. 57 includes a second group of MTF curves 1297 corresponding to on-axis and off-axis rays in configuration 1100' of FIG. 45, with WFC element 1110 but without processing by DSP 215. It may be seen that peaks of both first and second groups of MTF curves 1292 and 1297 have been flattened and broadened such that line of ideal focus 1294 intersects both groups of MTF curves at points not far from the peak MTF magnitudes. In other words, plots 1290 and 1295 indicate that there is a broad range of settings in which high MTF values may be obtained without having to actually move the image plane. Furthermore, the zoom lens system that utilizes WFC element 1110 has a broader MTF curve, as indicated by FWHM, at least one spatial frequency and over a range of focus shift, that is wider than an MTF curve formed by the corresponding system at the one spatial frequency over a range of ray angles imaged by the system and at any focal length of the system, than a corresponding zoom lens system without WFC element 1110.

Referring again to FIGS. 31-32, 44-45, a range of incoming ray angles (e.g., indicated by on axis and off axis rays 725 and 727, respectively) is imaged by each of the zoom systems; and a wavefront coding element modifies phase of a wavefront represented by the rays such that MTFs over the range of ray angles is similar in magnitude and shape, making the zoom system less sensitive to misfocus like aberrations (as compared to the same zoom system without wavefront coding).

In order to further illustrate the improvement in system performance obtained by the addition of WFC element 1110 and DSP 215 in the configurations shown in FIGS. 44 and 45, calculated evaluations of these configurations in terms of the point spread functions (PSFs) are shown in FIGS. 58-69. FIGS. 58-61 respectively correspond to visualizations of a calculated PSF 1300 for on-axis rays imaged through configuration 1100, a calculated PSF 1302 for off-axis rays imaged through configuration 1100, a calculated PSF 1304 for on-axis rays image through configuration 1100' and a calculated PSF 1306 for off-axis rays imaged through configuration 1100' for a point object when WFC element 1110 is not included in the configurations and no processing is performed by DSP 215. As may be seen in comparing PSFs 1300, 1302, 1304 and 1306, the imaging performance of the three-group zoom lens system within and between configurations varies widely, as PSFs 1300, 1302, 1304 and 1306 are quite different from each other.

FIGS. 62-65, respectively, show visualizations of a calculated PSF 1310 for on-axis rays imaged through configuration 1100, a calculated PSF 1312 for off-axis rays imaged through configuration 1110, a calculated PSF 1314 for on-axis rays image through configuration 1100' and a calculated PSF 1316 for off-axis rays imaged through configuration 1100' for a point object when WFC element 1110 is included in the configurations, but no processing is performed by DSP 215. PSFs 1310, 1312, 1314 and 1316 are all quite similar to each other. While PSFs 1310, 1312, 1314 and 1316 are not perfect points, as would be ideal, they are all quite uniform and include only similar aberrations that spread out the PSFs in the 9-o'clock and 12-o'clock directions in these figures. Such aberrations may be corrected using a single linear filter, as indicated in FIGS. 66-69, which show the calculated PSFs when the effects of both WFC element 1110 and processing by DSP 215 are included in the calculations.

FIGS. 66-69, respectively, correspond to on-axis rays imaged through configuration 1100, off-axis rays imaged through configuration 1110, on-axis rays imaged through configuration 1100' and off-axis rays imaged through configuration 1100' for a point object. As may be seen, calculated PSFs 1320, 1322, 1324 and 1326 are very close to uniform points covering only a few pixels. Therefore, by the addition of WFC element 1110 and subsequent signal processing by DSP 215, uniform performance may be achieved by the three-group zoom lens system for a range of configurations, from wide angle to telephoto.

Figure 70:
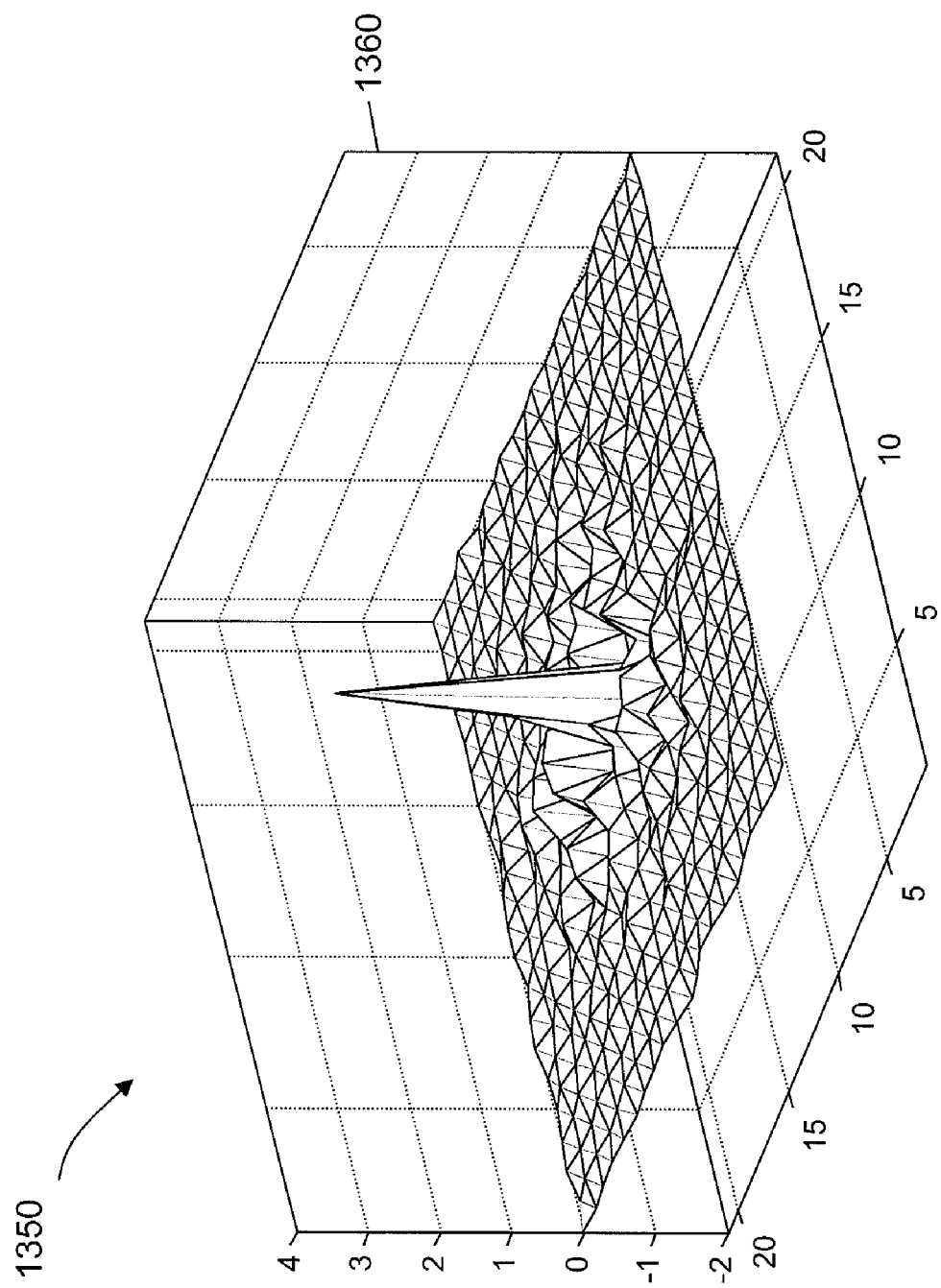
FIG. 70 is a 3-D mesh representation of calculated linear filter applied in the signal processing used to calculate the results of FIGS. 54-55 and 66-69.

FIG. 70 illustrates a linear filter 1360 that is applied by DSP 215 in configurations 1100 and 1100'; filter 1360 is shown in mesh format in a plot 1350. Filter 1360 is applied as a two-dimensional, linear convolution by DSP 215 in configurations 1100 and 1100' to image data generated by detector 210 in order to generate the calculated PSFs shown in FIGS. 66-69.

Although each of the aforedescribed embodiments have been illustrated with various components having particular respective orientations, it should be understood that the present devices may take on different configurations with components located in different positions and mutual orientations and remain within the spirit and scope of the present disclosure. Furthermore, suitable equivalents may be used in place of, or in addition to, the various components. The function and use of such substitute or additional components may be familiar to those skilled in the art and are therefore regarded as falling within the scope of the present disclosure. For example, an optical photon sieve may be added into the zoom lens system of the present disclosure as part of one or more of the optical groups. Details regarding an optical photon sieve may be found, for example, in Andersen, "Large optical photon sieve," Optics Letters, vol. 30, no. 22, November 2005, pp. 2976-2978. Such an optical photon sieve may act as a simple diffractive element within the zoom lens system to replace or complement one or more of the optical elements in the embodiments of the present disclosure as described above. Another possible modification includes the addition of a polymer dispersed or polymer stabilized liquid crystal (PDLC or PSLC) light modulating device in the optical path. Such a PDLC or PSLC device may act, for instance, as a binary or analog light valve to regulate the amount of light transmitted through the zoom lens system. Alternatively, the PDLC or PSLC may be patterned to provide additional light control, or may be integrated into a variable liquid crystal lens so as to enhance the variability of a zoom lens system including the variable LC lens. PDLCs and PSLCs are described, for example, in Drzaic, "Recent progress in dichroic polymer-dispersed liquid crystal materials," Pure & Appl. Chem., vol. 68, no. 7, pp. 1435-1440, 1996, and Doane et al., U.S. Pat. No. 5,691,795 issued 25 Nov. 1997. Other modern optical elements that act to change the wavefront of light may be suitably configured into the improved zoom lens systems as disclosed above.

Therefore, the present examples are to be considered as illustrative and not restrictive, and are not limited to the details given herein but may be modified within the scope of the appended claims. The following claims are intended to cover generic and specific features described herein, as well as statements of the scope of the present method and system, which, as a matter of language, might be said to fall therebetween.

What is claimed is:

1. A zoom lens system for imaging incoming rays from an object over a range of ray angles, the incoming rays being characterized by at least a phase, the zoom lens system including an optical axis and being characterized by a plurality of modulation transfer functions (MTFs) corresponding at least to the range of ray angles, the zoom lens system comprising:
   a first optical group disposed along the optical axis, including a variable optical element exhibiting a variable focal length selectable between at least two distinct focal length values;
   a wavefront coding compensator that alters at least the phase of the incoming rays such that the plurality of MTFs corresponding to the range of ray angles, for each one of the at least two distinct focal length values, are less sensitive to misfocus than MTFs of a corresponding system without the wavefront coding compensator;
   a detector for generating image data that corresponds to an optical image formed by the system;
   wherein said first optical group and said wavefront coding compensator have fixed positions along the optical axis relative to said detector and said object; and
   a post processor for electronically processing the image data to render an in-focus electronic image of said object at the at least two distinct focal lengths.

2. Zoom lens system of claim 1, wherein the MTFs at least one spatial frequency, over a range of focus shift, have a full width at half maximum that is wider than MTFs formed by the corresponding system at the at least one spatial frequency.

3. Zoom lens system of claim 1, wherein the wavefront coding compensator includes a phase mask that alters the phase of the incoming rays.

4. Zoom lens system of claim 1, wherein the variable optical element is one of a liquid lens and a liquid crystal lens.

5. Zoom lens system of claim 1, wherein the post processor includes a linear filter.

6. Zoom lens system of claim 1, wherein the first optical group includes an aperture and a first aspheric optical element.

7. Zoom lens system of claim 6, wherein at least one of the aperture and the first aspheric optical element is slidable in a plane that is perpendicular to the optical axis.

8. Zoom lens system of claim 7, wherein the first optical group further includes a second aspheric optical element slidable in a plane that is perpendicular to the optical axis.

9. Zoom lens system of claim 6, wherein the first aspheric optical element is rotatable in a plane that is perpendicular to the optical axis.

10. A method for imaging incoming rays from an object over a range of ray angles in a zoom lens system, the incoming rays including at least a phase, the zoom lens system including an optical axis, a variable optical element, a compensator, and a detector, each of the object, variable optical element and compensator having a fixed position relative to the detector, the variable optical element exhibiting a variable focal length selectable between at least two distinct focal length values, the zoom lens system being characterized by a plurality of modulation transfer functions (MTFs) corresponding at least to the range of ray angles and the distinct focal length values, the method comprising:

modifying the phase of the incoming rays with the compensator such that the plurality of MTFs corresponding to the range of ray angles, for each of the distinct focal length values, are substantially similar in shape and in magnitude, generating optical image data at the detector from said rays, and electronically processing the image data to render an in-focus electronic image of said object at the at least two distinct focal lengths.

* * * * *

UNITED STATES PATENT AND TRADEMARK OFFICE
CERTIFICATE OF CORRECTION

PATENT NO.       : 7,710,658 B2  
APPLICATION NO.  : 11/682816  
DATED            : May 4, 2010  
INVENTOR(S)      : Edward Raymond Dowski, Jr. et al.

Page 1 of 1

It is certified that error appears in the above-identified patent and that said Letters Patent is hereby corrected as shown below:

Column 24, line 18, "FWHM, at least" should read --FWHM, at at least--;
Column 28, line 33, "FWHM, at least" should read --FWHM, at at least--;
Column 30, line 38, Claim 2, "MTFs at least" should read --MTFs at at least--.

Signed and Sealed this
Eighteenth Day of January, 2011

David J. Kappos
*Director of the United States Patent and Trademark Office*